(12) United States Patent
 Zong et al.

(10) Patent No.: US 12,615,557 B2
(45) Date of Patent: Apr. 28, 2026

(54) COMMUNICATION METHOD, DEVICE, AND SYSTEM

(71) Applicant: Huawei Technologies Co., Ltd., Shenzhen (CN)

(72) Inventors: Zaifeng Zong, Nanjing (CN); Fenqin Zhu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 508 days.

(21) Appl. No.: 17/738,487

(22) Filed: May 6, 2022

(65) Prior Publication Data

US 2022/0264378 A1      Aug. 18, 2022

Related U.S. Application Data

(63) Continuation of application No. PCT/CN2020/126865, filed on Nov. 5, 2020.

(30) Foreign Application Priority Data

Nov. 7, 2019    (CN) .......................... 201911083728.4

(51) Int. Cl.
 *H04W 36/00*        (2009.01)
 *H04W 4/06*         (2009.01)
 *H04W 36/08*        (2009.01)

(52) U.S. Cl.
 CPC ......... *H04W 36/0007* (2018.08); *H04W 4/06* (2013.01); *H04W 36/0058* (2018.08); *H04W 36/08* (2013.01)

(58) Field of Classification Search
 CPC ............... H04W 36/0007; H04W 4/06; H04W 36/0058; H04W 36/08; H04W 76/40;
 (Continued)

(56) References Cited

U.S. PATENT DOCUMENTS

2013/0301509 A1   11/2013  Purnadi et al.
2013/0315125 A1*  11/2013  Ravishankar ..... H04W 36/0007
                                                            370/312
(Continued)

FOREIGN PATENT DOCUMENTS

CN         101267593 A      9/2008
CN         102761829 A     10/2012
(Continued)

OTHER PUBLICATIONS

3GPP TS 38.300 V15.7.0, Sep. 2019, "3rd Generation Partnership Project; Technical Specification Group Radio Access Network; NR; NR and NG-RAN Overall Description; Stage 2 (Release 15)," 99 pages.
(Continued)

*Primary Examiner* — Omer S Mian
(74) *Attorney, Agent, or Firm* — Conley Rose, P.C.

(57) ABSTRACT

A communication method, a device, and a system are applied to a scenario in which a first terminal device moves from a source access network device to a target access network device with a multicast service delay caused by handover between access network devices. The communication method includes that the source access network device sends a first identifier to the target access network device, where the first identifier is for identifying a first multicast service. Correspondingly, the target access network device receives the first identifier, and determines a transmission mode including a unicast mode or a multicast mode for transmitting data of the first multicast service between the target access network device and the first terminal device, and sends wireless configuration information corresponding to the transmission mode to the first terminal device through the source access network device.

21 Claims, 20 Drawing Sheets

(58) Field of Classification Search
CPC .. H04W 76/11; H04W 76/22; H04W 36/0061
See application file for complete search history.

(56) References Cited

U.S. PATENT DOCUMENTS

| | | | | |
|---|---|---|---|---|
| 2013/0324129 A1* | 12/2013 | Lee | ................... | H04W 36/0088 |
| | | | | 455/436 |
| 2014/0078923 A1 | 3/2014 | Guan et al. | | |
| 2018/0139665 A1 | 5/2018 | Park et al. | | |
| 2018/0160342 A1 | 6/2018 | Park et al. | | |
| 2019/0380069 A1* | 12/2019 | Park | ................... | H04W 36/0072 |
| 2020/0092923 A1* | 3/2020 | Abraham | ................. | H04W 4/06 |
| 2020/0205221 A1 | 6/2020 | Li et al. | | |
| 2020/0344651 A1* | 10/2020 | Yang | ................. | H04W 36/0022 |
| 2021/0258853 A1* | 8/2021 | Wang | ................ | H04W 36/0009 |
| 2022/0060901 A1* | 2/2022 | Rajendran | ......... | H04W 36/0088 |
| 2022/0279393 A1* | 9/2022 | Di Girolamo | ........ | H04W 72/02 |
| 2022/0322464 A1* | 10/2022 | Luo | ........................ | H04W 76/11 |
| 2024/0089139 A1* | 3/2024 | Speicher | ............. | H04L 12/1836 |
| 2024/0306086 A1* | 9/2024 | Sivavakeesar | ........ | H04W 68/02 |

FOREIGN PATENT DOCUMENTS

| | | |
|---|---|---|
| CN | 102781057 A | 11/2012 |
| CN | 104303550 A | 1/2015 |
| CN | 105530667 A | 4/2016 |
| CN | 103477658 B | 5/2017 |
| CN | 107257549 A | 10/2017 |
| CN | 109429186 A | 3/2019 |
| WO | 2018202797 A1 | 11/2018 |
| WO | 2019161927 A1 | 8/2019 |

OTHER PUBLICATIONS

3GPP TS 38.321 V15.7.0, Sep. 2019, "3rd Generation Partnership Project; Technical Specification Group Radio Access Network; NR; Medium Access Control (MAC) protocol specification (Release 15)," Sep. 2019, 78 pages.
3GPP TS 38.331 V15.7.0, Sep. 2019, "3rd Generation Partnership Project; Technical Specification Group Radio Access Network; NR; Radio Resource Control (RRC) protocol specification (Release 15)," 527 pages.
3GPP TS 38.413 V15.5.0, Sep. 2019, "3rd Generation Partnership Project; Technical Specification Group Radio Access Network; NG-RAN; NG Application Protocol (NGAP) (Release 15)," 329 pages.
3GPP TS 38.423 V15.5.0, Sep. 2019, "3rd Generation Partnership Project; Technical Specification Group Radio Access Network; NG-RAN; Xn application protocol (XnAP) (Release 15)," 311 pages.
Huawei et al., "Update of solution#5," SA WG2 Meeting #128, S2-186484, Jul. 2-6, 2018, Vilnius, Lithuania, 12 pages.
Huawei et al., "Key Issue: Service continuity," SA WG2 Meeting #135, S2-1909104, Split, Croatia, Oct. 14-18, 2019, 1 page.
ZTE, "KI#7, new solution multicast MBS session handover with Dummy QoS Flow," SA WG2 Meeting #S2-139E S2-2003962, Jun. 1-12, 2020, Electronic, Elbonia, 4 pages.

\* cited by examiner

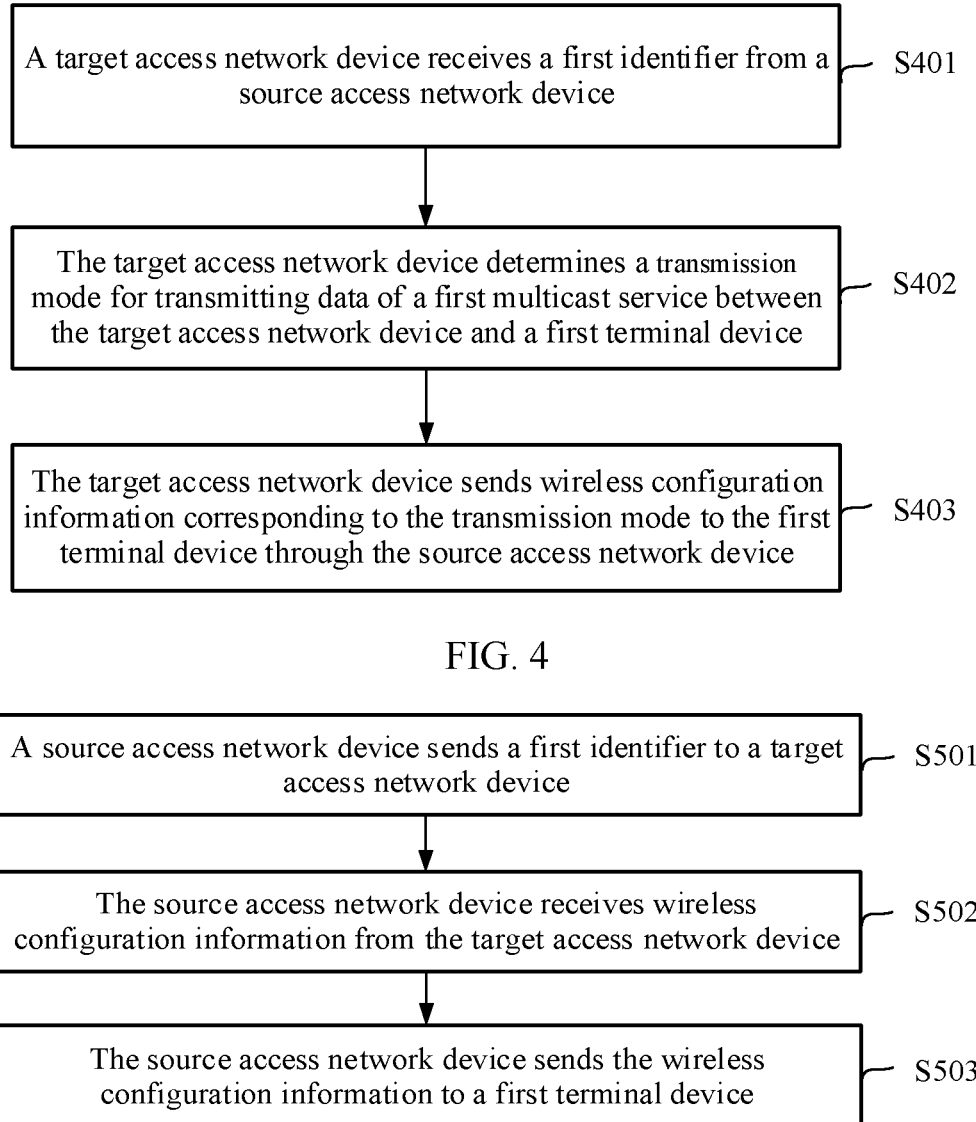

A target access network device receives a first identifier from a source access network device — S401

The target access network device determines a transmission mode for transmitting data of a first multicast service between the target access network device and a first terminal device — S402

The target access network device sends wireless configuration information corresponding to the transmission mode to the first terminal device through the source access network device — S403

FIG. 4

A source access network device sends a first identifier to a target access network device — S501

The source access network device receives wireless configuration information from the target access network device — S502

The source access network device sends the wireless configuration information to a first terminal device — S503

FIG. 5

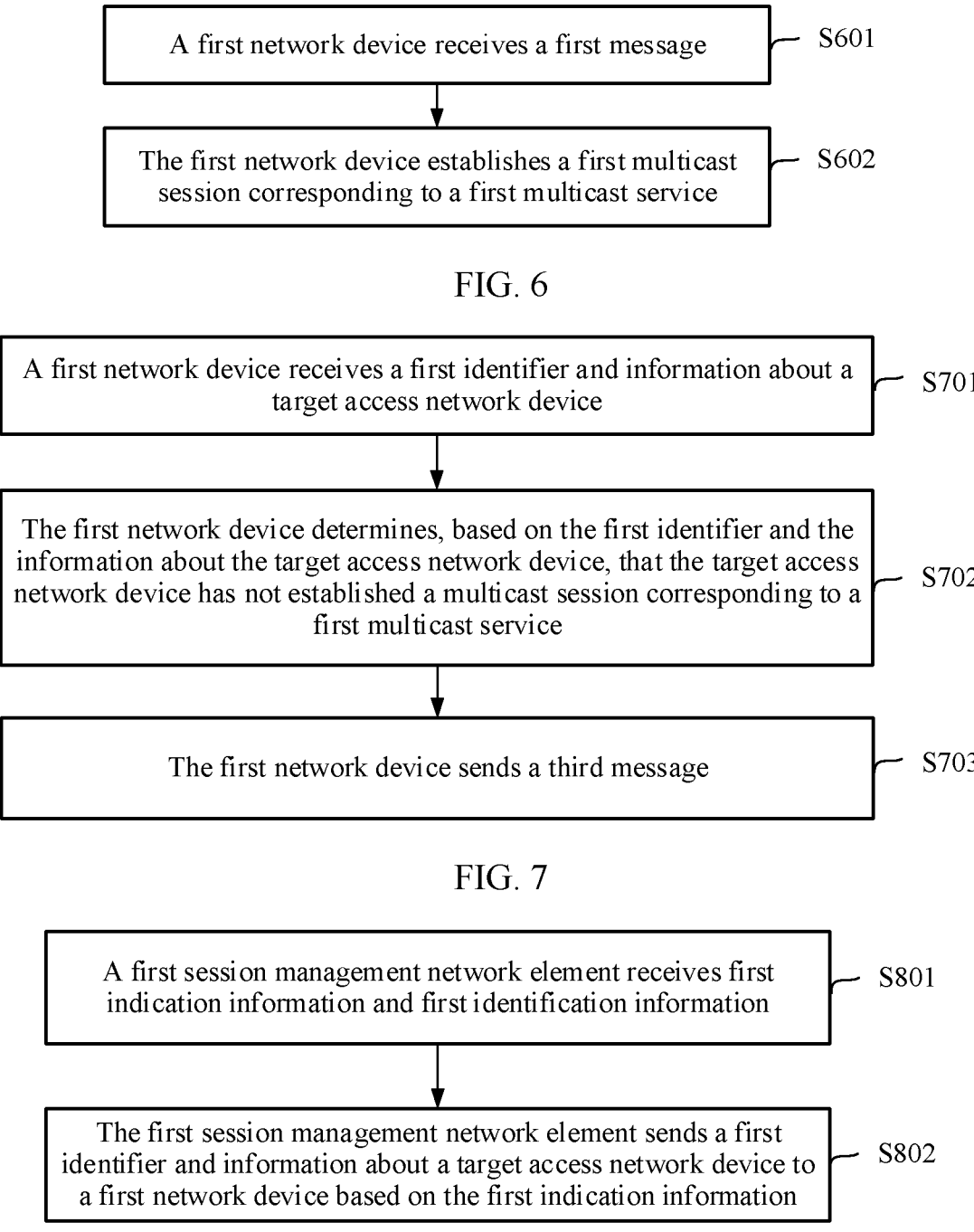

A first network device receives a first message — S601

The first network device establishes a first multicast session corresponding to a first multicast service — S602

FIG. 6

A first network device receives a first identifier and information about a target access network device — S701

The first network device determines, based on the first identifier and the information about the target access network device, that the target access network device has not established a multicast session corresponding to a first multicast service — S702

The first network device sends a third message — S703

FIG. 7

A first session management network element receives first indication information and first identification information — S801

The first session management network element sends a first identifier and information about a target access network device to a first network device based on the first indication information — S802

FIG. 8

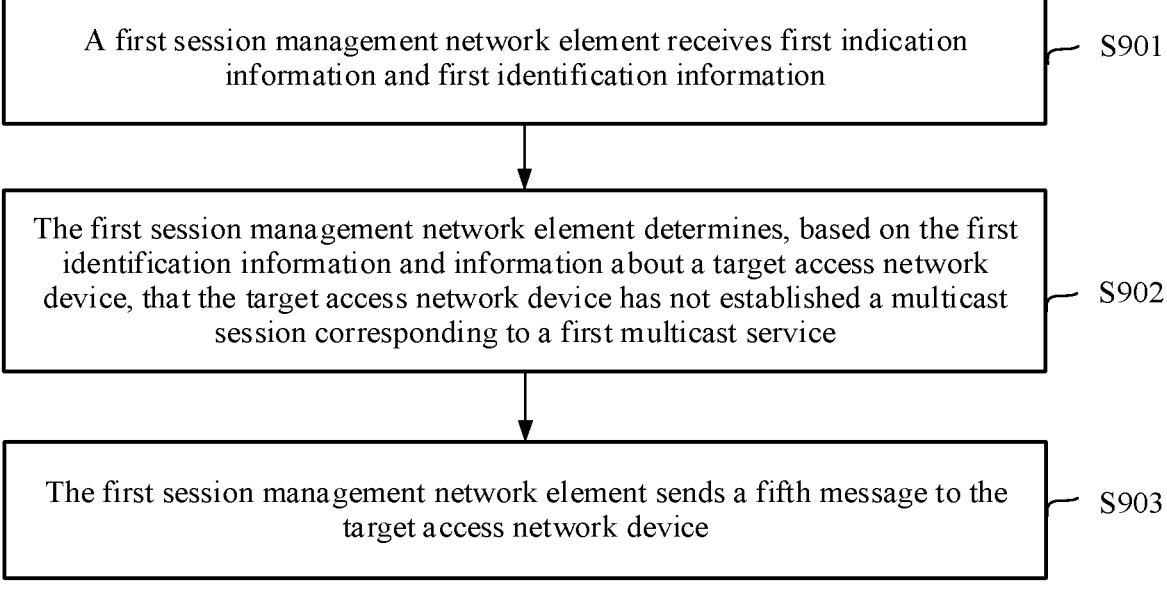

A first session management network element receives first indication information and first identification information — S901

The first session management network element determines, based on the first identification information and information about a target access network device, that the target access network device has not established a multicast session corresponding to a first multicast service — S902

The first session management network element sends a fifth message to the target access network device — S903

FIG. 9

COMMUNICATION METHOD, DEVICE, AND SYSTEM

CROSS-REFERENCE TO RELATED APPLICATIONS

This is a continuation of International Patent Application No. PCT/CN2020/126865 filed on Nov. 5, 2020, which claims priority to Chinese Patent Application No. 201911083728.4 filed on Nov. 7, 2019. The disclosures of the aforementioned applications are hereby incorporated by reference in their entireties.

TECHNICAL FIELD

This application relates to the field of communication technologies, and in particular, to a communication method, a device, and a system.

BACKGROUND

When a multicast service is transmitted in an existing 4th generation (4G) network, air interface configuration information (for example, data radio bearer (DRB) information) of the multicast service needs to be periodically broadcast by using a dedicated broadcast channel, and a terminal device obtains the air interface configuration information of the multicast service by monitoring the broadcast channel, to perform corresponding configuration and receive the multicast service. However, in this solution, because the dedicated broadcast channel is required for broadcasting the air interface configuration information of the multicast service, spectrum utilization is low, and a requirement on the terminal device is high.

Based on this, in a 5th generation (5G) network, the European standards organization 5G XCast proposes to reuse a unicast channel of a terminal device to send air interface configuration information of a multicast service to the terminal device, to improve spectrum utilization. In addition, the terminal device does not need to monitor a dedicated broadcast channel to receive the air interface configuration information of the multicast service. Therefore, a design of the terminal device is simplified, and a requirement on the terminal device is lowered.

However, in the 5G network, for a case in which the terminal device is handed over from a source base station to a target base station, there is no related solution to reduce an interruption delay of the multicast service that is caused by handover between base stations.

SUMMARY

Embodiments of this application provide a communication method, a device, and a system, to reduce a multicast service delay caused by handover between access network devices.

To achieve the foregoing objective, the following technical solutions are used in embodiments of this application.

According to a first aspect, a communication method and a corresponding apparatus are provided. This solution is applied to a scenario in which a first terminal device moves from a source access network device to a target access network device. In this solution, the target access network device receives a first identifier from the source access network device, where the first identifier is for identifying a first multicast service, the target access network device determines a transmission mode for transmitting data of the first multicast service between the target access network device and the first terminal device, where the transmission mode includes a unicast mode and a multicast mode, and the target access network device sends wireless configuration information corresponding to the transmission mode to the first terminal device through the source access network device.

In the communication method provided in this embodiment of this application, before the first terminal device moves from the source access network device to the target access network device, the source access network device sends, to the target access network device, the first identifier for identifying the first multicast service. In this way, the target access network device can determine the transmission mode for transmitting the data of the first multicast service between the target access network device and the first terminal device, and send the wireless configuration information corresponding to the transmission mode to the source access network device. Further, the source access network device may send the wireless configuration information to the first terminal device. Subsequently, when the first terminal device moves to the target access network device or is handed over to the target access network device, the first terminal device may perform configuration based on the wireless configuration information that is sent by the target access network device through the source access network device before handover, without waiting for the target access network device to deliver configuration information. In other words, based on the communication method provided in this embodiment of this application, before the first terminal device moves or is handed over, the wireless configuration information used when the multicast service is transmitted may be sent to the first terminal device. Therefore, a delay of the multicast service that is caused by the handover of the first terminal device between access network devices is reduced.

In a possible design, the transmission mode is the multicast mode, the wireless configuration information corresponding to the transmission mode includes scheduling indication information, the scheduling indication information is for determining scheduling information of the first multicast service, and the scheduling information is for indicating a wireless resource for transmitting the first multicast service.

Based on this solution, after the first terminal device is handed over to the target access network device, the first terminal device may determine, based on the scheduling indication information, the wireless resource for transmitting the first multicast service, and receive the data of the first multicast service on the wireless resource. Therefore, the delay of the multicast service that is caused by the handover between the access network devices is further reduced.

In a possible design, the communication method further includes that the target access network device receives signal measurement information of a target cell from the source access network device, where the target cell belongs to the target access network device. The target access network device determines a transmission mode for transmitting data of the first multicast service between the target access network device and the first terminal device. The target access network device determines the transmission mode based on the signal measurement information of the target cell and/or a first quantity, where the first quantity is a quantity of terminal devices that receive the data of the first multicast service through the target access network device.

Based on this solution, the target access network device may properly and flexibly determine, based on the signal measurement information of the target cell and/or the quantity of terminal devices that receive the data of the first multicast service through the target access network device, the transmission mode for transmitting the data of the first multicast service between the target access network device and the first terminal device. Therefore, transmission overheads are reduced, or receiving quality of the first terminal device is improved.

In a possible design, the communication method further includes that the target access network device receives information about a quality of service (QoS) flow of the first multicast service from the source access network device. The target access network device obtains the wireless configuration information corresponding to the transmission mode based on the information about the QoS flow of the first multicast service.

In a possible design, the communication method further includes that the target access network device sends a first message to a first network device, where the first message includes the first identifier, and the first message is for requesting to establish a first multicast session corresponding to the first multicast service.

Based on this solution, the first multicast session corresponding to the first multicast service may be established on the target access network device, and further a transmission path of the data of the first multicast service from a provider of the first multicast service to the target access network device is established. Therefore, continuity of the first multicast service is ensured, and the delay of the multicast service that is caused by the handover of the first terminal device between the access network devices is further reduced.

In a possible design, the first message further includes information about the target access network device. Based on this solution, the first network device may determine, based on the information about the target access network device, that the target access network device is located in a service range of the first multicast service, and further may establish the first multicast session corresponding to the first multicast service for the target access network device.

In a possible design, the first message further includes first information of the first multicast service, the first information of the first multicast service includes at least one of first path information or an identifier of the first multicast session, the first path information includes an Internet Protocol (IP) address of the target access network device and a first tunnel identifier, and the first tunnel identifier is for identifying a unicast tunnel through which the target access network device receives the data of the first multicast service.

Based on this solution, when the first information of the first multicast service includes the identifier of the first multicast session, the first network device may subsequently modify the first multicast session based on the identifier of the first multicast session and perform another operation, and when the first information of the first multicast service includes the first path information, a tunnel between a user plane network element and the target access network device may be established for transmitting the data of the first multicast service so that the data of the first multicast service can be transmitted from the user plane network element to the target access network device, and then transmitted from the target access network device to the first terminal device.

In a possible design, the communication method further includes that the target access network device receives second information of the first multicast service, where the second information of the first multicast service includes at least one of second path information or an identifier of the first multicast session, the second path information includes a multicast address and a second tunnel identifier, the multicast address is used by the target access network device to receive the data of the first multicast service in the multicast mode, and the second tunnel identifier is for identifying a multicast tunnel through which the target access network device receives the data of the first multicast service in the multicast mode.

Based on this solution, when the second information of the first multicast service includes the identifier of the first multicast session, the target network device may subsequently enable the first terminal device to join the first multicast session, and when the second information of the first multicast service includes the second path information, the target access network device may receive the data of the first multicast service based on the second path information so that the data of the first multicast service is transmitted to the first terminal device.

In a possible design, the communication method further includes that the target access network device sends first indication information and third information of the first multicast service, where the first indication information is for indicating the first terminal device to move to the target access network device, the third information of the first multicast service includes at least one of the first identifier, the identifier of the first multicast session corresponding to the first multicast service, or information about a first QoS flow of the first multicast service, and the first QoS flow is a part or all of the QoS flow of the first multicast service.

According to a second aspect, a communication method and a corresponding apparatus are provided. This solution is applied to a scenario in which a first terminal device moves from a source access network device to a target access network device. In this solution, a first network device receives a first message, where the first message includes a first identifier, the first identifier is for identifying a first multicast service, and the first message is used by the target access network device to request to establish a first multicast session corresponding to the first multicast service, and the first network device establishes the first multicast session corresponding to the first multicast service when the target access network device is located in a service range of the first multicast service.

Based on this solution, the first multicast session corresponding to the first multicast service may be established on the target access network device, and further a transmission path of data of the first multicast service from a provider of the first multicast service to the target access network device is established. Therefore, continuity of the first multicast service is ensured, and a delay of the multicast service that is caused by handover of the first terminal device between access network devices is further reduced.

In a possible design, the first message further includes information about the target access network device, and the communication method further includes that the first network device determines, based on the information about the target access network device, that the target access network device is located in the service range of the first multicast service.

In a possible design, the first message further includes first information of the first multicast service, the first information of the first multicast service includes at least one of first path information or an identifier of the first multicast session, the first path information includes an IP address of the target access network device and a first tunnel identifier, and the first tunnel identifier is for identifying a unicast tunnel through which the target access network device receives data of the first multicast service.

In a possible design, the first information of the first multicast service includes the first path information, and the communication method further includes that the first network device sends the first path information to a second network device.

Based on this solution, when the first information of the first multicast service includes the identifier of the first multicast session, the first network device may subsequently modify the first multicast session based on the identifier of the first multicast session and perform another operation, and when the first information of the first multicast service includes the first path information, a tunnel between a user plane network element and the target access network device may be established for transmitting the data of the first multicast service so that the data of the first multicast service can be transmitted from the user plane network element to the target access network device, and then transmitted from the target access network device to the first terminal device.

In a possible design, the communication method further includes that the first network device sends at least one of second path information or the identifier of the first multicast session, where the second path information includes a multicast address and a second tunnel identifier, the multicast address is used by the target access network device to receive the data of the first multicast service in a multicast mode, and the second tunnel identifier is for identifying a multicast tunnel through which the target access network device receives the data of the first multicast service in the multicast mode.

Based on this solution, when the first network device sends the identifier of the first multicast session, the target network device may subsequently enable the first terminal device to join the first multicast session, and when the first network device sends the second path information, the target access network device may receive the data of the first multicast service based on the second path information, so that the data of the first multicast service is transmitted to the first terminal device.

In a possible design, the communication method further includes that the first network device obtains policy information of the first multicast service, where the policy information of the first multicast service includes the service range of the first multicast service.

In a possible design, the communication method further includes that the first network device receives a second message, where the second message is for requesting the first network device to allow the first terminal device to receive the data of the first multicast service through the target access network device. The first network device sends second indication information, where the second indication information is for indicating that the first terminal device is allowed to receive the data of the first multicast service through the target access network device.

Based on this solution, the target access network device continues to send the data of the first multicast service to the first terminal device when the first network device allows the first terminal device to receive the data of the first multicast service through the target access network device. This can avoid a case of still sending the data of the first multicast service to the first terminal device when the first terminal device is not allowed to receive the first multicast service.

In a possible design, the policy information of the first multicast service includes an identifier of a terminal device that is allowed to receive the data of the first multicast service, the second message includes an identifier of the first terminal device, and the communication method further includes that when the identifier of the terminal device that is allowed to receive the data of the first multicast service includes the identifier of the first terminal device, the first network device determines that the first terminal is allowed to receive the data of the first multicast service through the target access network device.

According to a third aspect, a communication method and a corresponding apparatus are provided. This solution is applied to a scenario in which a first terminal device moves from a source access network device to a target access network device. In this solution, the source access network device sends a first identifier to the target access network device, where the first identifier is for identifying a first multicast service, the source access network device receives wireless configuration information from the target access network device, where the wireless configuration information corresponds to a transmission mode for transmitting data of the first multicast service between the target access network device and the first terminal device, and the transmission mode includes a unicast mode or a multicast mode, and the source access network device sends the wireless configuration information to the first terminal device. For technical effects brought by the third aspect and the possible designs of the third aspect, refer to the technical effects brought by the first aspect and the possible designs of the first aspect. Details are not described herein again.

In a possible design, the transmission mode is the multicast mode, the wireless configuration information includes scheduling indication information, the scheduling indication information is for determining scheduling information of the first multicast service, and the scheduling information is for indicating a wireless resource for transmitting the first multicast service.

In a possible design, the communication method further includes that the source access network device sends signal measurement information of a target cell to the target access network device, where the target cell belongs to the target access network device, and the signal measurement information is used by the target access network device to determine the transmission mode.

In a possible design, the communication method further includes that the source access network device sends information about a QoS flow of the first multicast service to the target access network device.

In a possible design, the communication method further includes that the source access network device obtains a context of a second multicast session based on the first identifier, or the source access network device obtains a context of a second multicast session based on an identifier of the second multicast session, where the context of the second multicast session includes the information about the QoS flow of the first multicast service, and the second multicast session is a multicast session that corresponds to the first multicast service and that is established by the source access network device.

In a possible design, the communication method further includes that the source access network device obtains, from a context of the first terminal device, the first identifier or an identifier of the multicast session that corresponds to the first multicast service and that is established by the source access network device.

Based on this solution, the source access network device may send the first identifier to the target access network device, and further the first multicast service that is identified by the first identifier and joined by the first terminal device is handed over to the target access network device. This prevents the first terminal device from re-performing a procedure of joining the first multicast service after being handed over to the target access network device, and there- fore reduces a delay of the first multicast service that is caused by handover between access network devices.

According to a fourth aspect, a communication method and a corresponding apparatus are provided. This solution is applied to a scenario in which a first terminal device moves from a source access network device to a target access network device. In this solution, a first network device receives a first identifier and information about the target access network device, where the first identifier is for identifying a first multicast service, the first network device determines, based on the first identifier and the information about the target access network device, that the target access network device has not established a multicast session corresponding to the first multicast service, and the first network device sends a third message, where the third message is for requesting the target access network device to establish a first multicast session corresponding to the first multicast service.

Based on this solution, the first multicast session corre- sponding to the first multicast service may be established on the target access network device, and further a transmission path of data of the first multicast service from a provider of the first multicast service to the target access network device is established. Therefore, continuity of the first multicast service is ensured, and a delay of the multicast service that is caused by handover of the first terminal device between access network devices is further reduced.

In a possible design, the third message includes at least one of second path information or an identifier of the first multicast session corresponding to the first multicast service, the second path information includes a multicast address and a second tunnel identifier, the multicast address is used by the target access network device to receive data of the first multicast service in a multicast mode, and the second tunnel identifier is for identifying a multicast tunnel through which the target access network device receives the data of the first multicast service in the multicast mode.

Based on this solution, when the third message includes the identifier of the first multicast session, the target network device may subsequently enable the first terminal device to join the first multicast session, and when the third message includes the second path information, the target access network device may receive the data of the first multicast service based on the second path information so that the data of the first multicast service is transmitted to the first terminal device.

In a possible design, the communication method further includes that he first network device receives at least one of first path information or the identifier of the first multicast session corresponding to the first multicast service, where the first path information includes an IP address of the target access network device and a first tunnel identifier, and the first tunnel identifier is for identifying a unicast tunnel through which the target access network device receives the data of the first multicast service.

Based on this solution, when the identifier of the first multicast session is received, the first network device may subsequently modify the first multicast session based on the identifier of the first multicast session and perform another operation, and when the first path information is received, a tunnel between a user plane network element and the target access network device may be established for transmitting the data of the first multicast service so that the data of the first multicast service can be transmitted from the user plane network element to the target access network device, and then transmitted from the target access network device to the first terminal device.

In a possible design, the first network device sends a third message includes that the first network device sends the third message when the target access network device is located in a service range of the first multicast service.

In a possible design, the communication method further includes that the first network device determines, based on the information about the target access network device, that the target access network device is located in the service range of the first multicast service.

In a possible design, the communication method further includes that the first network device obtains policy infor- mation of the first multicast service, where the policy information of the first multicast service includes the service range of the first multicast service.

In a possible design, the communication method further includes that the first network device receives a fourth message, where the fourth message is for requesting the first network device to allow the first terminal device to receive the data of the first multicast service through the target access network device. The first network device sends third indication information, where the third indication informa- tion is for indicating that the first terminal device is allowed to receive the data of the first multicast service through the target access network device.

Based on this solution, the target access network device continues to send the data of the first multicast service to the first terminal device when the first network device allows the first terminal to receive the data of the first multicast service through the target access network device. This can avoid a case of still sending the data of the first multicast service to the first terminal device when the first terminal device is not allowed to receive the first multicast service.

In a possible design, the policy information of the first multicast service includes an identifier of a terminal device that is allowed to receive the data of the first multicast service, the fourth message includes an identifier of the first terminal device, and the communication method further includes that when the identifier of the terminal device that is allowed to receive the data of the first multicast service includes the identifier of the first terminal device, the first network device determines that the first terminal is allowed to receive the data of the first multicast service through the target access network device.

According to a fifth aspect, a communication method and a corresponding apparatus are provided. This solution is applied to a scenario in which a first terminal device moves from a source access network device to a target access network device. In this solution, a first session management network element receives first indication information and first identification information, where the first indication information is for indicating the first terminal device to move to the target access network device, the first identifi- cation information is a first identifier or an identifier of a first protocol data unit (PDU) session, the first identifier is for identifying a first multicast service, and the first PDU session is a PDU session used when the first terminal device joins the first multicast service, and the first session man- agement network element sends the first identifier and information about the target access network device to a first network device based on the first indication information.

Based on this solution, because the first session manage- ment network element sends the first identifier and the information about the target access network device to the first network device, the first network device may establish a first multicast session corresponding to the first multicast service on the target access network device, and further may establish a transmission path of data of the first multicast service from a provider of the first multicast service to the target access network device. Therefore, continuity of the first multicast service is ensured, and a delay of the multicast service that is caused by handover of the first terminal device between access network devices is further reduced.

In a possible design, the first identification information is the identifier of the first PDU session, and the communication method further includes that the first session management network element obtains, based on the identifier of the first PDU session, the first identifier from a context corresponding to the first PDU session.

In a possible design, the communication method further includes that the first session management network element receives an identifier of a first multicast session corresponding to the first multicast service from the first network device. The first session management network element sends the identifier of the first multicast session corresponding to the first multicast service to the target access network device so that the target access network device enables the first terminal device to join the first multicast session.

In a possible design, the communication method further includes that the first session management network element sends a fourth message to the first network device, where the fourth message is for requesting the first network device to allow the first terminal device to receive data of the first multicast service through the target access network device. The first session management network element receives third indication information from the first network device, where the third indication information is for indicating that the first terminal is allowed to receive the data of the first multicast service through the target access network device.

Based on this solution, the target access network device continues to send the data of the first multicast service to the first terminal device when the first network device allows the first terminal to receive the data of the first multicast service through the target access network device. This can avoid a case of still sending the data of the first multicast service to the first terminal device when the first terminal device is not allowed to receive the first multicast service.

In a possible design, the communication method further includes that the first session management network element determines that the first terminal device is allowed to receive the data of the first multicast service through the target access network device.

In a possible design, that the first session management network element determines that the first terminal device is allowed to receive the data of the first multicast service through the target access network device includes that the first session management network element obtains policy information of the first terminal device, where the policy information of the first terminal device includes area information for receiving the data of the first multicast service by the first terminal device. When the target access network device is located in an area indicated by the area information, the first session management network element determines that the first terminal device is allowed to receive the data of the first multicast service through the target access network device.

Based on this solution, the target access network device continues to send the data of the first multicast service to the first terminal device only when the first session management network element allows the first terminal to receive the data of the first multicast service through the target access network device. This can avoid a case of still sending the data of the first multicast service to the first terminal device when the first terminal device is not allowed to receive the first multicast service.

In a possible design, the communication method further includes that the first session management network element receives information about a first QoS flow of the first multicast service from the target access network device, where the first QoS flow is a part or all of a QoS flow of the first multicast service. Based on this solution, the first session management network element may subsequently perform processing such as charging based on the information about the first QoS flow.

According to a sixth aspect, a communication method and a corresponding apparatus are provided. This solution is applied to a scenario in which a first terminal device moves from a source access network device to a target access network device. In this solution, a first session management network element receives first indication information and first identification information, where the first indication information is for indicating the first terminal device to move to the target access network device, the first identification information is a first identifier or an identifier of a first PDU session, the first identifier is for identifying a first multicast service, and the first PDU session is a PDU session used when the first terminal device joins the first multicast service, the first session management network element determines, based on the first identification information and information about the target access network device, that the target access network device has not established a multicast session corresponding to the first multicast service, and the first session management network element sends a fifth message to the target access network device, where the fifth message is for requesting the target access network device to establish a first multicast session corresponding to the first multicast service.

Based on this solution, the first session management network element may establish the first multicast session corresponding to the first multicast service on the target access network device, and further may establish a transmission path of data of the first multicast service from a provider of the first multicast service to the target access network device. Therefore, continuity of the first multicast service is ensured, and a delay of the multicast service that is caused by handover of the first terminal device between access network devices is further reduced.

In a possible design, the fifth message includes at least one of second path information or an identifier of the first multicast session corresponding to the first multicast service, the second path information includes a multicast address and a second tunnel identifier, the multicast address is used by the target access network device to receive data of the first multicast service in a multicast mode, and the second tunnel identifier is for identifying a multicast tunnel through which the target access network device receives the data of the first multicast service in the multicast mode.

Based on this solution, when the fifth message includes the identifier of the first multicast session, the target network device may subsequently enable the first terminal device to join the first multicast session, and when the fifth message includes the second path information, the target access network device may receive the data of the first multicast service based on the second path information, so that the data of the first multicast service is transmitted to the first terminal device.

In a possible design, the communication method further includes that a first network device receives at least one of first path information or an identifier of the first multicast session corresponding to the first multicast service, where the first path information includes an IP address of the target access network device and a first tunnel identifier, and the first tunnel identifier is for identifying a unicast tunnel through which the target access network device receives data of the first multicast service.

Based on this solution, when the identifier of the first multicast session is received, the first network device may subsequently modify the first multicast session based on the identifier of the first multicast session and perform another operation, and when the first path information is received, a tunnel between a user plane network element and the target access network device may be established for transmitting the data of the first multicast service so that the data of the first multicast service can be transmitted from the user plane network element to the target access network device, and then transmitted from the target access network device to the first terminal device.

In a possible design, the first session management network element determines, based on the first identification information and information about the target access network device, that the target access network device has not established a multicast session corresponding to the first multicast service includes that the first session management network element sends a sixth message to a fourth network device, where the sixth message is for querying for a multicast session that corresponds to the first multicast service and that is established by the target access network device, and the sixth message includes the first identifier and the information about the target access network device. The first session management network element receives fourth indication information from the fourth network device, where the fourth indication information is for indicating that the target access network device has not established the multicast session corresponding to the first multicast service.

In a possible design, the communication method further includes that the first session management network element sends a seventh message to the fourth network device, where the seventh message is for registering the first multicast session with the fourth network device, and the seventh message includes the information about the target access network device, the first identifier, and the identifier of the first multicast session.

In a possible design, the first session management network element sends a fifth message to the target access network device includes that the first session management network element sends the fifth message when the target access network device is located in a service range of the first multicast service.

In a possible design, the communication method further includes that the first session management network element determines, based on the information about the target access network device, that the target access network device is located in the service range of the first multicast service.

In a possible design, the communication method further includes that the first session management network element obtains policy information of the first multicast service, where the policy information includes the service range of the first multicast service.

According to a seventh aspect, a communication apparatus is provided, to implement the foregoing methods. The communication apparatus may be the target access network device in the first aspect or an apparatus including the target access network device, the communication apparatus may be the first network device in the second aspect or the fourth aspect or an apparatus including the first network device, the communication apparatus may be the source access network device in the third aspect or an apparatus including the source access network device, or the communication apparatus may be the first session management network element in the fifth aspect or the sixth aspect or an apparatus including the first session management network element. The communication apparatus includes a corresponding module, unit, or means for implementing the foregoing methods. The module, unit, or means may be implemented by hardware, software, or hardware executing corresponding software. The hardware or the software includes one or more modules or units corresponding to the foregoing functions.

According to an eighth aspect, a communication apparatus is provided. The apparatus includes a processor, and may further include a memory. The memory is configured to store computer instructions. When the processor executes the instructions, the communication apparatus is enabled to perform the method according to any one of the foregoing aspects. The communication apparatus may be the target access network device in the first aspect or an apparatus including the target access network device, the communication apparatus may be the first network device in the second aspect or the fourth aspect or an apparatus including the first network device; or the communication apparatus may be the source access network device in the third aspect or an apparatus including the source access network device, or the communication apparatus may be the first session management network element in the fifth aspect or the sixth aspect or an apparatus including the first session management network element.

According to a ninth aspect, a communication apparatus is provided. The communication apparatus includes a processor. The processor is configured to be coupled to a memory, and after reading instructions in the memory, perform the method according to any one of the foregoing aspects based on the instructions. The communication apparatus may be the target access network device in the first aspect or an apparatus including the target access network device, the communication apparatus may be the first network device in the second aspect or the fourth aspect or an apparatus including the first network device, the communication apparatus may be the source access network device in the third aspect or an apparatus including the source access network device, or the communication apparatus may be the first session management network element in the fifth aspect or the sixth aspect or an apparatus including the first session management network element.

According to a tenth aspect, a computer-readable storage medium is provided. The computer-readable storage medium stores instructions. When the instructions are run on a computer, the computer is enabled to perform the method according to any one of the foregoing aspects.

According to an eleventh aspect, a computer program product including instructions is provided. When the computer program product runs on a computer, the computer is enabled to perform the method according to any one of the foregoing aspects.

According to a twelfth aspect, a communication apparatus (where for example, the communication apparatus may be a chip or a chip system) is provided. The communication apparatus includes a processor, configured to implement the function in any one of the foregoing aspects. In a possible design, the communication apparatus further includes a memory. The memory is configured to store program instructions and data that are necessary. When the communication apparatus is the chip system, the communication apparatus may include a chip, or may include the chip and another discrete component.

According to a thirteenth aspect, a communication apparatus is provided. The communication apparatus includes a processor and an interface circuit. The interface circuit may be a code/data read/write interface circuit, and the interface circuit is configured to receive computer-executable instructions (where the computer-executable instructions are stored in a memory, and may be directly read from the memory or may be read through another component) and transmit the computer-executable instructions to the processor. The processor is configured to run the computer-executable instructions to perform the method according to any one of the foregoing aspects.

For technical effects brought by any design of the seventh aspect to the thirteenth aspect, refer to technical effects brought by different designs of the first aspect, the second aspect, the third aspect, the fourth aspect, the fifth aspect, or the sixth aspect. Details are not described herein again.

According to a fourteenth aspect, a communication method is provided. The communication method is applied to a scenario in which a first terminal device moves from a source access network device to a target access network device, and the communication method includes that the source access network device sends a first identifier to the target access network device, where the first identifier is for identifying a first multicast service. Correspondingly, the target access network device receives the first identifier from the source access network device, and determines a transmission mode for transmitting data of the first multicast service between the target access network device and the first terminal device, where the transmission mode includes a unicast mode or a multicast mode. Then, the target access network device sends wireless configuration information corresponding to the transmission mode to the source access network device. After receiving the wireless configuration information, the source access network device sends the wireless configuration information to the first terminal device.

In a possible design, the transmission mode is the multicast mode, the wireless configuration information includes scheduling indication information, the scheduling indication information is for determining scheduling information of the first multicast service, and the scheduling information is for indicating a wireless resource for transmitting the first multicast service.

In a possible design, the communication method further includes that the target access network device receives signal measurement information of a target cell from the source access network device, where the target cell belongs to the target access network device. The target access network device determines a transmission mode for transmitting data of the first multicast service between the target access network device and the first terminal device includes that the target access network device determines the transmission mode based on the signal measurement information and/or a first quantity, where the first quantity is a quantity of terminal devices that receive the data of the first multicast service through the target access network device.

In a possible design, the communication method further includes that the target access network device sends a first message to a first network device, where the first message includes the first identifier, and the first message is for requesting to establish a first multicast session corresponding to the first multicast service. Correspondingly, the first network device receives the first message, and establishes the first multicast session corresponding to the first multicast service when the target access network device is located in a service range of the first multicast service.

In a possible design, the first message further includes first information of the first multicast service, the first information of the first multicast service includes at least one of first path information or an identifier of the first multicast session, the first path information includes an IP address of the target access network device and a first tunnel identifier, and the first tunnel identifier is for identifying a unicast tunnel through which the target access network device receives the data of the first multicast service.

In a possible design, the communication method further includes that the target access network device receives second information of the first multicast service, where the second information of the first multicast service includes at least one of second path information or an identifier of the first multicast session, the second path information includes a multicast address and a second tunnel identifier, the multicast address is used by the target access network device to receive the data of the first multicast service in the multicast mode, and the second tunnel identifier is for identifying a multicast tunnel through which the target access network device receives the data of the first multicast service in the multicast mode.

In a possible design, the target access network device sends first indication information and third information of the first multicast service, where the first indication information is for indicating the first terminal device to move to the target access network device, the third information of the first multicast service includes at least one of the first identifier, the identifier of the first multicast session corresponding to the first multicast service, or information about a first QoS flow of the first multicast service, and the first QoS flow is a part or all of a QoS flow of the first multicast service.

In a possible design, the communication method further includes that a first network device receives the first identifier and information about the target access network device, where the first identifier is for identifying the first multicast service. The first network device determines, based on the first identifier and the information about the target access network device, that the target access network device has not established a multicast session corresponding to the first multicast service. The first network device sends a third message, where the third message is for requesting the target access network device to establish the first multicast session corresponding to the first multicast service.

In a possible design, the communication method further includes that a first session management network element receives the first indication information and first identification information, where the first indication information is for indicating the first terminal device to move to the target access network device, the first identification information is the first identifier or an identifier of a first PDU session, the first identifier is for identifying the first multicast service, and the first PDU session is a PDU session used when the first terminal device joins the first multicast service. The first session management network element sends the first identifier and the information about the target access network device to the first network device based on the first indication information.

In a possible design, the communication method further includes that a first session management network element receives the first indication information and first identification information, where the first indication information is for indicating the first terminal device to move to the target access network device, the first identification information is the first identifier or an identifier of a first PDU session, the first identifier is for identifying the first multicast service, and the first PDU session is a PDU session used when the first terminal device joins the first multicast service. The first session management network element determines, based on the first identification information and information about the target access network device, that the target access network device has not established a multicast session corresponding to the first multicast service. The first session management network element sends a fifth message to the target access network device, where the fifth message is for requesting the target access network device to establish the first multicast session corresponding to the first multicast service.

For technical effects brought by any design of the fourteenth aspect, refer to technical effects brought by different designs of the first aspect, the second aspect, the third aspect, the fourth aspect, the fifth aspect, or the sixth aspect. Details are not described herein again.

According to a fifteenth aspect, a communication system is provided. The communication system includes a target access network device and a source access network device. The target access network device is configured to perform steps performed by a target access network device in the first aspect or in solutions provided in embodiments of this application. The source access network device is configured to perform steps performed by a source access network device in the third aspect or in solutions provided in embodiments of this application.

In a possible design, the communication system may further include a first network device or a first session management network element. The first network device is configured to perform steps performed by a first network device in the second aspect or the fourth aspect or in solutions provided in embodiments of this application. The first session management network element is configured to perform steps performed by a first session management network element in the fifth aspect or the sixth aspect or in solutions provided in embodiments of this application.

In a possible design, the communication system may further include another device that interacts with the target access network device, the source access network device, the first network device, or the first session management network element in the solutions provided in embodiments of this application, for example, a second network device, a third network device, a fourth network device, or a user plane network element. This is not specifically limited in embodiments of this application.

These aspects or other aspects of this application are clearer and more comprehensible in descriptions of the following embodiments.

BRIEF DESCRIPTION OF DRAWINGS

FIG. 4 is a first schematic flowchart of a communication method according to an embodiment of this application;

FIG. 5 is a second schematic flowchart of a communication method according to an embodiment of this application;

FIG. 6 is a third schematic flowchart of a communication method according to an embodiment of this application;

FIG. 7 is a fourth schematic flowchart of a communication method according to an embodiment of this application;

FIG. 8 is a fifth schematic flowchart of a communication method according to an embodiment of this application;

FIG. 9 is a sixth schematic flowchart of a communication method according to an embodiment of this application;

DETAILED DESCRIPTION OF EMBODIMENTS

The following describes technical solutions in embodiments of this application with reference to the accompanying drawings in embodiments of this application. In descriptions of this application, unless otherwise specified, "/" represents an "or" relationship between associated objects. For example, A/B may represent A or B. In this application, "and/or" describes only an association relationship between associated objects and represents that three relationships may exist. For example, A and/or B may represent the following three cases: Only A exists, both A and B exist, and only B exists, where A or B may be singular or plural. In addition, in descriptions of this application, unless otherwise specified, "a plurality of" means two or more than two. At least one of the following items (pieces) or a similar expression thereof refers to any combination of these items, including any combination of singular items (pieces) or plural items (pieces). For example, at least one of a, b, or c may indicate: a, b, c, a and b, a and c, b and c, or a, b, and c, where a, b, and c may be singular or plural. In addition, to clearly describe technical solutions in embodiments of this application, terms such as "first" and "second" are used in embodiments of this application to distinguish between same items or similar items that have basically same functions and purposes. A person skilled in the art may understand that the terms such as "first" and "second" do not limit a quantity or an execution sequence, and the terms such as "first" and "second" do not indicate a definite difference.

In addition, a communication method provided in embodiments of this application is applicable to a plurality of system architectures. A network architecture and a service scenario described in embodiments of this application are intended to describe technical solutions in embodiments of this application more clearly, and do not constitute a limitation on technical solutions provided in embodiments of this application. A person of ordinary skill in the art may know that: With evolution of the network architecture and emergence of new service scenarios, technical solutions provided in embodiments of this application are also applicable to similar technical problems.

Figures 1A, 1B:
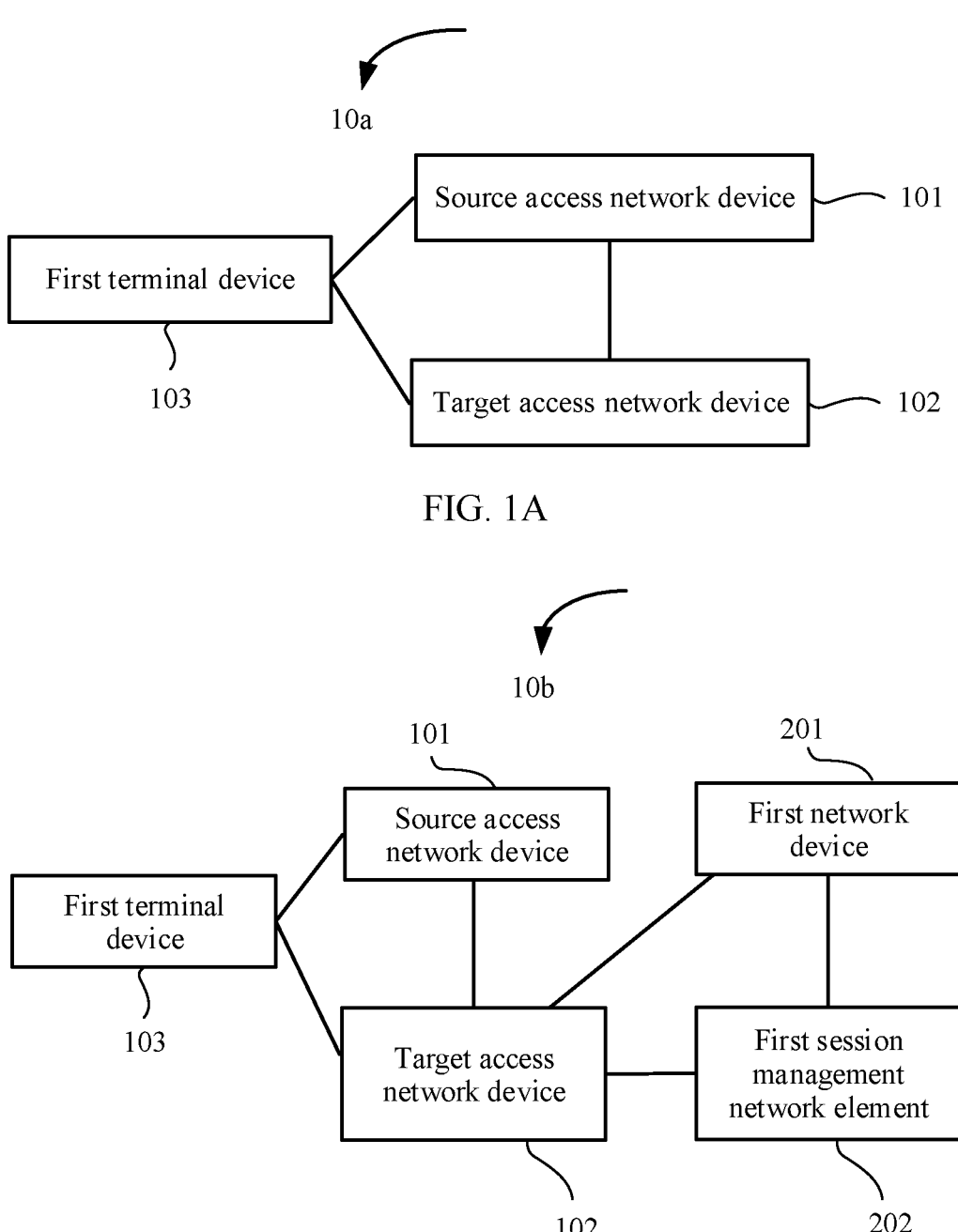
FIG. 1A is a first schematic diagram of a structure of a communication system according to an embodiment of this application.
FIG. 1B is a second schematic diagram of a structure of a communication system according to an embodiment of this application.

FIG. 1A shows a communication system 10*a* according to an embodiment of this application. The communication system 10*a* includes a source access network device 101, a target access network device 102, and a first terminal device 103. As shown in FIG. 1A, before the first terminal device 103 moves, the first terminal device 103 accesses a network through the source access network device 101; after the first terminal moves (or is handed over), the first terminal device 103 accesses the network through the target access network device 102.

The target access network device 102 is configured to receive a first identifier from the source access network device 101, where the first identifier is for identifying a first multicast service. The target access network device 102 is further configured to determine a transmission mode for transmitting data of the first multicast service between the target access network device 102 and the first terminal device, where the transmission mode includes a unicast mode or a multicast mode. The target access network device 102 is further configured to send wireless configuration information corresponding to the transmission mode to the first terminal device 103 through the source access network device 101.

The source access network device 101 is configured to: send the first identifier to the target access network device 102, and receive the wireless configuration information from the target access network device 102. The source access network device 101 is further configured to send the wireless configuration information to the first terminal device 103.

In the communication system provided in embodiments of this application, before the first terminal device moves from the source access network device to the target access network device, the source access network device sends, to the target access network device, the first identifier for identifying the first multicast service. In this way, the target access network device can determine the transmission mode for transmitting the data of the first multicast service between the target access network device and the first terminal device, and send the wireless configuration information corresponding to the transmission mode to the source access network device. Further, the source access network device may send the wireless configuration information to the first terminal device. Subsequently, when the first terminal device moves to the target access network device or is handed over to the target access network device, the first terminal device may perform configuration based on the wireless configuration information that is sent by the target access network device through the source access network device before handover, without waiting for the target access network device to deliver configuration information. In other words, based on the communication system provided in embodiments of this application, before the first terminal device moves or is handed over, the wireless configuration information used when the multicast service is transmitted may be sent to the first terminal device. Therefore, a delay of the multicast service that is caused by the handover of the first terminal device between access network devices is reduced.

Optionally, the source access network device 101 or the target access network device 102 is a device that provides a wireless communication function for the first terminal device 103. For example, the source access network device 101 or the target access network device 102 includes but is not limited to: a next-generation NodeB (gNB) in 5G (where for example, the source access network device 101 is an S-gNB, and the target access network device 102 is a T-gNB), an evolved NodeB (eNB) (where for example, the source access network device 101 is an S-eNB, and the target access network device 102 is a T-eNB), a radio network controller (RNC) (where for example, the source access network device 101 is an S-RNC, and the target access network device 102 is an S-RNC), a NodeB (NB) (where for example, the source access network device 101 is an S-NB, and the target access network device 102 is an S-NB), a base station controller (BSC) (where for example, the source access network device 101 is an S-BSC, and the target access network device 102 is a T-BSC), a base transceiver station (BTS) (where for example, the source access network device 101 is an S-BTS, and the target access network device 102 is an S-BTS), a home base station (for example, a home evolved NodeB, or a home NodeB, HNB) (where for example, the source access network device 101 is an S-HNB, and the target access network device 102 is a T-HNB), a baseband unit (BBU) (where for example, the source access network device 101 is an S-BBU, and the target access network device 102 is a T-BBU), a transmission point (TRP) (where for example, the source access network device 101 is an S-TRP, and the target access network device 102 is an S-TRP), a transmitting point (TP) (where for example, the source access network device 101 is an S-TP, and the target access network device 102 is an S-TP), a mobile switching center (where for example, the source access network device 101 is a mobile switching center 1, and the target access network device 102 is a mobile switching center 3), and the like.

Optionally, the first terminal device 103 is a device with a wireless transceiver function, for example, a terminal or a chip that can be used in the terminal. The first terminal device 103 may be deployed on land, where the deployment includes indoor or outdoor, or handheld or vehicle-mounted deployment, may be deployed on water (for example, on a ship), or may be deployed in air (for example, on an aerocraft, a balloon, or a satellite). The terminal may be user equipment (UE), an access terminal, a terminal unit, a terminal station, a mobile station, a remote station, a remote terminal, a mobile device, a wireless communication device, a terminal agent, a terminal apparatus, or the like in a 5G network or a future evolved PLMN. The access terminal may be a cellular phone, a cordless phone, a session initiation protocol (SIP) phone, a wireless local loop (WLL) station, a personal digital assistant (PDA), a handheld device having a wireless communication function, a computing device or another processing device connected to a wireless modem, a vehicle-mounted device or a wearable device, a virtual reality (VR) terminal device, an augmented reality (AR) terminal device, a wireless terminal in industrial control, a wireless terminal in self-driving, a wireless terminal in telemedicine (remote medical), a wireless terminal in a smart grid, a wireless terminal in transportation safety, a wireless terminal in a smart city, a wireless terminal in a smart home, or the like. The terminal may be mobile or at a fixed location.

FIG. 1B shows another communication system 10b to which an embodiment of this application is applicable. In addition to the source access network device 101, the target access network device 102, and the first terminal device 103 in FIG. 1A, the communication system 10b may further include a first network device 201 and a first session management network element 202.
In a Possible Implementation:

The first network device 201 is configured to receive a first message, where the first message includes a first identifier, the first identifier is for identifying a first multicast service, and the first message is used by the target access network device 102 to request to establish a first multicast session corresponding to the first multicast service. The first network device 201 is further configured to establish the first multicast session corresponding to the first multicast service when the target access network device 102 is located in a service range of the first multicast service.
In Another Possible Implementation:

The first network device 201 is configured to receive a first identifier and information about the target access network device 102, where the first identifier is for identifying a first multicast service. The first network device 201 is further configured to determine, based on the first identifier and the information about the target access network device 102, that the target access network device 102 has not established a multicast session corresponding to the first multicast service. The first network device 201 is further configured to send a third message, where the third message is for requesting the target access network device 102 to establish a first multicast session corresponding to the first multicast service.

The first session management network element 202 is configured to receive first indication information and first identification information, where the first indication information is for indicating the first terminal device 103 to move to the target access network device 102, the first identification information is the first identifier or an identifier of a first PDU session, the first identifier is for identifying the first multicast service, and the first PDU session is a PDU session used when the first terminal device 103 joins the first multicast service.

The first session management network element 202 is further configured to send the first identifier and the information about the target access network device 102 to the first network device 201 based on the first indication information.
In Still Another Possible Implementation:

The first session management network element 202 is configured to receive first indication information and first identification information, where the first indication information is for indicating the first terminal device 103 to move to the target access network device 102, the first identification information is a first identifier or an identifier of a first PDU session, the first identifier is for identifying a first multicast service, and the first PDU session is a PDU session used when the first terminal device 103 joins the first multicast service. The first session management network element 202 is further configured to determine, based on the first identification information and information about the target access network device 102, that the target access network device 102 has not established a multicast session corresponding to the first multicast service.

The first session management network element 202 is further configured to send a fifth message to the target access network device 102, where the fifth message is for requesting the target access network device 102 to establish a first multicast session corresponding to the first multicast service.

Based on the communication system provided in embodiments of this application, the first multicast session corresponding to the first multicast service may be established on the target access network device, and further a transmission path of data of the first multicast service from a source device (for example, a content provider (CP)) of the first multicast service to the target access network device is established. Therefore, continuity of the first multicast service is ensured.

Optionally, in addition to the foregoing functions, the first network device 201 may be further used for session management in a mobile network, for example, session establishment, modification, and release. In a 5G communication system, a network element or an entity corresponding to the first network device 201 may be a session management function (SMF) network element, a multicast control function (MCF) network element, or a multicast session management function (M-SMF) network element specially responsible for multicast service management and control in a 5G network architecture. The MCF network element may be integrated into a policy control function (PCF) network element. In future communication, for example, in a 6th generation (6G) communication system, the first network device 201 may still be the SMF network element, the MCF network element, or the M-SMF network element, or the first network device 201 has another name. This is not limited in embodiments of this application.

Optionally, in addition to the foregoing functions, the first session management network element 202 may be further used for session management in a mobile network, for example, session establishment, modification, and release. In a 5G communication system, a network element or an entity corresponding to the first session management network element 202 may be a SMF network element in a 5G network architecture. In future communication, for example, in a 6G communication system, the first session management network element 202 may still be the SMF network element, or the first session management network element 202 may have another name. This is not limited in embodiments of this application.

Figure 1C:
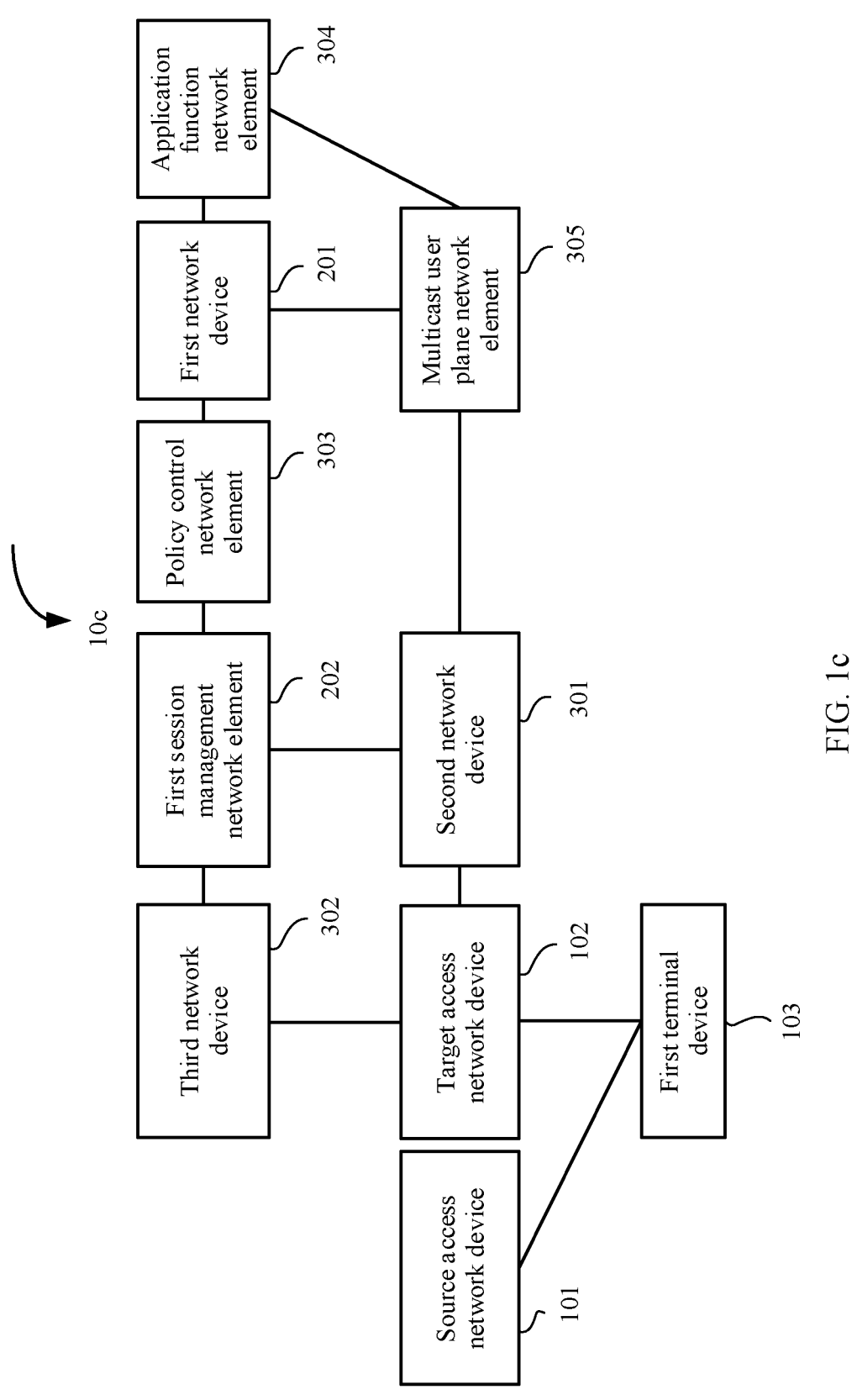
FIG. 1C is a third schematic diagram of a structure of a communication system according to an embodiment of this application.

FIG. 1C shows still another communication system 10c to which an embodiment of this application is applicable. In addition to the source access network device 101, the target access network device 102, and the first terminal device 103 in FIG. 1A, and the first network device 201 and the first session management network element 202 in FIG. 1B, the communication system 10c may further include a second network device 301, a third network device 302, a policy control network element 303, an application function network element 304, a multicast user plane network element 305, and the like.

The second network device 301 is mainly used for packet routing and forwarding, QoS processing of user plane data, and the like. In a 5G communication system, a network element or an entity corresponding to the second network device 301 may be a user plane function (UPF) network element, or a multicast user plane function (MUF) network element in a 5G network architecture. In future communication, for example, in a 6G communication system, the second network device 301 may still be the UPF network element, the M-UPF network element, or the MUF network element, or the second network device 301 may have another name. This is not limited in embodiments of this application.

The third network device 302 is used for mobility management in a mobile network, for example, user location update, registration of a user with a network, and user handover. In a 5G communication system, a network element or an entity corresponding to the third network device 302 may be an access and mobility management function (AMF) network element or a multicast access and mobility management function (M-AMF) network element specially responsible for a multicast service in a 5G network architecture. In future communication, for example, in a 6G communication system, the third network device 302 may still be the AMF network element or the M-AMF network element, or the third network device 302 has another name. This is not limited in embodiments of this application.

The policy control network element 303 is used for policy control, charging rule management, and the like. In a 5G communication system, a network element or an entity corresponding to the policy control network element 303 may be a PCF network element or a multicast policy control function (M-PCF) network element specially responsible for a multicast service in a 5G network architecture. In future communication, for example, in a 6G communication system, the policy control network element 303 may still be the PCF network element, or the policy control network element 303 has another name. This is not limited in embodiments of this application.

The application function network element 304 is mainly configured to provide application layer information for a 3rd Generation Partnership Project (3GPP) network. In embodiments of this application, the application function network element 304 may also be referred to as a CP. In a 5G communication system, the application function network element 304 may be an application function (AF) network element. In future communication, for example, in a 6G communication system, the application function network element 304 may still be the AF network element or have another name. This is not limited in embodiments of this application. For example, the AF network element may include a service capability server (SCS) or an application server (AS).

The multicast user plane network element 305 is configured to transfer a multicast packet, to be specific, send a multicast packet received from the application function network element 304 to a downlink node, that is, the second network device 301. In a 5G communication system, a network element or an entity corresponding to the multicast user plane network element 305 may be a UPF network element or an MUF network element in a 5G network architecture. In future communication, for example, in a 6G communication system, the multicast user plane network element 305 may still be the UPF network element or the MUF network element, or the multicast user plane network element 305 has another name. This is not limited in embodiments of this application.

Figure 2A:
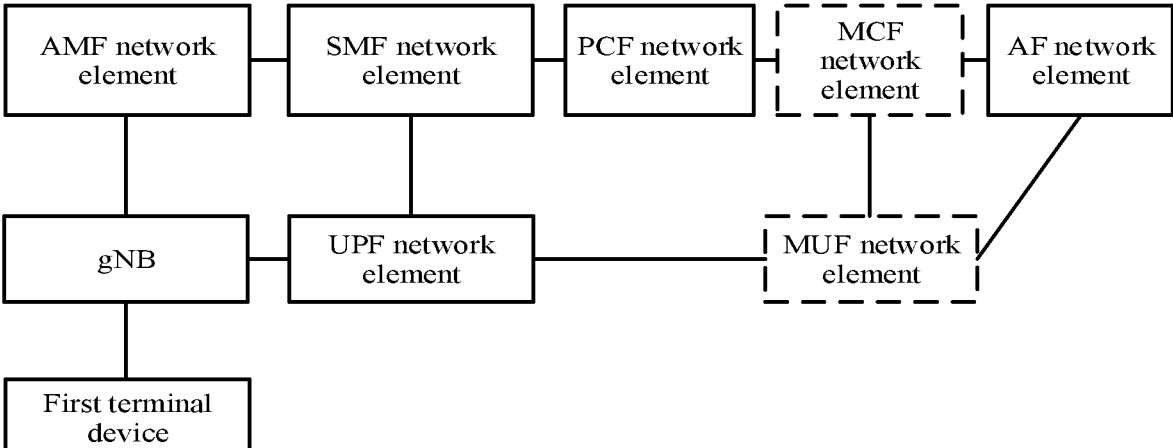
FIG. 2A is a first schematic diagram of application of a communication system in a 5G network according to an embodiment of this application.

In addition, as shown in FIG. 2A, a 5G communication system is used as an example. FIG. 2A is a schematic diagram of a specific possible network architecture to which an embodiment of this application is applicable. The network architecture includes the first terminal device, the source access network device and the target access network device (which are uniformly represented by a gNB in FIG. 2A), an SMF network element, an AMF network element, a PCF network element, an AF network element, and a UPF network element. The AF network element may directly communicate with the PCF network element, or may communicate with the PCF network element through a network exposure function (NEF) network element (not shown in FIG. 2A). Optionally, the network architecture may further include an MCF network element and an MUF network element. The MCF network element may interface with the AF network element and the PCF network element, and an MUF network element interfaces with the AF network element and the UPF network element, to transmit a multicast packet. The MCF network element may further interface with the MUF network element.

Figure 2B:
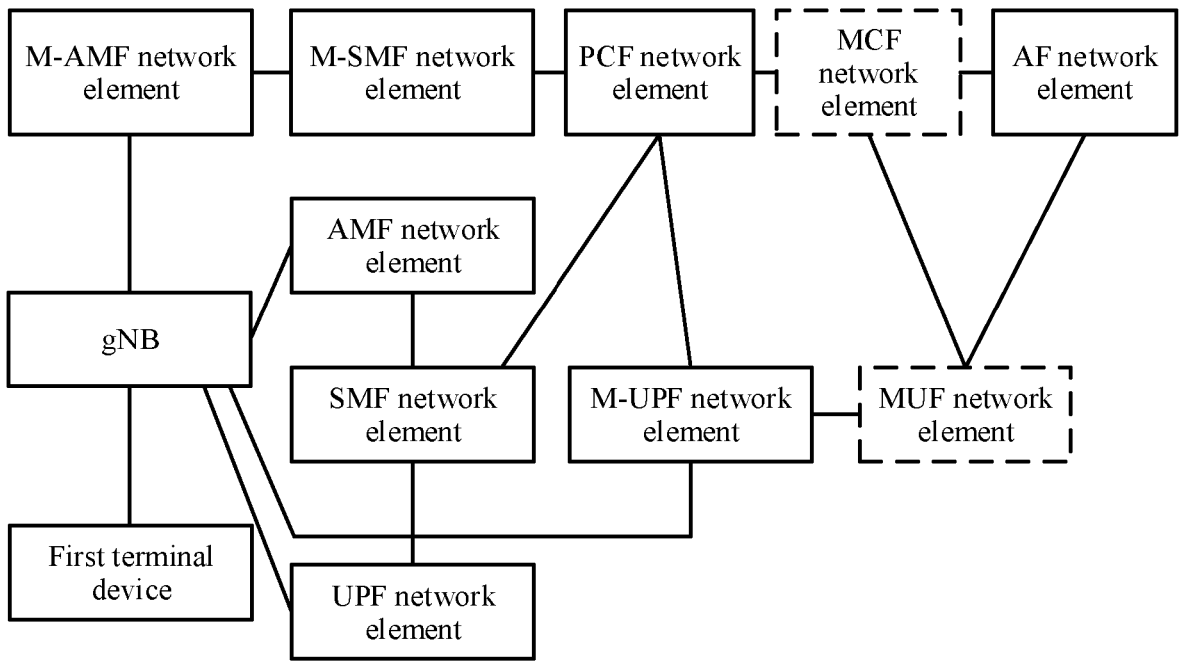
FIG. 2B is a second schematic diagram of application of a communication system in a 5G network according to an embodiment of this application.

As shown in FIG. 2B, a 5G communication system is used as an example. FIG. 2B is a schematic diagram of another specific possible network architecture to which an embodiment of this application is applicable. The network architecture includes the first terminal device, the source access network device and the target access network device (which are uniformly represented by a gNB in FIG. 2B), an AMF network element, an SMF network element, a UPF network element, an M-AMF network element, an M-SMF network element, a PCF network element, an M-UPF network element, and an AF network element. The AF network element may directly communicate with the PCF network element, or may communicate with the PCF network element through a NEF network element (not shown in FIG. 2B). Optionally, the network architecture may further include an MCF network element and an MUF network element. The MCF network element may interface with the AF network element and the PCF network element, and the MUF network element interfaces with the AF network element and the M-UPF network element, to transmit a multicast packet. The MCF network element may further interface with the MUF network element. The UPF network element is only responsible for data transfer of a unicast service of the first terminal device. A multicast service is sent to the first terminal device through the AF network element, the MUF network element, the M-UPF network element, and the gNB. The PCF network element performs QoS formulation and the like for the multicast service based on a description that is of the multicast service and that is obtained by the MCF network element. The M-AMF network element and the M-SMF network element are configured to create and manage a multicast session. The SMF network element interfaces with the PCF network element (or interfaces with the MCF network element, which is not shown in FIG. 2B) to obtain information about the multicast service, so that the first terminal device is enabled to join a multicast group.

Figure 2C:
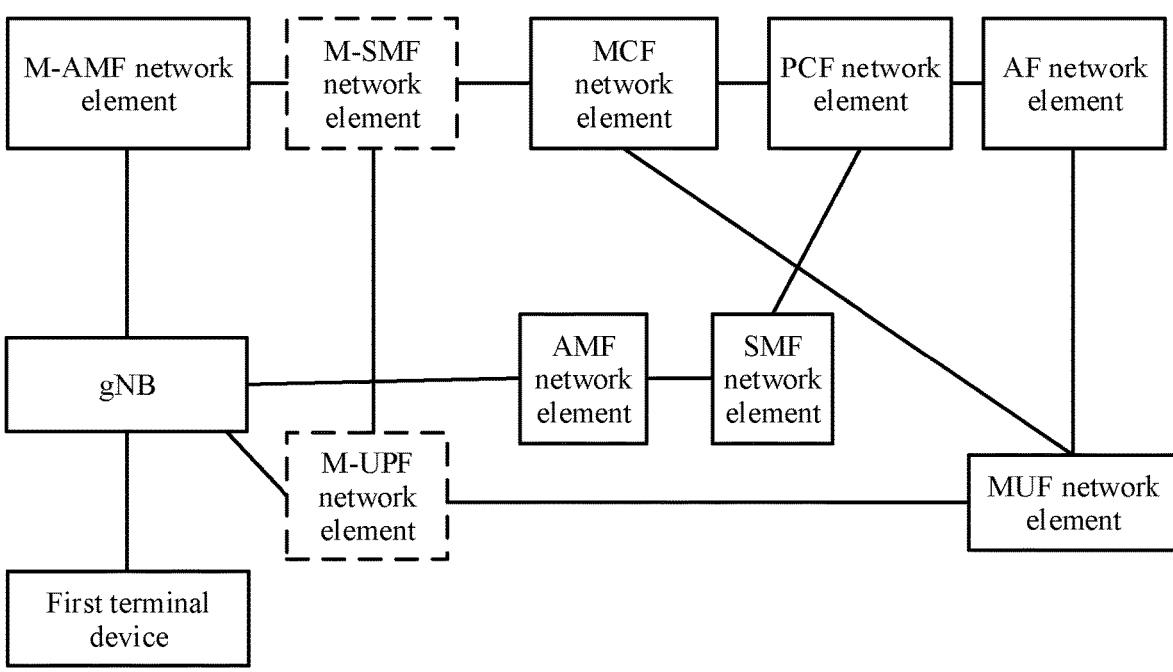
FIG. 2C is a third schematic diagram of application of a communication system in a 5G network according to an embodiment of this application.

As shown in FIG. 2C, a 5G communication system is used as an example. FIG. 2C is a schematic diagram of still another specific possible network architecture to which an embodiment of this application is applicable. The network architecture includes the first terminal device, the source access network device and the target access network device (which are uniformly represented by a gNB in FIG. 2C), an AMF network element, an SMF network element, an M-AMF network element, a PCF network element, an MCF network element, an MUF network element, an AF network element, and the like. Optionally, the network architecture may further include an M-SMF network element and an M-UPF network element. The AF network element interfaces with the PCF network element (or interfaces with a NEF network element, which is not shown in FIG. 2C), to send information about a multicast service to the PCF network element. If the AF network element interfaces with the NEF network element, the AF network element first sends the information about the multicast service to the NEF network element, and then the NEF network element sends the information to the PCF.

It may be understood that the foregoing network elements or functions may be network elements in a hardware device, may be software functions running on dedicated hardware, or may be virtualized functions instantiated on a platform (for example, a cloud platform). One or more services may be obtained through division into the network elements or the functions. Further, services that exist independently of network functions may occur. In this application, instances of the functions, instances of services included in the functions, or instances of services that exist independently of network functions may be referred to as service instances.

Figure 3:
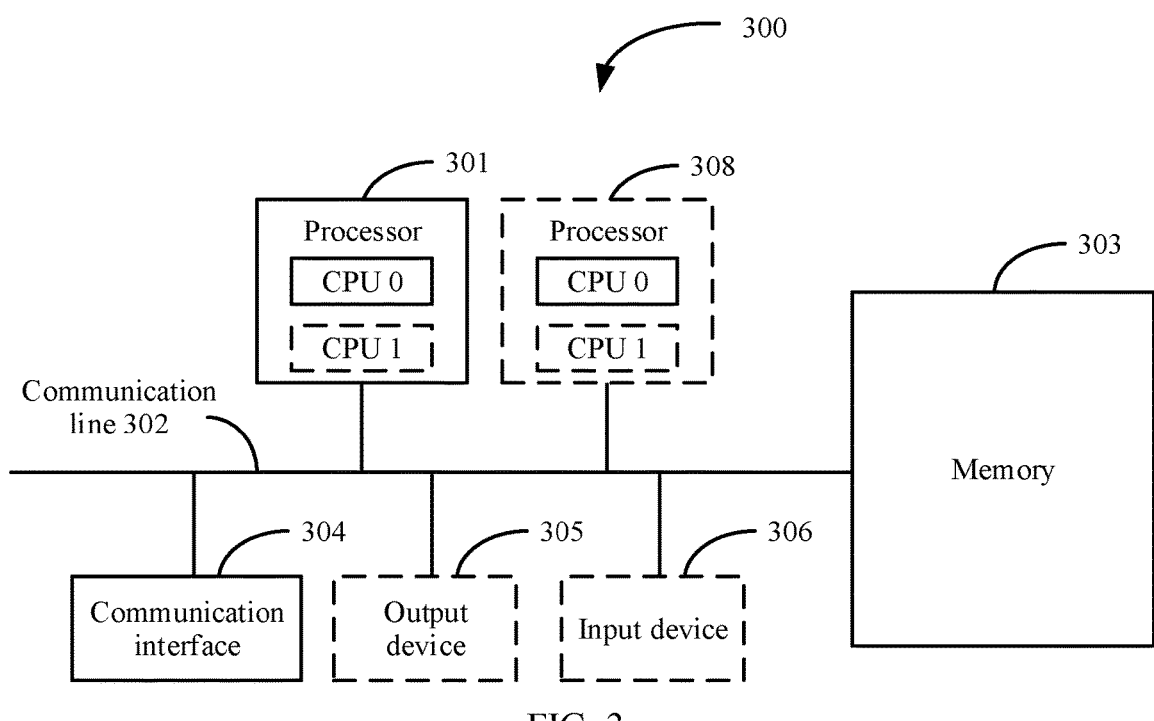
FIG. 3 is a schematic diagram of a hardware structure of a communication device according to an embodiment of this application.

For example, the foregoing network elements or functions may be implemented by using a communication device in FIG. 3. FIG. 3 is a schematic diagram of a hardware structure of a communication device according to an embodiment of this application. The communication device 300 includes a processor 301, a communication line 302, a memory 303, and at least one communication interface (where in FIG. 3, that a communication interface 304 is included is merely used as an example for description).

The processor 301 may be a general-purpose central processing unit (CPU), a microprocessor, an application-specific integrated circuit (ASIC), or one or more integrated circuits configured to control program execution of solutions of this application.

The communication line 302 may include a path for transferring information between the foregoing components.

The communication interface 304 is applicable to any apparatus such as a transceiver, and is configured to communicate with another device or a communication network such as the Ethernet, a radio access network (RAN), or a wireless local area network (WLAN).

The memory 303 may be a read-only memory (ROM) or another type of static storage device that can store static information and instructions, or a random access memory (RAM) or another type of dynamic storage device that can store information and instructions, or may be an electrically erasable programmable read-only memory (EEPROM), a compact disc read-only memory (CD-ROM) or other compact disc storage, optical disc storage (including a compact disc, a laser disc, an optical disc, a digital versatile disc, a Blu-ray disc, and the like), a magnetic disk storage medium or another magnetic storage device, or any other medium that can be used to carry or store expected program code in an instruction form or a data structure form and that can be accessed by a computer, but is not limited thereto. The memory may exist independently, and is connected to the processor through the communication line 302. Alternatively, the memory may be integrated with the processor.

The memory 303 is configured to store computer-executable instructions for performing the solutions of this application, and the processor 301 controls execution. The processor 301 is configured to execute the computer-executable instructions stored in the memory 303, to implement a communication method provided in the following embodiments of this application.

Optionally, the computer-executable instructions in embodiments of this application may also be referred to as application program code. This is not specifically limited in embodiments of this application.

During specific implementation, in an embodiment, the processor 301 may include one or more CPUs such as a CPU 0 and a CPU 1 in FIG. 3.

During specific implementation, in an embodiment, the communication device 300 may include a plurality of processors, for example, the processor 301 and a processor 308 in FIG. 3. Each of the processors may be a single-core (single-CPU) processor, or may be a multi-core (multi-CPU) processor. The processor herein may be one or more devices, circuits, and/or processing cores configured to process data (for example, computer program instructions).

During specific implementation, in an embodiment, the communication device 300 may further include an output device 305 and an input device 306. The output device 305 communicates with the processor 301, and may display information in a plurality of manners. For example, the output device 305 may be a liquid crystal display (LCD), a light emitting diode (LED) display device, a cathode ray tube (CRT) display device, a projector, or the like. The input device 306 communicates with the processor 301, and may receive an input of a user in a plurality of manners. For example, the input device 306 may be a mouse, a keyboard, a touchscreen device, or a sensing device.

The foregoing communication device 300 may be a general-purpose device or a dedicated device. During specific implementation, the communication device 300 may be a desktop computer, a portable computer, a network server, a PDA, a mobile phone, a tablet computer, a wireless terminal device, an embedded device, or a device with a structure similar to that in FIG. 3. A type of the communication device 300 is not limited in embodiments of this application.

The following describes in detail a communication method provided in embodiments of this application with reference to FIG. 1A to FIG. 3.

It should be noted that embodiments of this application are not limited to the 5G network architecture shown in FIG. 2A, FIG. 2B, or FIG. 2C, and may alternatively be applied to another communication system in the future, for example, a 6G network architecture. In addition, in a future communication system, a function of each network element used in embodiments of this application may remain unchanged, but a name of each network element may change.

It should be noted that the following embodiments of this application are applicable to a scenario in which a first terminal device moves from a source access network device to a target access network device, but this shall not constitute any limitation on this application. It may be understood that this application is alternatively applicable to another scenario.

First, the communication method provided in this application is described from a perspective of each network element side in embodiments of this application.

FIG. 4 shows a communication method according to an embodiment of this application. The communication method includes the following steps.

S401: A target access network device receives a first identifier from a source access network device.

The first identifier is for identifying a first multicast service. The first multicast service may be a multicast service joined by a first terminal device before the first terminal device moves. In other words, the first multicast service is a service received by the first terminal device through the source access network device before the first terminal device moves, or the first multicast service is a service currently performed by the first terminal device.

The first multicast service may be a multimedia broadcast multicast service (MBMS), for example, a video live service. Alternatively, the first multicast service may be another service, for example, a vehicle-to-everything (V2X) or internet of things (IoT) data transmission service or a data transmission service related to Public Safety. This is not specifically limited in this embodiment of this application.

S402: The target access network device determines a transmission mode for transmitting data of the first multicast service between the target access network device and the first terminal device.

The transmission mode includes a unicast mode or a multicast mode.

Optionally, the target access network device may determine, in a plurality of manners below, the transmission mode for transmitting the data of the first multicast service between the target access network device and the first terminal device.

In a possible implementation, the target access network device may determine, based on a first quantity, the transmission mode for transmitting the data of the first multicast service between the target access network device and the first terminal device, where the first quantity is a quantity of terminal devices that receive the data of the first multicast service through the target access network device.

An example is provided as follows: When the first quantity is less than a first threshold, it indicates that there are a small quantity of terminal devices that receive the first multicast service through the target access network device. To improve receiving quality of the first terminal device, the target access network device may determine that the transmission mode is the unicast mode. When the first quantity is greater than the first threshold, it indicates that there are a large quantity of terminal devices that receive the first multicast service through the target access network device. To reduce transmission overheads, the target access network device may determine that the transmission mode is the multicast mode. When the first quantity is equal to the first threshold, the target access network device may determine that the transmission mode is the unicast mode or the multicast mode.

It should be noted that if the target access network device creates a context of the first multicast service before receiving the first identifier, the terminal device that receives the data of the first multicast service through the target access network device includes a terminal device that receives the data of the first multicast service through the target access network device before the first terminal device is handed over to the target access network device. In addition, the terminal device that receives the data of the first multicast service through the target access network device may further include a terminal device that requests to be handed over to the target access network device and that joins the first multicast service.

In another possible implementation, the target access network device may receive signal measurement information of a target cell from the source access network device, where the target cell belongs to the target access network device. In this case, that the target access network device determines the transmission mode may be: The target access network device determines the transmission mode based on the signal measurement information of the target cell.

For example, the signal measurement information of the target cell may include information about a signal strength between the first terminal device and the target cell. When the signal strength indicated by the information about the signal strength is greater than a second threshold, it indicates that the signal strength between the first terminal device and the target cell is high. In this case, no additional overhead is caused by using the multicast transmission mode, so that the target access network device may determine that the transmission mode is the multicast mode. When the signal strength indicated by the information about the signal strength is less than the second threshold, it indicates that the signal strength between the first terminal device and the target cell is low. To improve receiving quality of the first terminal device, and to avoid excessively high power and increased power consumption that are caused by adjusting, by the target access network device based on the signal strength of the first terminal device when the data of the first multicast service is sent in the multicast mode, a signal strength for sending the data of the first multicast service, the target access network device may determine that the transmission mode is the unicast mode.

In still another possible implementation, the target access network device may determine the transmission mode based on a first quantity and signal measurement information of a target cell. For example, when the first quantity is greater than a first threshold, and a signal strength between the first terminal device and the target cell is greater than a second threshold, the target access network device may determine that the transmission mode is the multicast mode. Otherwise, the target access network device determines that the transmission mode is the unicast mode.

In yet another possible implementation, the target access network device may determine the transmission mode based on a second quantity and signal measurement information of a target cell, where the second quantity is a quantity of terminal devices that are in terminal devices that receive the data of the first multicast service through the target access network device and whose signal strength with the target cell is greater than a second threshold. For example, when the second quantity is greater than a first threshold, and a signal strength between the first terminal device and the target cell is greater than the second threshold, the target access network device may determine that the transmission mode is the multicast mode. Otherwise, the target access network device determines that the transmission mode is the unicast mode.

Optionally, the first threshold and/or the second threshold may be determined by the target access network device, or may be specified in a protocol. This is not specifically limited in this embodiment of this application. When the first threshold and/or the second threshold are/is determined by the target access network device, the first threshold and/or the second threshold may change based on statuses such as a load of the target access network device.

Optionally, the mode, determined by the target access network device, for transmitting the data of the first multicast service between the target access network device and the first terminal device and a transmission mode for transmitting the data of the first multicast service between the target access network device and a second terminal device may be the same, or may be different. The second terminal device is one or more terminal devices, other than the first terminal device, that receive the data of the first multicast service through the target access network device.

Based on this solution, the target access network device may properly and flexibly determine, based on the signal measurement information of the target cell and/or the quantity of terminal devices that receive the data of the first multicast service through the target access network device, the transmission mode for transmitting the data of the first multicast service between the target access network device and the first terminal device. Therefore, the transmission overheads are reduced, or the receiving quality of the first terminal device is improved.

S403: The target access network device sends, to the first terminal device through the source access network device, wireless configuration information corresponding to the transmission mode for transmitting the data of the first multicast service between the target access network device and the first terminal device.

Optionally, the wireless configuration information corresponding to the transmission mode may include one or more of the following: radio link control (RLC) layer configuration information, media access control (MAC) layer configuration information, packet data convergence protocol (PDCP) layer configuration information, and a data radio bearer identifier (DRB ID).

Optionally, the RLC layer configuration information may be used to configure an RLC layer protocol used by the first terminal device to receive the first multicast service, for example, determine a transmission mode (an acknowledged mode or an unacknowledged mode) used by the RLC. The MAC layer configuration information may be used to configure a MAC layer protocol used by the first terminal device to receive the first multicast service, for example, configure a logical channel identifier (LC ID) corresponding to a DRB. The PDCP layer configuration information may be used to configure a PDCP layer protocol used by the first terminal device to receive the first multicast service, for example, determine whether header compression is supported.

Optionally, when the transmission mode is the multicast mode, in addition to the foregoing one or more items, the wireless configuration information further includes scheduling indication information, where the scheduling indication information is for determining scheduling information of the first multicast service, and the scheduling information is for indicating a wireless resource for transmitting the first multicast service. Based on this solution, the first terminal device may subsequently determine, based on the scheduling indication information, the wireless resource for transmitting the first multicast service, and receive the data of the first multicast service on the wireless resource.

Optionally, the scheduling indication information may be, for example, a group radio network temporary identifier (G-RNTI), or may be an identifier similar to the G-RNTI.

Optionally, before step S403, the target access network device may receive information about a QoS flow of the first multicast service from the source access network device, and obtain the wireless configuration information corresponding to the transmission mode based on the information about the QoS flow of the first multicast service.

For example, the information about the QoS flow of the first multicast service may include one or more quality of service flow identifiers (QFIs) and a QoS parameter (for example, a 5QI or a bandwidth requirement) corresponding to each QFI, where one QFI is for identifying one QoS flow. The target access network device may determine, based on the QoS parameter corresponding to each QFI, a mapping from the QFI to a DRB and create the DRB, and determine, based on the QoS parameter corresponding to each QFI, a quantity of DRBs required for transmitting the QoS flow of the first multicast service. The target access network device may further determine, based on a QoS parameter corresponding to a QFI to which each DRB is mapped, a configuration parameter corresponding to the DRB. For example, the target access network device may determine which one of the acknowledged mode and the unacknowledged mode is used for an RLC layer corresponding to the DRB.

Optionally, if it is determined in step S402 that the target access network device has created the context of the first multicast service, and the context of the first multicast service includes the wireless configuration information corresponding to the transmission mode, the target access network device may obtain the wireless configuration information corresponding to the transmission mode from the context of the first multicast service, and send the wireless configuration information to the first terminal device through the source access network device.

It should be noted that when the target access network device obtains the wireless configuration information corresponding to the transmission mode based on the information about the QoS flow of the first multicast service, a corresponding DRB may not be created for each QoS flow due to limited wireless resources. Consequently, a part of QoS flows of the first multicast service cannot be transmitted through the target access network device. In embodiments of this application, a QoS flow for which a DRB is successfully created is referred to as a QoS flow that is successfully handed over, and a QoS flow for which a DRB fails to be created is referred to as a QoS flow that fails to be handed over. This is centrally described herein, and details are not described in the following embodiments.

In the communication method provided in this embodiment of this application, before the first terminal device moves from the source access network device to the target access network device, the target access network device can determine the transmission mode for transmitting the data of the first multicast service between the target access network device and the first terminal device, and send the wireless configuration information corresponding to the transmission mode to the source access network device. Further, the source access network device may send the wireless configuration information to the first terminal device. Subsequently, when the first terminal device moves to the target access network device or is handed over to the target access network device, the first terminal device may perform configuration based on the wireless configuration information that is sent by the target access network device through the source access network device before handover, without waiting for the target access network device to deliver configuration information. In other words, based on the communication method provided in this embodiment of this application, before the first terminal device moves or is handed over, the wireless configuration information used when the multicast service is transmitted may be sent to the first terminal device, so that the first terminal device performs configuration. Therefore, a delay of the multicast service that is caused by the handover of the first terminal device between access network devices is reduced.

A specific implementation of the foregoing solution is to be described in detail in an interaction procedure between network elements shown in FIG. 10A and FIG. 10B, FIG. 11A and FIG. 11B, FIG. 12A and FIG. 12B, FIG. 13A and FIG. 13B, or FIG. 14A and FIG. 14B. For related steps, terms, and the like, reference may be made to each other. Details are not described herein.

FIG. 5 shows another communication method according to an embodiment of this application. The communication method includes the following steps.

S501: A source access network device sends a first identifier to a target access network device.

The first identifier is for identifying a first multicast service. For related descriptions of the first multicast service, refer to step S401. Details are not described herein again.

Optionally, the source access network device may obtain the first identifier from a context of a first terminal device.

S502: The source access network device receives wireless configuration information from the target access network device.

The wireless configuration information corresponds to a transmission mode for transmitting data of the first multicast service between the target access network device and the first terminal device, and the transmission mode includes a unicast mode or a multicast mode. For related descriptions of the wireless configuration information, refer to step S403. Details are not described herein again.

S503: The source access network device sends the wireless configuration information to the first terminal device.

Optionally, in an implementation scenario of the embodiment shown in FIG. 5, the communication method further includes: The source access network device sends signal measurement information of a target cell to the target access network device, so that the target access network device determines the data of the first multicast service based on the signal measurement information of the target cell.

Optionally, in another implementation scenario of the embodiment shown in FIG. 5, the communication method further includes: The source access network device sends information about a QoS flow of the first multicast service to the target access network device.

The information about the QoS flow of the first multicast service may be included in a context of a second multicast session, where the second multicast session is a multicast session that corresponds to the first multicast service and that is established by the source access network device. Therefore, the source access network device may obtain the context of the second multicast session based on the first identifier, or obtain the context of the second multicast session based on an identifier of the second multicast session, and further obtain the information about the QoS flow of the first multicast service.

Optionally, the identifier of the second multicast session may be obtained by the source access network device from the context of the first terminal device.

A specific implementation of the foregoing solution is to be described in detail in an interaction procedure between network elements shown in FIG. 10A and FIG. 10B, FIG. 11A and FIG. 11B, FIG. 12A and FIG. 12B, FIG. 13A and FIG. 13B, or FIG. 14A and FIG. 14B. For related steps, terms, and the like, reference may be made to each other. Details are not described herein.

FIG. 6 shows still another communication method according to an embodiment of this application. The communication method includes the following steps.

S601: A first network device receives a first message.

The first message includes a first identifier, the first identifier is for identifying a first multicast service, and the first message is used by a target access network device to request to establish a first multicast session corresponding to the first multicast service.

Optionally, the first message may be, for example, an extended existing message (for example, a path switch request transfer (Path Switch Request Transfer) message), or may be a newly defined message. This is not specifically limited in this embodiment of this application.

S602: The first network device establishes the first multicast session corresponding to the first multicast service.

The first network device establishes the first multicast session corresponding to the first multicast service when the target access network device is located in a service range of the first multicast service.

Optionally, that the target access network device is located in a service range of the first multicast service may be understood as that a service range of the target access network device is within the service range of the first multicast service, or the service range of the first multicast service includes the service range of the target access network device. Alternatively, that the target access network device is located in a service range of the first multicast service may be understood as that there is an intersection between a service range of the target access network device and the service range of the first multicast service.

A specific implementation of the step in which the first network device establishes the first multicast session corresponding to the first multicast service is to be described in detail by describing interaction between network elements in the following embodiments, and details are not described herein.

Based on this solution, the first multicast session corresponding to the first multicast service may be established on the target access network device, and further a transmission path of data of the first multicast service from a provider (for example, an AF network element) of the first multicast service to the target access network device is established. Therefore, continuity of the first multicast service is ensured, and a delay of the multicast service that is caused by handover of a first terminal device between access network devices is further reduced.

A specific implementation of the foregoing solution is to be described in detail in an interaction procedure between network elements shown in FIG. 10A and FIG. 10B, FIG. 11A and FIG. 11B, FIG. 12A and FIG. 12B, FIG. 13A and FIG. 13B, or FIG. 14A and FIG. 14B. For related steps, terms, and the like, reference may be made to each other. Details are not described herein.

FIG. 7 shows still another communication method according to an embodiment of this application. The communication method includes the following steps.

S701: A first network device receives a first identifier and information about a target access network device.

Optionally, the information about the target access network device may include one or more of the following: an identifier of the target access network device, an identifier of a first cell, and a tracking area identity (TAI). The first cell belongs to the target access network device. The first cell may be a target cell, or may be a cell, other than the target cell, that belongs to the target access network device. The tracking area identity is a tracking area identity supported by the target access network device.

It should be noted that because a first terminal device may be handed over to the target access network device, when the first terminal device performs a handover procedure with the target access network device or is successfully handed over to the target access network device, the information about the target access network device may also be understood as location information of the first terminal device. Therefore, in embodiments of this application, the information about the target access network device and the location information of the first terminal device may be replaced with each other. This is centrally described herein, and details are not described in the following embodiments.

It should be noted that, in embodiments of this application, location information of a terminal device may include one or more of the following: an identifier of a cell that the terminal device successfully accesses or is attempting to access, an identifier of an access network device to which the cell that the terminal device successfully accesses or is attempting to access belongs, and a tracking area identity supported by the access network device to which the cell that the terminal device successfully accesses or is attempting to access belongs.

S702: The first network device determines, based on the first identifier and the information about the target access network device, that the target access network device has not established a multicast session corresponding to a first multicast service.

It should be noted that, in embodiments of this application, that the target access network device has not established a multicast session corresponding to a first multicast service may also be understood as that no multicast session corresponding to the first multicast service exists on the target access network device. This is centrally described herein, and details are not described in the following embodiments.

Optionally, the first network device may determine, based on the first identifier and the information about the target access network device in a plurality of manners, that the target access network device has not established the multicast session corresponding to the first multicast service.

In a possible implementation, the first network device may store information about an established multicast session. The information about the multicast session may include an identifier of the multicast session, information about an access network device corresponding to the multicast session, and an identifier of a multicast service corresponding to the multicast session.

In this implementation, after receiving the first identifier and the information about the target access network device, the first network device queries the information about the established multicast session. If a multicast session that corresponds to both the first identifier and the information about the target access network device exists, to be specific, an identifier of a multicast service corresponding to the multicast session is the same as the first identifier, and information about an access network device corresponding to the multicast session includes the information about the target access network device, the first network device determines that the target access network device has established the multicast session corresponding to the first multicast service. Otherwise, the first network device determines that the target access network device has not established the multicast session corresponding to the first multicast service. In this embodiment of this application, an example in which the first network device determines that the target access network device has not established the multicast session corresponding to the first multicast service is used for description.

In another possible implementation, the first network device may send a query message to a network element (for example, a unified data management (UDM) network element, a PCF network element, or a unified data repository (UDR) network element, where in this embodiment of this application, the UDM network element is used as an example) that stores information about an established multicast session, and include the first identifier and the information about the target access network device in the query message, to query for a multicast session that corresponds to the first multicast service and that is established by the target access network device. If a response message returned by the UDM network element includes information about the multicast session that corresponds to the first multicast service and that is established by the target access network device, or the response message returned by the UDM network element indicates that the target access network device has established the multicast session corresponding to the first multicast service, the first network device determines that the target access network device has established the multicast session corresponding to the first multicast service. If a response message returned by the UDM network element indicates that the multicast session established by the target access network device is not found, or the response message returned by the UDM network element indicates that the target access network device has not established the multicast session corresponding to the first multicast service, the first network device determines that the target access network device has not established the multicast session corresponding to the first multicast service. In this embodiment of this application, an example in which the first network device determines that the target access network device has not established the multicast session corresponding to the first multicast service is used for description.

Optionally, the network element that stores the information about the established multicast session may also be referred to as a network element configured to register the established multicast session.

S703: The first network device sends a third message.

The third message is for requesting the target access network device to establish a first multicast session corresponding to the first multicast service.

Based on this solution, the first multicast session corresponding to the first multicast service may be established on the target access network device, and further a transmission path of data of the first multicast service from a provider (for example, an AF network element) of the first multicast service to the target access network device is established. Therefore, continuity of the first multicast service is ensured, and a delay of the multicast service that is caused by handover of the first terminal device between access network devices is further reduced.

A specific implementation of the foregoing solution is to be described in detail in an interaction procedure between network elements shown in FIG. 10A and FIG. 10B, FIG. 11A and FIG. 11B, FIG. 12A and FIG. 12B, FIG. 13A and FIG. 13B, or FIG. 14A and FIG. 14B. For related steps, terms, and the like, reference may be made to each other. Details are not described herein.

FIG. 8 shows still another communication method according to an embodiment of this application. The communication method includes the following steps.

S801: A first session management network element receives first indication information and first identification information.

The first indication information is for indicating a first terminal device to move to a target access network device.

Optionally, that the first terminal device moves to the target access network device may be understood as that the first terminal device has been handed over to or has moved to the target access network device (that is, the first terminal device can send and receive data through the target access network device). Alternatively, that the first terminal device moves to the target access network device may be understood as that the first terminal device is attempting to access the target access network device, but has not successfully accessed the target access network device. For example, the first terminal device is in a preparation phase of a handover procedure. This is not specifically limited in this embodiment of this application.

Optionally, the first indication information may be sent by the target access network device to the first session management network element through a mobility management network element, or may be sent by the mobility management network element to the first session management network element after a message (for example, a path switch request message) of the target access network device or a message (for example, a handover request (handover required) message) of a source access network device is received.

Optionally, the first indication information may include information about the target access network device and information for indicating that the first terminal device moves (or is handed over).

The first identification information is a first identifier or an identifier of a first PDU session, the first identifier is for identifying a first multicast service, and the first PDU session is a PDU session used when the first terminal device joins the first multicast service.

Optionally, the first identifier is sent by the target access network device to the first session management network element through the mobility management network element.

Optionally, the identifier of the first PDU session may be sent by the target access network device to the first session management network element through the mobility management network element. In this case, the identifier of the first PDU session is a PDU session identifier (PDU Session ID). Alternatively, the identifier of the first PDU session may be sent by the mobility management network element to the first session management network element after the message (for example, the path switch request message) of the target access network device or the message (for example, the handover required message) of the source access network device is received. In this case, the identifier of the first PDU session is a context identifier allocated by the first session management network element for the first PDU session (that is, a uniform resource identifier (URI) of the first PDU session in the first session management network element).

S802: The first session management network element sends the first identifier and the information about the target access network device to a first network device based on the first indication information.

Optionally, that the first session management network element sends the first identifier and the information about the target access network device to a first network device based on the first indication information may be understood as that the first indication information is a trigger condition for the first session management network element to send the first identifier and the information about the target access network device to the first network device. Specifically, after receiving the first indication information and the first identification information, the first session management network element may determine that the first terminal device moves to the target access network device and the first terminal device joins the first multicast service, and further determine that the first terminal device needs to receive data of the first multicast service through the target access network device. A multicast session corresponding to the first multicast service is required for receiving the data of the first multicast service. However, the first session management network element may not have a multicast session management function. Therefore, the first session management network element sends the first identifier and the information about the target access network device to the first network device, so that the first network device performs related processing, for example, establishment of the multicast session corresponding to the first multicast service.

Optionally, the first session management network element may include the first identifier and the information about the target access network device in a notification message, and send the notification message to the first network device. The notification message is for notifying, to the first network device, that a terminal device that receives the data of the first multicast service through the target access network device exists, so that the first network device performs subsequent processing, for example, establishes the multicast session corresponding to the first multicast service. Alternatively, the first session management network element may send a request message to the first network device. The request message carries the first identifier and the information about the target access network device, and the request message is for requesting the first network device to send, to the first session management network element, information about a multicast session established on the target access network device for the first multicast service corresponding to the first identifier. This is not limited in this embodiment.

Based on this solution, because the first session management network element sends the first identifier and the information about the target access network device to the first network device, the first network device may establish a first multicast session corresponding to the first multicast service on the target access network device, and further establish a transmission path of the data of the first multicast service from a provider (for example, an AF network element) of the first multicast service to the target access network device. Therefore, continuity of the first multicast service is ensured, and a delay of the multicast service that is caused by handover of the first terminal device between access network devices is further reduced.

A specific implementation of the foregoing solution is to be described in detail in an interaction procedure between network elements shown in FIG. 10A and FIG. 10B, FIG. 11A and FIG. 11B, FIG. 12A and FIG. 12B, FIG. 13A and FIG. 13B, or FIG. 14A and FIG. 14B. For related steps, terms, and the like, reference may be made to each other. Details are not described herein.

FIG. 9 shows still another communication method according to an embodiment of this application. The communication method includes the following steps.

S901: A first session management network element receives first indication information and first identification information.

For related descriptions, refer to step S801. Details are not described herein again.

S902: The first session management network element determines, based on the first identification information and information about a target access network device, that the target access network device has not established a multicast session corresponding to a first multicast service.

A detailed implementation of step S902 is similar to the second manner provided in step S702. To be specific, the first session management network element sends a query message to a network element that stores information about an established multicast session, to query for a multicast session that corresponds to the first multicast service and that is established by the target access network device. For related descriptions, refer to step S702. Details are not described herein again.

S903: The first session management network element sends a fifth message to the target access network device.

The fifth message is for requesting the target access network device to establish a first multicast session corresponding to the first multicast service.

Based on this solution, the first session management network element may establish the first multicast session corresponding to the first multicast service on the target access network device, and further establish a transmission path of data of the first multicast service from a provider (for example, an AF network element) of the first multicast service to the target access network device. Therefore, continuity of the first multicast service is ensured, and a delay of the multicast service that is caused by handover of a first terminal device between access network devices is further reduced.

A specific implementation of the foregoing solution is to be described in detail in an interaction procedure between network elements shown in FIG. 10A and FIG. 10B, FIG. 11A and FIG. 11B, FIG. 12A and FIG. 12B, FIG. 13A and FIG. 13B, or FIG. 14A and FIG. 14B. For related steps, terms, and the like, reference may be made to each other. Details are not described herein.

The foregoing method embodiments describe the communication method provided in this application from the perspective of each network element side. The following describes in detail, in a manner of interaction between network elements, the communication method provided in this application.

Figure 10A:
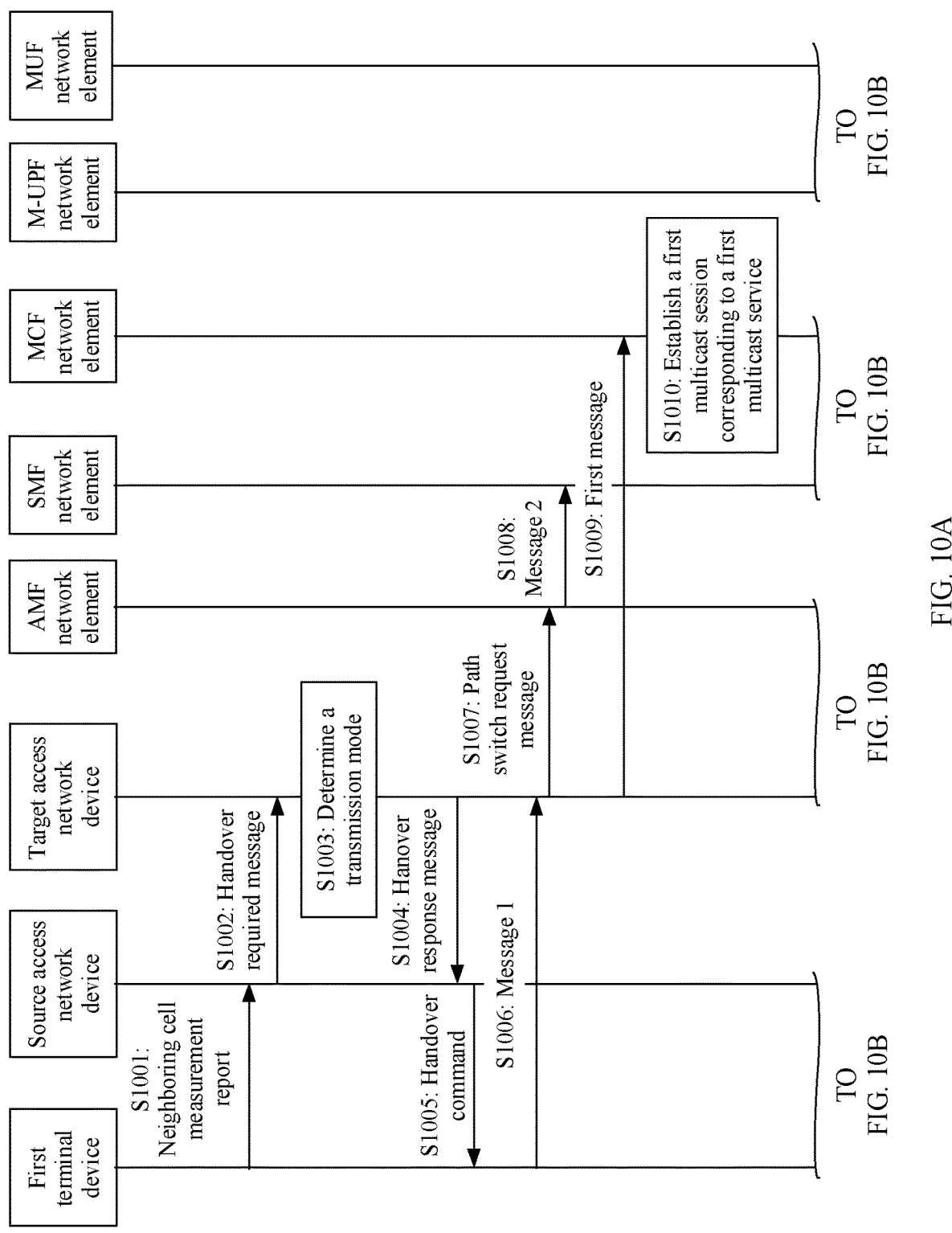
FIG. 10A and FIG. 10B are a first schematic interaction flowchart of a communication method according to an embodiment of this application.
Figure 10B:
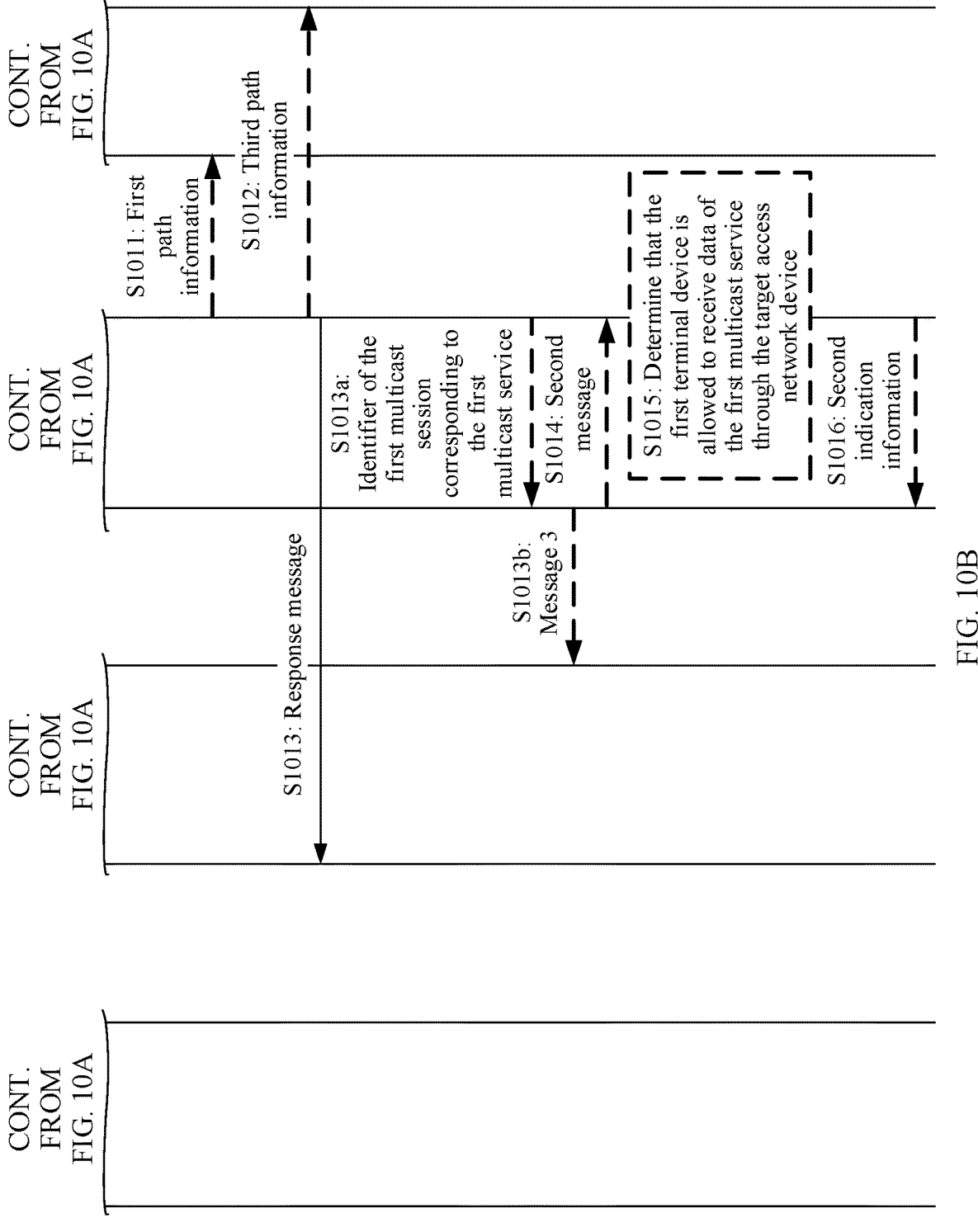

An example in which the communication system shown in FIG. 1A, FIG. 1B, or FIG. 1C is applied to the 5G network shown in FIG. 2A, FIG. 2B, or FIG. 2C, the first session management network element is an SMF network element, the first network device is an MCF network element, and the second network device is an M-UPF network element is used. FIG. 10A and FIG. 10B show a communication method according to an embodiment of this application. The communication method includes the following steps.

S1001: The first terminal device sends a neighboring cell measurement report to the source access network device. Correspondingly, the source access network device receives the neighboring cell measurement report from the first terminal device.

The neighboring cell measurement report includes signal measurement information of a neighboring cell of a source cell, the source cell is a serving cell of the first terminal device when the first terminal device is connected to the source access network device, and the source cell belongs to the source access network device. In this embodiment of this application, an example in which the neighboring cell of the source cell includes a target cell belonging to the target access network device is used for description.

Optionally, when being connected to the source access network device, the first terminal device performs signal measurement on the neighboring cell of the source cell, and reports the neighboring cell measurement report to the source access network device. After receiving the neighboring cell measurement report reported by the first terminal device, the source access network device determines, based on the neighboring cell measurement report, whether to hand over the first terminal device from the source cell to the neighboring cell.

It should be noted that, in this embodiment of this application, an example in which the source access network device determines to hand over the first terminal device to the target cell is used for description, where the target cell belongs to the target access network device. That the first terminal device is handed over to the target cell may also be understood as that the first terminal device is handed over to the target access network device. The two descriptions may be replaced with each other. This is not specifically limited in this embodiment of this application.

S1002: The source access network device sends a handover required message to the target access network device. Correspondingly, the target access network device receives the handover required message from the source access network device.

The handover required message includes a first identifier, and the first identifier is for identifying a first multicast service. For related descriptions, refer to step S401 and step S501. Details are not described herein again.

S1003: The target access network device determines a transmission mode.

The transmission mode is a mode for transmitting data of the first multicast service between the target access network device and the first terminal device. For related descriptions, refer to step S402. Details are not described herein again.

Optionally, the source access network device may send signal measurement information of the target cell to the target access network device, so that the target access network device may determine the transmission mode based on the signal measurement information of the target cell. For related descriptions, refer to step S403. Details are not described herein again.

Optionally, the source access network device may send the signal measurement information of the target cell to the target access network device by using the handover required message in step S1002, or may send the signal measurement information of the target cell to the target access network device by using a message other than the handover required message. This is not specifically limited in this embodiment of this application.

S1004: The target access network device sends a handover response message to the source access network device. Correspondingly, the source access network device receives the handover response message from the target access network device.

The handover response message includes wireless configuration information corresponding to the transmission mode for transmitting the data of the first multicast service between the target access network device and the first terminal device. For related descriptions, refer to step S403. Details are not described herein again.

Optionally, before step S1004, the source access network device may send information about a QoS flow of the first multicast service to the target access network device, so that the target access network device obtains the wireless configuration information corresponding to the transmission mode based on the information about the QoS flow of the first multicast service. For related descriptions, refer to step S403. Details are not described herein again.

Optionally, the source access network device may send the information about the QoS flow of the first multicast service to the target access network device by using the handover required message in step S1002, or may send the information about the QoS flow of the first multicast service to the target access network device by using a message other than the handover required message. This is not specifically limited in this embodiment of this application.

S1005: The source access network device sends a handover command to the first terminal device. Correspondingly, the first terminal device receives the handover command from the source access network device.

The handover command includes related information of the target cell and the wireless configuration information that corresponds to the transmission mode for transmitting the data of the first multicast service between the target access network device and the first terminal device and that is received by the source access network device from the target access network device.

Optionally, after receiving the handover command, the first terminal device attempts to access the target access network device. For example, the first terminal device performs a random access procedure with the target access network device, and performs configuration based on the wireless configuration information corresponding to the transmission mode after successfully accessing the target access network device, to receive the data of the first multicast service through the target access network device.

S1006: The first terminal device sends a message 1 to the target access network device. Correspondingly, the target access network device receives the message 1 from the first terminal device.

Optionally, after successfully accessing the target access network device, the first terminal device sends the message 1 to the target access network device, to notify, to the target access network device, that handover is completed.

Optionally, the message 1 may be an existing handover notification message, for example, a radio resource control (RRC) reconfiguration complete message, or may be a newly defined message. This is not limited in this embodiment of this application.

S1007: The target access network device sends a path switch request message to an AMF network element. Correspondingly, the AMF network element receives the path switch request message from the target access network device.

The AMF network element is an AMF network element with which the first terminal device registers.

The path switch request message includes information sent by the target access network device to the SMF network element. The SMF network element is a session management network element corresponding to a first PDU session, and the first PDU session is a PDU session used when the first terminal device joins the first multicast service.

Optionally, the information sent by the target access network device to the SMF network element includes information 1. The information 1 includes at least one of the first identifier, an identifier of a first multicast session corresponding to the first multicast service, or information about a first QoS flow of the first multicast service.

The identifier of the first multicast session corresponding to the first multicast service may be allocated by the target access network device when the target access network device establishes the first multicast session corresponding to the first multicast service. A process in which the target access network device establishes the first multicast session corresponding to the first multicast service is to be described in the following step S1010. Details are not described herein.

The first QoS flow of the first multicast service is a part or all of the QoS flow of the first multicast service. If the first QoS flow is a part of the QoS flow of the first multicast service, the first QoS flow may be a QoS flow that is successfully handed over or a QoS flow that fails to be handed over in the QoS flow of the first multicast service.

It should be noted that the information 1 in embodiments of this application may also be referred to as third information of the first multicast service. The information 1 and the third information may be replaced with each other. This is centrally described herein, and details are not described in the following embodiments.

S1008: The AMF network element sends a message 2 to the SMF network element. Correspondingly, the SMF network element receives the message 2 from the AMF network element.

The message 2 includes the information 1.

Optionally, after the SMF network element receives the information 1, when the information 1 includes information about the first multicast session corresponding to the first multicast service, the SMF network element may store the identifier of the first multicast session for subsequent session modification, deletion, and the like. When the information 1 includes information about a QoS flow, of the first multicast service, that is successfully handed over and/or a QoS flow, of the first multicast service, that fails to be handed over, the information about the QoS flow that is successfully handed over and/or the QoS flow that fails to be handed over is stored for subsequent processing such as charging. When the information 1 includes information about a QoS flow, of the first multicast service, that fails to be handed over, the QoS flow that fails to be handed over may be further deleted from a context of the first terminal device, to avoid performing subsequent charging with reference to the QoS flow that fails to be handed over.

Optionally, after receiving the first identifier, the target access network device may search for the first identifier in a multicast context stored in the target access network device. If a multicast context including the first identifier exists in the multicast context stored in the target access network device, it is considered that the target access network device has created a context of the first multicast service. If no multicast context including the first identifier exists in the multicast context stored in the target access network device, it is considered that the target access network device has not created a context of the first multicast service (or no context of the first multicast service exists in the target access network device). Correspondingly, it may also be considered that the target access network device has not established a multicast session corresponding to the first multicast service. In other words, no multicast session corresponding to the first multicast service exists in the target access network device. In this case, the communication method provided in this embodiment of this application further includes the following steps.

S1009: The target access network device sends a first message to the MCF network element. Correspondingly, the MCF network element receives the first message from the target access network device.

The first message includes the first identifier, the first identifier is for identifying the first multicast service, and the first message is used by the target access network device to request to establish the first multicast session corresponding to the first multicast service. For related descriptions, refer to step S601. Details are not described herein again.

Optionally, the first message may further include information about the target access network device, so that the MCF network element determines, based on the information about the target access network device, whether to establish the first multicast session corresponding to the first multicast service for the target access network device.

Alternatively, optionally, the first message may not include the information about the target access network device. The target access network device sends the first message to the MCF network element through the AMF network element. When sending the first message to the MCF network element, the AMF network element sends the information about the target access network device to the MCF network element.

Optionally, the first message may further include information 2. The information 2 includes at least one of first path information or the identifier of the first multicast session. The identifier of the first multicast session may be allocated by the target access network device, the first path information includes an IP address of the target access network device and a first tunnel identifier, and the first tunnel identifier is for identifying a unicast tunnel through which the target access network device receives the data of the first multicast service.

Optionally, the first message may further include the information about the first QoS flow of the first multicast service. For related descriptions of the information about the first QoS flow of the first multicast service, refer to step S1007. Details are not described herein again.

It should be noted that the information 2 in embodiments of this application may also be referred to as first information of the first multicast service. The information 2 and the first information may be replaced with each other. This is centrally described herein, and details are not described in the following embodiments.

S1010: The MCF network element establishes the first multicast session corresponding to the first multicast service.

After receiving the first message from the target access network device, the MCF determines whether the target access network device is located in a service range of the first multicast service. The MCF network element establishes the first multicast session corresponding to the first multicast service when the target access network device is located in the service range of the first multicast service.

Optionally, the MCF network element may obtain policy information of the first multicast service from a PCF network element (or a UDR network element). The policy information may include the service range of the first multicast service. When the first message further includes the information about the target access network device, or when the MCF network element receives the information about the target access network device from the AMF network element, the MCF network element determines, based on the information about the target access network device, whether the target access network device is located in the service range of the first multicast service. Specifically, the information about the target access network device may reflect a service range of the target access network device. The MCF network element may compare the service range of the target access network device with the service range of the first multicast service. When there is an intersection between the service range of the target access network device and the service range of the first multicast service or when the service range of the first multicast service includes the service range of the target access network device, the MCF network element determines that the target access network device is located in the service range of the first multicast service.

It should be noted that, in this embodiment of this application, the policy information of the first multicast service may also be referred to as configuration information of the first multicast service. The policy information and the configuration information may be replaced with each other. This is not specifically limited in this embodiment of this application.

Optionally, when the first message further includes the information 2, and the information 2 includes the identifier of the first multicast session, the MCF network element may store the identifier of the first multicast session for subsequent modification, deletion, and the like of the first multicast session. When the information 2 includes the first path information, the MCF network element performs step S1011, to establish a tunnel for transmitting the data of the first multicast service between the M-UPF network element and the target access network device.

Optionally, if no tunnel is established between the M-UPF network element and an MUF network element for transmitting the data of the first multicast service, the MCF network element further performs step S1012.

S1011: The MCF network element sends the first path information to the M-UPF network element. Correspondingly, the M-UPF network element receives the first path information from the MCF network element.

Optionally, after receiving the first path information, the M-UPF network element stores the first path information. When subsequently receiving the data of the first multicast service from the MUF, the M-UPF network element sends the data of the first multicast service to the target access network device based on the first path information.

S1012: The MCF network element sends third path information to the MUF network element. Correspondingly, the MUF network element receives the third path information from the MCF network element.

The third path information includes an IP address of the M-UPF network element and a third tunnel identifier, and the third tunnel identifier is for identifying a tunnel through which the M-UPF network element receives the data of the first multicast service.

Optionally, after receiving the third path information, the MUF network element stores the third path information. When subsequently receiving the data of the first multicast service from an AF network element, the MUF network element sends the data of the first multicast service to the M-UPF network element based on the third path information.

In this case, the data of the first multicast service may be sent from the AF network element to the target access network device through the MUF network element and the M-UPF network element, and then sent by the target access network device to the first terminal device.

S1013: The MCF network element sends a response message to the target access network device. Correspondingly, the target access network device receives the response message from the MCF network element.

Optionally, when the first message in step S1009 does not include the information 2, the response message includes information 3. The information 3 includes at least one of second path information or the identifier of the first multicast session. The identifier of the first multicast session may be allocated by the MCF network element, the second path information includes a multicast address and a second tunnel identifier, the multicast address is used by the target access network device to receive the data of the first multicast service in a multicast mode, and the second tunnel identifier is for identifying a multicast tunnel through which the target access network device receives the data of the first multicast service in the multicast mode.

Optionally, the multicast address may be an IP multicast address, or may be a multicast address in another form. This is not specifically limited in this embodiment of this application.

Optionally, after receiving the information 3, if the information 3 includes the second path information, the target access network device stores the second path information, to subsequently receive the data of the first multicast service based on the second path information. Correspondingly, the MCF network element further sends the second path information to the M-UPF network element, so that the M-UPF network element sends the data of the first multicast service to the target access network device based on the second path information.

Optionally, when the second path information includes the IP multicast address, the target access network device further sends an IP multicast protocol (IP Group Management Protocol (IGMP)) join (Join) request, to join an IP multicast group and transmit the data of the first multicast service. Optionally, the M-UPF network element may also send an IGMP join request.

It should be noted that the information 3 in embodiments of this application may also be referred to as second information of the first multicast service. The information 3 and the second information may be replaced with each other. This is centrally described herein, and details are not described in the following embodiments.

It should be noted that, in this embodiment of this application, there is no strict execution sequence between steps S1003 to S1008 and steps S1009 to S1013. Steps S1003 to S1008 may be first performed, and then steps S1009 to S1013 are performed. Alternatively, steps S1009 to S1013 may be first performed, and then steps S1003 to S1008 are performed. Alternatively, steps S1003 to S1008 and steps S1009 to S1013 may be simultaneously performed. This is not specifically limited in this embodiment of this application.

According to the communication method provided in this embodiment of this application, in an aspect, before the first terminal device moves or is handed over, the wireless configuration information used when the multicast service is transmitted may be sent to the first terminal device, so that the first terminal device performs configuration. Therefore, a delay of the multicast service that is caused by the handover of the first terminal device between access network devices is reduced. In another aspect, the first multicast session corresponding to the first multicast service may be established on the target access network device, and further a transmission path of the data of the first multicast service from a provider (for example, the AF network element) of the first multicast service to the target access network device is established. Therefore, continuity of the first multicast service is ensured, and the delay of the multicast service that is caused by the handover of the first terminal device between the access network devices is further reduced.

Optionally, in an implementation scenario of this embodiment of this application, in step S1007, information sent by the target access network device to the AMF network element further includes first indication information, where the first indication information is for indicating the first terminal device to move to the target access network device. Further, in S1008, the message 2 sent by the AMF network element to the SMF network element further includes the first indication information. Alternatively, after the AMF network element receives the path switch request message from the target access network device in step S1007, the message 2 sent by the AMF network element to the SMF network element in step S1008 includes the first indication information. Alternatively, after receiving a message (the handover required message) of the source access network device, the AMF network element sends the first indication information to the SMF network element.

Optionally, after receiving the first indication information, the SMF network element performs the following steps S1014 to S1016.

S1014: The SMF network element sends a second message to the MCF network element. Correspondingly, the MCF network element receives the second message from the SMF network element.

After receiving the first indication information, the SMF network element triggers an action of sending the second message to the MCF network element. The second message is for requesting the MCF network element to allow the first terminal device to receive the data of the first multicast service through the target access network device.

It should be noted that, in this embodiment of this application, "allowing the first terminal device to receive the data of the first multicast service through the target access network device" may also be understood as "authorizing the first terminal device to receive the data of the first multicast service through the target access network device". The two descriptions may be replaced with each other. This is not specifically limited in this embodiment of this application.

Optionally, the second message may include one or more of an identifier of the first terminal device, the first identifier, and the information about the target access network device.

S1015: The MCF network element determines that the first terminal device is allowed to receive the data of the first multicast service through the target access network device.

In a possible implementation, in step S1010, the policy information that is of the first multicast service and that is obtained by the MCF network element may further include an identifier of a terminal device that is allowed to receive the data of the first multicast service. The terminal device that is allowed to receive the data of the first multicast service is unrelated to an access network device. To be specific, regardless of an access network device accessed by the terminal device, the terminal device is allowed to receive the data of the first multicast service through the access network device accessed by the terminal device. In this case, if the second message includes the identifier of the first terminal device, when the identifier of the terminal device that is allowed to receive the data of the first multicast service includes the identifier of the first terminal device, the MCF network element determines that the first terminal device is allowed to receive the data of the first multicast service through the target access network device.

In another possible implementation, in step S1010, the policy information that is of the first multicast service and that is obtained by the MCF network element may further include an identifier of a terminal device that is allowed to receive the data of the first multicast service and that corresponds to the information about the target access network device. The terminal device that is allowed to receive the data of the first multicast service and that corresponds to the information about the target access network device is allowed to receive the data of the first multicast service through the target access network device only when the terminal device accesses the target access network device. For example, the information about the target access network device is a TAI, and an identifier of a terminal device that is allowed to receive the data of the first multicast service and that corresponds to the TAI indicates an identifier of a terminal device that is allowed to receive the data of the first multicast service in a range indicated by the TAI. In this case, if the second message includes the identifier of the first terminal device and the information about the target access network device, when the identifier of the terminal device that is allowed to receive the data of the first multicast service and that corresponds to the information about the target access network device includes the identifier of the first terminal device, the MCF network element determines that the first terminal device is allowed to receive the data of the first multicast service through the target access network device.

S1016: The MCF network element sends second indication information to the SMF network element. Correspondingly, the SMF network element receives the second indication information from the MCF network element.

The second indication information is for indicating that the first terminal device is allowed to receive the data of the first multicast service through the target access network device.

Optionally, after receiving the second indication information, the SMF network element may continue to perform subsequent processing.

Optionally, when the SMF network element receives indication information indicating that the first terminal device is not allowed to receive the data of the first multicast service through the target access network device, the SMF network element indicates the target access network device to stop sending the data of the first multicast service to the first terminal device, and deletes the first terminal device from the first multicast session that corresponds to the first multicast service and that is created by the target access network device.

Based on this solution, the target access network device continues to send the data of the first multicast service to the first terminal device only when the MCF network element allows the first terminal to receive the data of the first multicast service through the target access network device. This can avoid a case of still sending the data of the first multicast service to the first terminal device when the first terminal device is not allowed to receive the first multicast service.

Optionally, in another implementation scenario of this embodiment of this application, after step S1013, the communication method provided in this embodiment of this application further includes the following steps.

S1013a: The MCF network element sends the identifier of the first multicast session corresponding to the first multicast service to the SMF network element. Correspondingly, the SMF network element receives the identifier of the first multicast session corresponding to the first multicast service from the MCF network element.

The identifier that is of the first multicast session corresponding to the first multicast service and that is sent by the MCF network element to the SMF network element in step S1013a may be the first identifier.

S1013b: The SMF network element sends a message 3 to the target access network device through a signaling connection related to the first terminal device. Correspondingly, the target access network device receives the message 3 from the SMF network element through the signaling connection.

The message 3 includes the identifier of the first multicast session corresponding to the first multicast service, and the message 3 is for requesting the target access network device to associate the first terminal device with the first multicast session.

Optionally, after receiving the identifier of the first multicast session corresponding to the first multicast service, the target access network device associates the first multicast session with the first terminal device, for example, stores the identifier of the first terminal device in a context of the first multicast session. In this way, the target access network device may subsequently obtain the identifier of the first terminal device from the context of the first multicast session, and reconfigure an air interface transmission mode of the first multicast service or wireless configuration information corresponding to the transmission mode for the first terminal device based on the identifier of the first terminal device.

Optionally, after receiving, from the MCF network element, the second indication information indicating that the first terminal device is allowed to receive the data of the first multicast service through the target access network device, the SMF network element may send the message 3 to the target access network device through the signaling connection related to the first terminal device.

It should be noted that, in this embodiment of this application, there is no strict execution sequence between steps S1009 to S1013 and steps S1014 to S1016. Steps S1009 to S1013 may be first performed, and then steps S1014 to S1016 are performed. Alternatively, steps S1014 to S1016 may be first performed, and then steps S1009 to S1013 are performed. Alternatively, steps S1009 to S1013 and steps S1014 to S1016 may be simultaneously performed. This is not specifically limited in this embodiment of this application.

The actions of the network elements in the foregoing steps may be performed by the processor 301 in the communication device 300 shown in FIG. 3 by invoking the application program code stored in the memory 303. This is not limited in this embodiment.

Figure 11A:
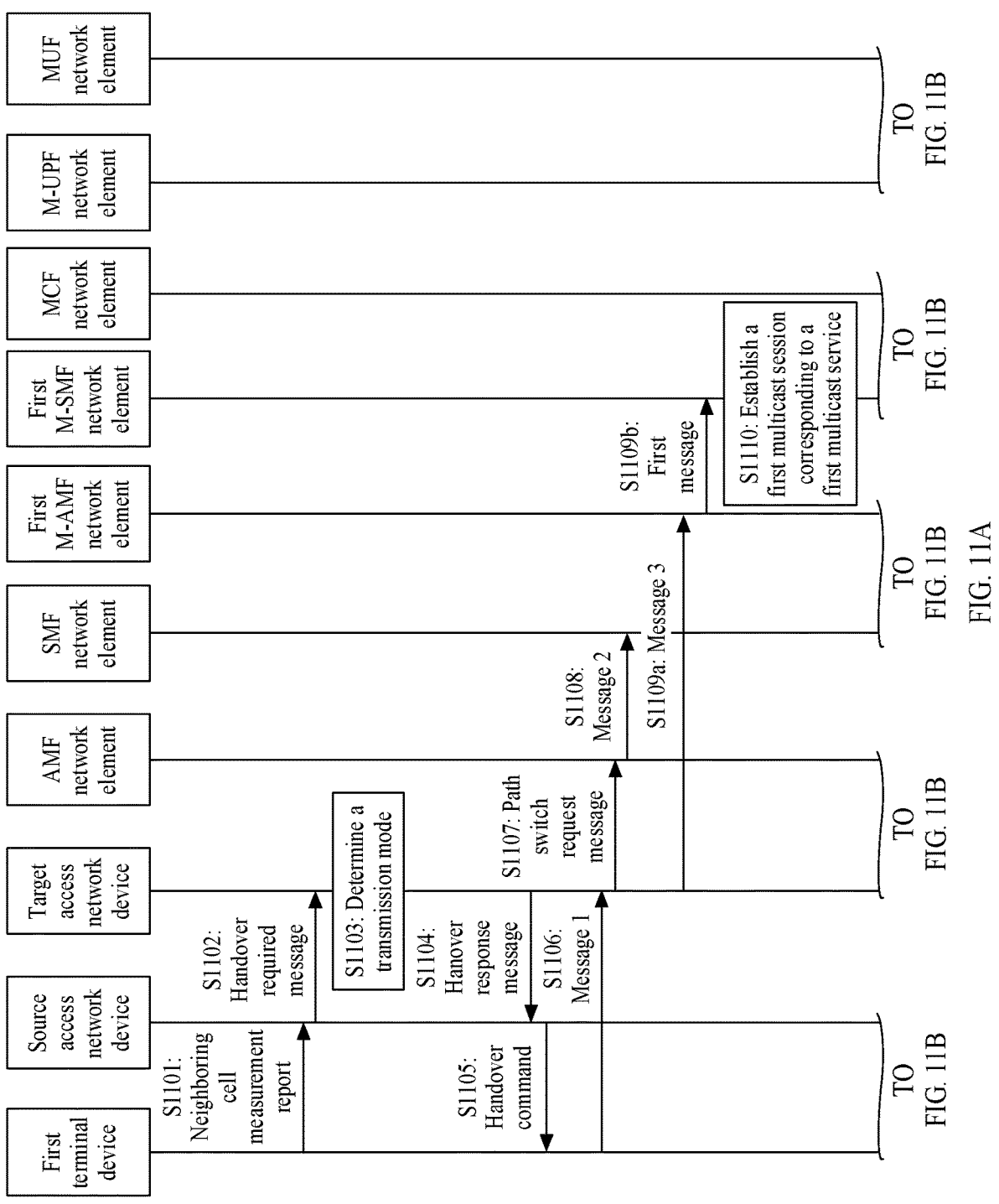
FIG. 11A and FIG. 11B are a second schematic interaction flowchart of a communication method according to an embodiment of this application.
Figure 11B:
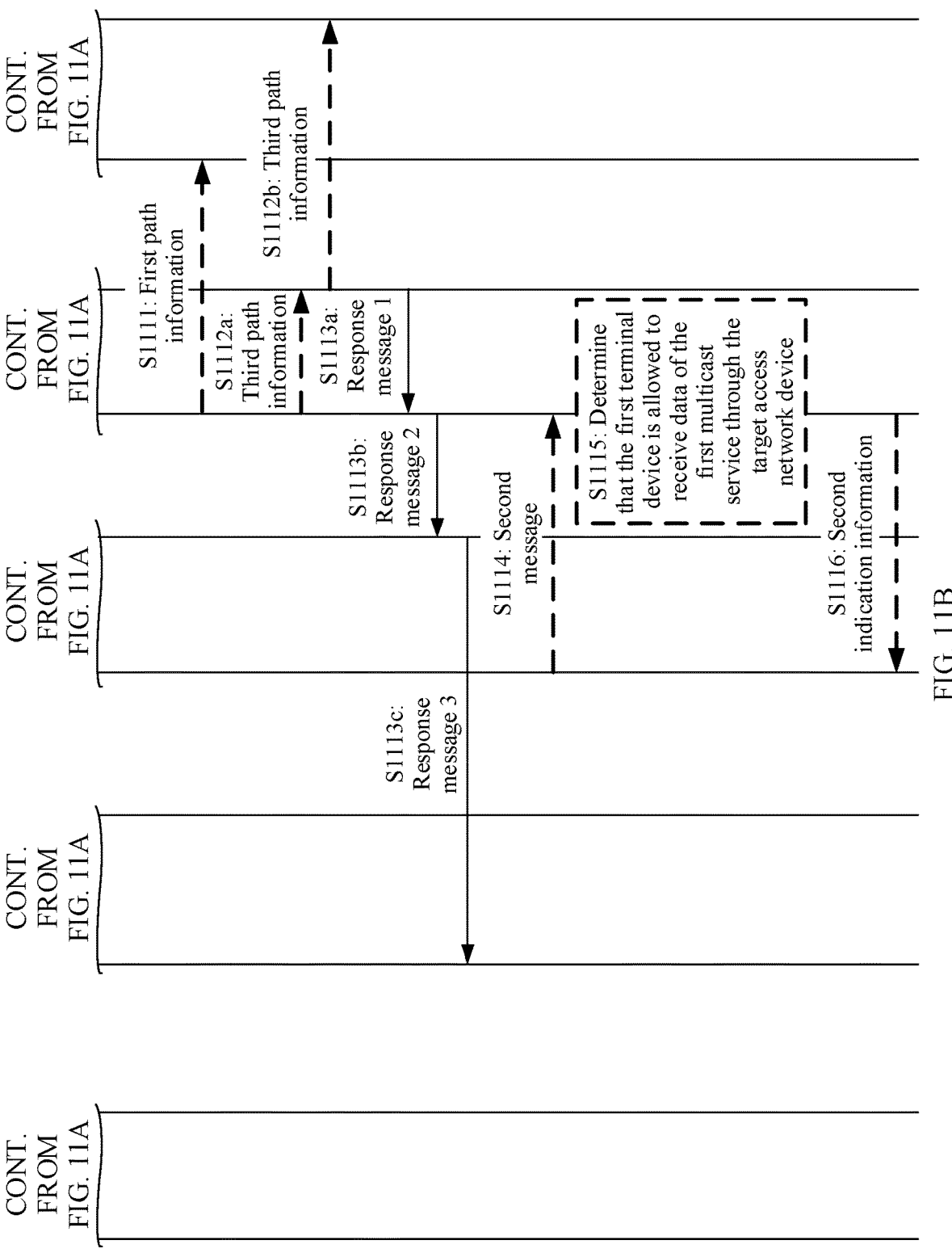

An example in which the communication system shown in FIG. 1A, FIG. 1B, or FIG. 1C is applied to the 5G network shown in FIG. 2A, FIG. 2B, or FIG. 2C, the first session management network element is an SMF network element, the first network device is a first M-SMF network element, the second network device is an M-UPF network element, and the third network device is a first M-AMF network element is used. FIG. 11A and FIG. 11B show a communication method according to an embodiment of this application. The communication method includes the following steps.

S1101 to S1108 are similar to steps S1001 to S1008 in the embodiment shown in FIG. 10A and FIG. 10B. For related descriptions, refer to the embodiment shown in FIG. 10A and FIG. 10B. Details are not described herein again.

Optionally, a difference lies only in that the handover required message sent by the source access network device to the target access network device may further include an identifier of an M-AMF network element corresponding to a second multicast session, and the second multicast session is a multicast session that corresponds to the first multicast service and that is established by the source access network device.

Optionally, if the target access network device determines that the target access network device has not established a multicast session corresponding to the first multicast service, the communication method provided in this embodiment of this application further includes the following steps.

S1109a: The target access network device sends a message 3 to the first M-AMF network element. Correspondingly, the first M-AMF network element receives the message 3 from the target access network device.

Optionally, the target access network device may first select the first M-AMF network element, and then send the message 3 to the first M-AMF network element. For example, the target access network device may select the first M-AMF network element in the following manners.

Manner 1: If the source access network device sends the identifier of the M-AMF network element corresponding to the second multicast session to the target access network device, the first M-AMF network element may be the M-AMF network element corresponding to the second multicast session.

Manner 2: The target access network device selects the first M-AMF network element based on information about the target access network device.

Optionally, the target access network device may select, as the first M-AMF network element, an M-AMF network element whose service range includes a service range corresponding to the information about the target access network device.

Manner 3: The target access network device selects the first M-AMF network element based on the first identifier.

Optionally, the target access network device may select, as the first M-AMF network element, an M-AMF network element that supports the first multicast service identified by the first identifier.

Manner 4: The target access network device may select, as the first M-AMF network element, an AMF network element with which the first terminal device registers.

It should be noted that, in this manner, it may be considered that the AMF network element with which the first terminal device registers and an M-AMF network element are integrated, that is, the AMF network element and the first M-AMF network element in FIG. 11A and FIG. 11B may be combined.

It may be understood that the target access network device may select the first M-AMF network element in any one of the foregoing four manners, or may select the first M-AMF network element with reference to any two or more manners in the foregoing four manners. For example, the target access network device may select the first M-AMF network element with reference to the manner 2 and the manner 3.

Optionally, the target access network device may send the message 3 to the first M-AMF network element by using a device-level N2 message (that is, the N2 message does not include a next generation application protocol (NGAP) identifier). Alternatively, the target access network device may create an N2 signaling connection to the first M-AMF network element for the first multicast service, to subsequently transmit N2 signaling related to the first multicast service. For example, when sending the message 3 to the first M-AMF network element, the target access network device may send, to the first M-AMF network element, an NGAP identifier allocated by the target access network device for the first multicast service. Correspondingly, in a response message of the message 3, the first M-AMF network element sends, to the target access network device, an NGAP identifier allocated by the first M-AMF network element for the first multicast service. In this case, the N2 signaling connection between the target access network device and the first M-AMF network element is successfully established. When a message related to the first multicast service is subsequently sent, the first M-AMF network element and the target access network device identify the first multicast service by using the NGAP identifiers, that is, the message includes the NGAP identifier allocated by the target access network device and the NGAP identifier allocated by the first M-AMF network element. Alternatively, if the target access network device selects the first M-AMF in the manner 4, optionally, the target access network device may further send the message 3 to the first M-AMF network element by using a signaling connection of the first terminal device.

The message 3 includes a first message sent by the target access network device to the first M-SMF network element, the first message includes the first identifier, the first identifier is for identifying the first multicast service, and the first message is used by the target access network device to request to establish the first multicast session corresponding to the first multicast service.

Optionally, the first message may further include other information, for example, the information about the target access network device, information 2, and the information about the first QoS flow of the first multicast service. For a detailed solution, refer to related descriptions in step S1009. Details are not described herein again.

Optionally, the first message may alternatively not include the information about the target access network device. In this case, when sending the first message to the first M-SMF network element, the first M-AMF network element may send the information about the target access network device to the first M-SMF network element.

The message 3 may further include information sent by the target access network device to the first M-AMF network element.

Optionally, the information sent by the target access network device to the first M-AMF network element may include one or more of the following: the first identifier, the identifier of the first multicast session corresponding to the first multicast service, and an identifier of the first PDU session. The first PDU session is a PDU session used when the first terminal device joins the first multicast service.

Optionally, the message 3 may be further used to request the first M-AMF network element to create a context corresponding to the first multicast service, so that the first M-AMF network element creates the context corresponding to the first multicast service.

S1109b: The first M-AMF network element sends the first message to the first M-SMF network element. Correspondingly, the first M-SMF network element receives the first message from the first M-AMF network element.

Optionally, the first M-AMF network element may first select the first M-SMF network element, and then send the first message to the first M-SMF network element. For example, the first M-AMF network element may select the first M-SMF network element in the following manners.

Manner 1: The first M-AMF network element selects the first M-SMF network element based on the information about the target access network device.

Optionally, the first M-AMF network element may select, as the first M-SMF network element, an M-SMF network element whose service range includes the service range corresponding to the information about the target access network device.

Manner 2: The first M-AMF selects the first M-SMF network element based on the first identifier.

Optionally, the first M-AMF network element may select, as the first M-SMF network element, an M-SMF network element that supports the first multicast service identified by the first identifier.

Manner 3: If the first M-AMF network element is the M-AMF network element corresponding to the second multicast session, the first M-AMF network element selects, as the first M-SMF network element, an M-SMF network element that serves a multicast session of the source access network device.

Manner 4: If the first M-AMF network element is the AMF network element with which the first terminal device registers, and the information sent by the target access network device to the first M-AMF network element includes the identifier of the first PDU session, the first M-AMF network element selects an SMF network element corresponding to the first PDU session as the first M-SMF network element.

It should be noted that, in this manner, it may be considered that the AMF network element and the first M-AMF network element are integrated, and the SMF network element and the M-SMF network element are integrated, that is, in FIG. 11A and FIG. 11B, the AMF network element and the first M-AMF network element may be combined, and the SMF network element and the first M-SMF network element may be combined. The following step S1114 and step S1116 are not performed.

It may be understood that the first M-AMF network element may select the first M-SMF network element in any one of the foregoing four manners, or may select the first M-SMF network element with reference to any two or more manners in the foregoing four manners. For example, the first M-AMF network element may select the first M-SMF network element with reference to the manner 2 and the manner 3.

S1110: The first M-SMF network element establishes the first multicast session corresponding to the first multicast service.

Step S1110 is similar to step S1010, and a difference lies in that step S1110 is performed by the first M-SMF network element, but step S1010 is performed by the MCF network element.

Optionally, when the first message further includes the information 2, and the information 2 includes first path information, the first M-SMF network element performs step S1111, to establish a tunnel between the M-UPF network element and the target access network device for transmitting the data of the first multicast service.

Optionally, if no tunnel is established between the M-UPF network element and an MUF network element for transmitting the data of the first multicast service, the communication method provided in this embodiment of this application further includes steps S1112a and S1112b.

S1111: The first M-SMF network element sends the first path information to the M-UPF network element. Correspondingly, the M-UPF network element receives the first path information from the first M-SMF network element.

Step S1111 is similar to step S1011. For detailed descriptions, refer to step S1011. Details are not described herein again.

S1112a: The first M-SMF network element sends third path information to an MCF network element. Correspondingly, the MCF network element receives the third path information from the first M-SMF network element.

For related descriptions of the third path information, refer to step S1012. Details are not described herein again.

Optionally, after receiving the third path information, the MCF network element performs step S1112b.

S1112b: The MCF network element sends the third path information to the MUF network element. Correspondingly, the MUF network element receives the third path information from the MCF network element.

Optionally, after receiving the third path information, the MUF network element stores the third path information. When subsequently receiving the data of the first multicast service from an AF network element, the MUF network element sends the data of the first multicast service to the M-UPF network element based on the third path information.

In this case, the data of the first multicast service may be sent from the AF network element to the target access network device through the MUF network element and the M-UPF network element, and then sent by the target access network device to the first terminal device.

S1113a: The MCF network element sends a response message 1 to the first M-SMF network element. Correspondingly, the first M-SMF network element receives the response message 1 from the MCF network element.

S1113b: The first M-SMF network element sends a response message 2 to the first M-AMF network element. Correspondingly, the first M-AMF network element receives the response message 2 from the first M-SMF network element.

Optionally, the response message 2 includes information sent by the first M-SMF network element to the target access network device. For example, when the first message does not include the information 2, the information sent by the first M-SMF network element to the target access network device includes information 3, where the information 3 includes at least one of second path information or the identifier of the first multicast session. In this case, correspondingly, the first M-SMF network element further sends the second path information to the M-UPF network element through the MCF network element. For related descriptions, refer to step S1013. Details are not described herein again.

S1113c: The first M-AMF network element sends a response message 3 to the target access network device. Correspondingly, the target access network device receives the response message 3 from the first M-AMF network element.

The response message 3 includes the information sent by the first M-SMF network element to the target access network device, for example, the information 3.

Optionally, for processing performed after the target access network device receives the information 3, refer to related descriptions in step S1013. Details are not described herein again.

It should be noted that, in this embodiment of this application, there is no strict execution sequence between steps S1103 to S1108 and steps S1109a to S1113c. Steps S1103 to S1108 may be first performed, and then steps S1109a to S1113c are performed. Alternatively, steps S1109a to S1113c may be first performed, and then steps S1103 to S1108 are performed. Alternatively, steps S1103 to S1108 and steps S1109a to S1113c may be simultaneously performed. This is not specifically limited in this embodiment of this application.

According to the communication method provided in this embodiment of this application, in an aspect, before the first terminal device moves or is handed over, the wireless configuration information used when the multicast service is transmitted may be sent to the first terminal device, so that the first terminal device performs configuration. Therefore, a delay of the multicast service that is caused by the handover of the first terminal device between access network devices is reduced. In another aspect, the first multicast session corresponding to the first multicast service may be established on the target access network device, and further a transmission path of the data of the first multicast service from a provider (for example, the AF network element) of the first multicast service to the target access network device is established. Therefore, continuity of the first multicast service is ensured, and the delay of the multicast service that is caused by the handover of the first terminal device between the access network devices is further reduced.

Optionally, in an implementation scenario of this embodiment of this application, in step S1107, information sent by the target access network device to the AMF network element further includes first indication information, where the first indication information is for indicating the first terminal device to move to the target access network device. Further, in S1108, the message 2 sent by the AMF network element to the SMF network element further includes the first indication information. Alternatively, after the AMF network element receives the path switch request message from the target access network device in step S1107, the message 2 sent by the AMF network element to the SMF network element in step S1108 includes the first indication information. Alternatively, after receiving a message (the handover required message) of the source access network device, the AMF network element sends the first indication information to the SMF network element. In this case, the communication method shown in FIG. 11A and FIG. 11B further includes steps S1114 to S1116. Steps S1114 to S1116 are similar to steps S1014 to S1016 in the embodiment shown in FIG. 10A and FIG. 10B. For related descriptions, refer to the embodiment shown in FIG. 10A and FIG. 10B. Details are not described herein again.

It should be noted that, in this embodiment of this application, there is no strict execution sequence between steps S1109a to S1113c and steps S1114 to S1116. Steps S1109a to S1113c may be first performed, and then steps S1114 to S1116 are performed. Alternatively, steps S1114 to S1116 may be first performed, and then steps S1109a to S1113c are performed. Alternatively, steps S1109a to S1113c and steps S1114 to S1116 may be simultaneously performed. This is not specifically limited in this embodiment of this application.

The actions of the network elements in the foregoing steps may be performed by the processor 301 in the communication device 300 shown in FIG. 3 by invoking the application program code stored in the memory 303. This is not limited in this embodiment.

Figure 12A:
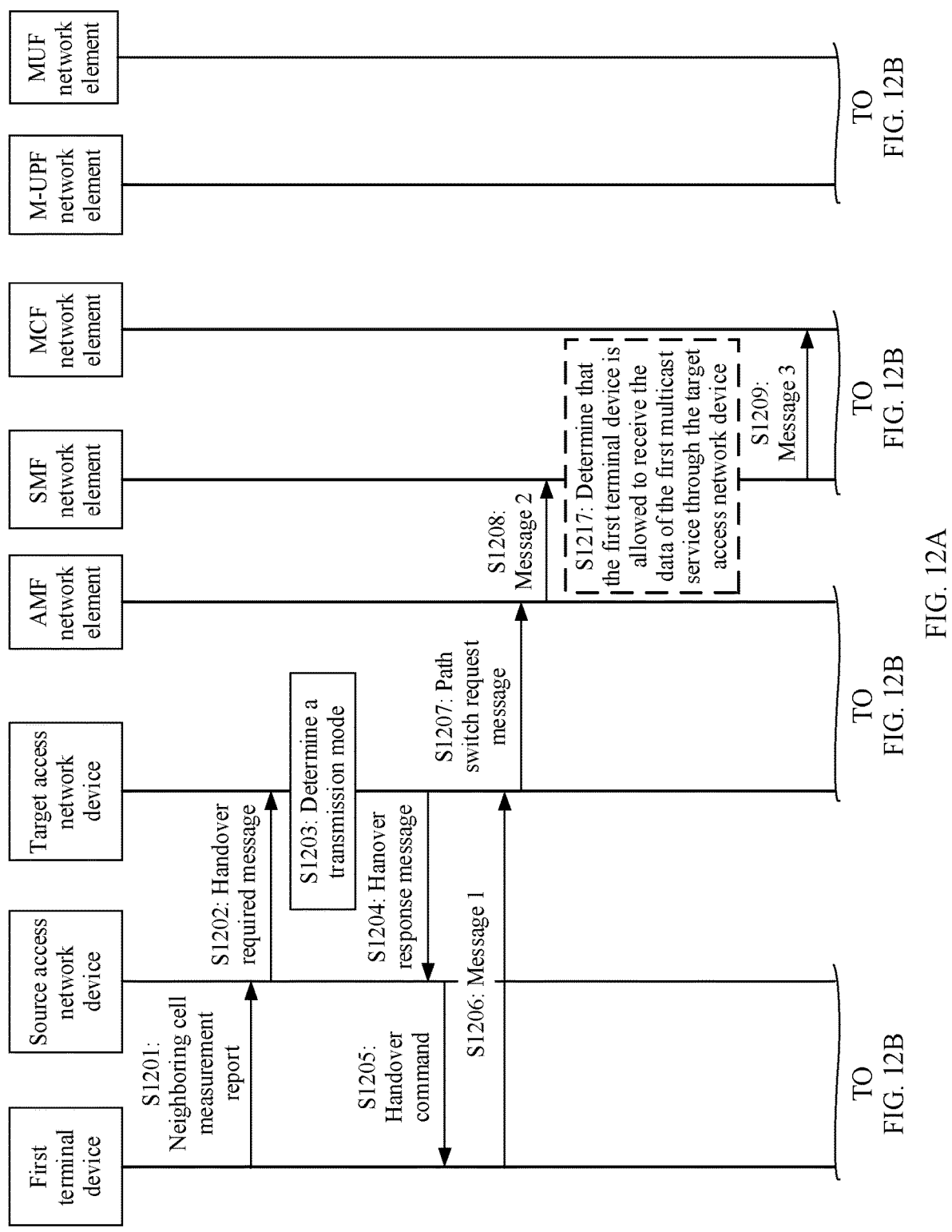
FIG. 12A and FIG. 12B are a third schematic interaction flowchart of a communication method according to an embodiment of this application.
Figure 12B:
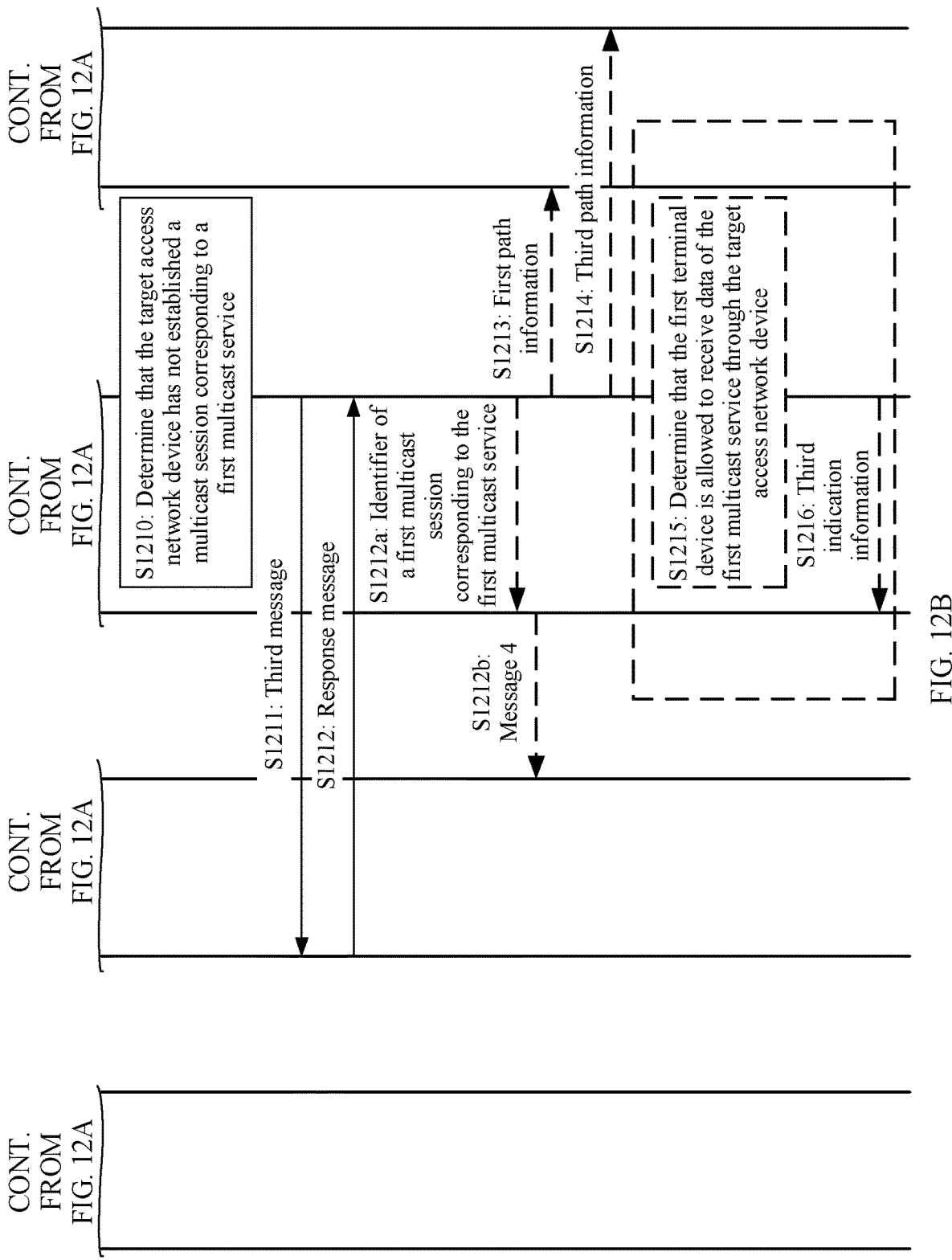

An example in which the communication system shown in FIG. 1A, FIG. 1B, or FIG. 1C is applied to the 5G network shown in FIG. 2A, FIG. 2B, or FIG. 2C, the first session management network element is an SMF network element, the first network device is an MCF network element, and the second network device is an M-UPF network element is used. FIG. 12A and FIG. 12B show a communication method according to an embodiment of this application. The communication method includes the following steps.

S1201 to S1208 are the same as steps S1001 to S1008 in the embodiment shown in FIG. 10A and FIG. 10B. For related descriptions, refer to the embodiment shown in FIG. 10A and FIG. 10B. Details are not described herein again.

Optionally, in an implementation scenario of this embodiment of this application, in a possible implementation, in step S1207, information sent by the target access network device to the SMF network element further includes first indication information and first identification information, where the first indication information is for indicating the first terminal device to move to the target access network device, and the first identification information is the first identifier or an identifier of the first PDU session. In this case, the identifier of the first PDU session is a PDU Session ID. Further, in S1208, the message 2 sent by the AMF network element to the SMF network element further includes the first indication information and the first identification information.

In another possible implementation, after the AMF network element receives the path switch request message from the target access network device in step S1207, the message 2 sent by the AMF network element to the SMF network element in step S1208 includes the first indication information and first identification information, where the first identification information is an identifier of the first PDU session. In this case, the identifier of the first PDU session is a context identifier allocated by the SMF network element for the first PDU session (that is, a URI of the first PDU session in the SMF network element).

In still another possible implementation, after receiving a message (the handover required message) of the source access network device, the AMF network element sends the first indication information and first identification information to the SMF network element, where the first identification information is an identifier of the first PDU session. In this case, the identifier of the first PDU session is also a context identifier allocated by the SMF network element for the first PDU session (that is, a URI of the first PDU session in the SMF network element).

Optionally, after receiving the first indication information and the first identification information, the SMF network element performs the following steps S1209 to S1214.

S1209: The SMF network element sends a message 3 to the MCF network element based on the first indication information. Correspondingly, the MCF network element receives the message 3 from the SMF network element.

The message 3 includes the first identifier and information about the target access network device.

Optionally, the message 3 may be used to indicate that a terminal device that receives the data of the first multicast service through the target access network device exists, so that the MCF network element performs subsequent processing, for example, continues to perform the following step S1210. Alternatively, optionally, the message 3 is for requesting the MCF network element for information about the first multicast session created by the target access network device for the first multicast service. If the target access network device creates the first multicast session for the first multicast service, the MCF network element returns the information about the first multicast session to the SMF network element. Otherwise, the MCF network element continues to perform the following step S1210.

Optionally, if the first identification information is the identifier of the first PDU session, before step S1209, the communication method provided in this embodiment of this application further includes: The SMF network element obtains the first identifier from a context corresponding to the first PDU session based on the identifier of the first PDU session.

S1210: The MCF network element determines that the target access network device has not established a multicast session corresponding to the first multicast service.

The MCF network element determines, based on the first identifier and the information about the target access network device, that the target access network device has not established the multicast session corresponding to the first multicast service. For a detailed implementation of this step, refer to related descriptions in step S702. Details are not described herein again.

Optionally, after determining that the target access network device has not established the multicast session corresponding to the first multicast service, the MCF network element determines whether the target access network device is located in a service range of the first multicast service. When the target access network device is located in the service range of the first multicast service, the MCF network element performs the following step S1211. For an implementation in which the MCF network element determines whether the target access network device is located in the service range of the first multicast service, refer to related descriptions in step S1010. Details are not described herein again.

S1211: The MCF network element sends a third message to the target access network device. Correspondingly, the target access network device receives the third message from the MCF network element.

The third message is for requesting the target access network device to establish the first multicast session corresponding to the first multicast service. The third message includes the first identifier.

Optionally, the third message may include at least one of second path information or the identifier of the first multicast session. For related descriptions, refer to step S1013. Details are not described herein again.

Optionally, the MCF network element may send the third message to the target access network device through the AMF network element with which the first terminal device registers. In this case, optionally, the SMF network element may send, to the MCF network element, identification information of the AMF network element with which the first terminal device registers, so that the MCF network element sends the third message to the AMF network element. Alternatively, the MCF network element may send the third message to the target access network device through the SMF network element and the AMF network element with which the first terminal device registers. Alternatively, the MCF network element may select an AMF network element to send the third message to the target access network device through the AMF network element. For example, the MCF network element may select the AMF network element based on the information about the target access network device, and send the third message to the target access network device through the AMF network element. This is not specifically limited in this embodiment of this application.

S1212: The target access network device sends a response message to the MCF network element. Correspondingly, the MCF network element receives the response message from the target access network device.

Optionally, if the third message does not include the at least one of the second path information or the identifier of the first multicast session, the response message includes at least one of first path information or the identifier of the first multicast session. Alternatively, if the target access network device does not support receiving of data in a multicast mode, the response message may further include first path information. Optionally, when the response message includes the first path information, the MCF network element performs step S1213, to establish a tunnel for transmitting the data of the first multicast service between the M-UPF network element and the target access network device.

Optionally, if no tunnel is established between the M-UPF network element and an MUF network element for transmitting the data of the first multicast service, the MCF network element further performs step S1214.

S1213: The MCF network element sends the first path information to the M-UPF network element. Correspondingly, the M-UPF network element receives the first path information from the MCF network element.

S1214: The MCF network element sends third path information to the MUF network element. Correspondingly, the MUF network element receives the third path information from the MCF network element.

For related descriptions of steps S1213 and S1214, refer to steps S1011 and S1012. Details are not described herein again.

It should be noted that, in this embodiment of this application, there is no strict execution sequence between steps S1203 to S1208 and steps S1209 to S1214. Steps S1203 to S1208 may be first performed, and then steps S1209 to S1214 are performed. Alternatively, steps S1209 to S1214 may be first performed, and then steps S1203 to S1208 are performed. Alternatively, steps S1203 to S1208 and steps S1209 to S1214 may be simultaneously performed. Details are not described herein again.

According to the communication method provided in this embodiment of this application, in an aspect, before the first terminal device moves or is handed over, the wireless configuration information used when the multicast service is transmitted may be sent to the first terminal device, so that the first terminal device performs configuration. Therefore, a delay of the multicast service that is caused by the handover of the first terminal device between access network devices is reduced. In another aspect, the first multicast session corresponding to the first multicast service may be established on the target access network device, and further a transmission path of the data of the first multicast service from a provider (for example, an AF network element) of the first multicast service to the target access network device is established. Therefore, continuity of the first multicast service is ensured, and the delay of the multicast service that is caused by the handover of the first terminal device between the access network devices is further reduced.

Optionally, in an implementation scenario of this embodiment of this application, after step S1212, the communication method provided in this embodiment of this application further includes the following steps.

S1212a: The MCF network element sends the identifier of the first multicast session corresponding to the first multicast service to the SMF network element. Correspondingly, the SMF network element receives the identifier of the first multicast session corresponding to the first multicast service from the MCF network element.

The identifier that is of the first multicast session corresponding to the first multicast service and that is sent by the MCF network element to the SMF network element in step S1212a may be the first identifier.

S1212b: The SMF network element sends a message 4 to the target access network device through a signaling connection related to the first terminal device. Correspondingly, the target access network device receives the message 4 from the SMF network element through the signaling connection.

The message 4 includes the identifier of the first multicast session corresponding to the first multicast service, and the message 4 is for requesting the target access network device to associate the first terminal device with the first multicast session.

Optionally, after receiving the identifier of the first multicast session corresponding to the first multicast service, the target access network device associates the first multicast session with the first terminal device, for example, stores the identifier of the first terminal device in a context of the first multicast session. In this way, the target access network device may subsequently obtain the identifier of the first terminal device from the context of the first multicast session, and reconfigure an air interface transmission mode of the first multicast service or wireless configuration information corresponding to the transmission mode for the first terminal device based on the context of the first terminal device.

Optionally, in another implementation scenario of this embodiment of this application, in step S1209, the message 3 sent by the SMF network element to the MCF network element may further include a fourth message. The fourth message is for requesting the MCF network element to allow the first terminal device to receive the data of the first multicast service through the target access network device.

Optionally, the fourth message may include one or more of an identifier of the first terminal device, the first identifier, and the information about the target access network device.

Optionally, after receiving the fourth message, the MCF network element performs the following steps S1215 and S1216.

S1215: The MCF network element determines that the first terminal device is allowed to receive the data of the first multicast service through the target access network device.

Optionally, the MCF network element may determine, based on policy information of the first multicast service, that the first terminal device is allowed to receive the data of the first multicast service through the target access network device. For related descriptions, refer to step S1015. Details are not described herein again.

S1216: The MCF network element sends third indication information to the SMF network element. Correspondingly, the SMF network element receives the third indication information from the MCF network element.

The third indication information is for indicating that the first terminal device is allowed to receive the data of the first multicast service through the target access network device.

Optionally, after receiving the third indication information, the SMF network element may continue to perform subsequent processing.

Optionally, the MCF network element may include the identifier of the first multicast session corresponding to the first multicast service in step S1212a and the third indication information in one message, and send the message to the SMF network element. Alternatively, the identifier of the first multicast session corresponding to the first multicast service and the third indication information may be separately sent by using two messages. This is not specifically limited in this embodiment of this application.

Optionally, when the SMF network element receives indication information indicating that the first terminal device is not allowed to receive the data of the first multicast service through the target access network device, the SMF network element indicates the target access network device to stop sending the data of the first multicast service to the first terminal device, and deletes the first terminal device from the first multicast session that corresponds to the first multicast service and that is created by the target access network device.

Based on this solution, the target access network device continues to send the data of the first multicast service to the first terminal device only when the MCF network element allows the first terminal to receive the data of the first multicast service through the target access network device. This can avoid a case of still sending the data of the first multicast service to the first terminal device when the first terminal device is not allowed to receive the first multicast service.

Optionally, in still another implementation scenario of this embodiment of this application, before step S1209, the communication method provided in this embodiment of this application further includes the following step S1217.

S1217: The SMF network element determines that the first terminal device is allowed to receive the data of the first multicast service through the target access network device.

In a possible implementation, the SMF network element may obtain policy information of the first terminal device, where the policy information of the first terminal device may include area information for receiving the data of the first multicast service by the first terminal device. When the target access network device is located in an area indicated by the area information, the SMF network element determines that the first terminal device is allowed to receive the data of the first multicast service through the target access network device.

It should be noted that the policy information of the first terminal device may also be referred to as subscription information of the first terminal device. The policy information and the subscription information may be replaced with each other. This is not specifically limited in this embodiment of this application.

It should be noted that, that the target access network device is located in an area indicated by the area information may be understood as that the area indicated by the area information includes a service range of the target access network device, or there is an intersection between the area indicated by the area information and the service range of the target access network device.

In another possible implementation, the SMF network element may alternatively obtain the policy information of the first multicast service, to determine, based on the policy information of the first multicast service, that the first terminal device is allowed to receive the data of the first multicast service through the target access network device. For related descriptions, refer to step S1015. Details are not described herein again.

It should be noted that if the SMF network element determines that the first terminal device is not allowed to receive the data of the first multicast service through the target access network device, the SMF network element may not trigger performing of step S1209 and the steps after step S1209. In this case, the SMF network element indicates the target access network device to stop sending the data of the first multicast service to the first terminal device, and deletes the first terminal device from the context of the first multicast session.

The actions of the network elements in the foregoing steps may be performed by the processor 301 in the communication device 300 shown in FIG. 3 by invoking the application program code stored in the memory 303. This is not limited in this embodiment.

Figure 13A:
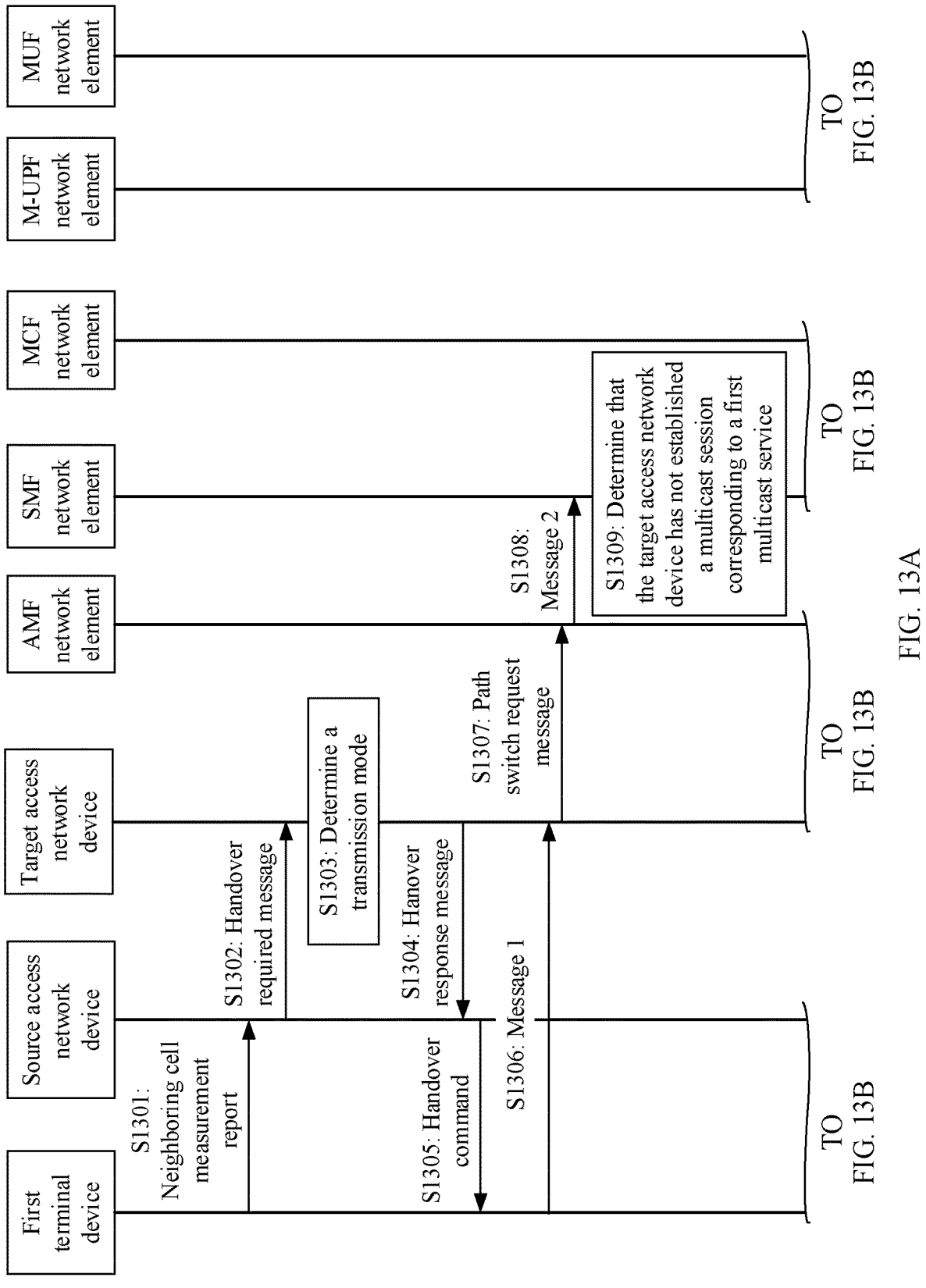
FIG. 13A and FIG. 13B are a fourth schematic interaction flowchart of a communication method according to an embodiment of this application.
Figure 13B:
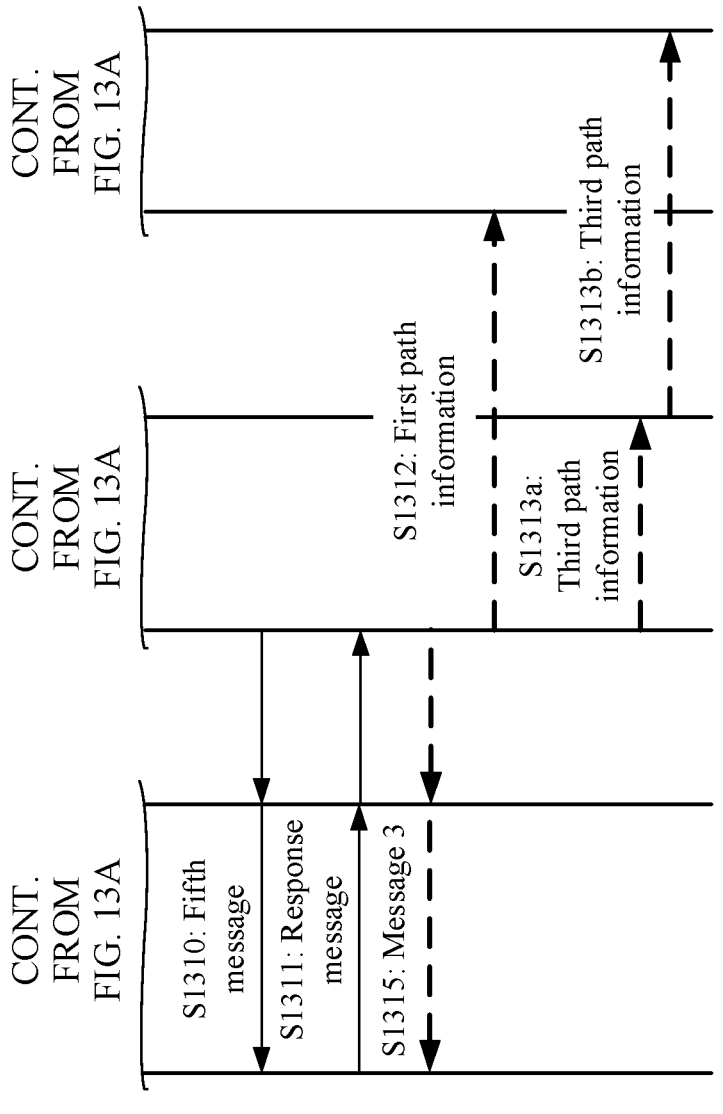

An example in which the communication system shown in FIG. 1A, FIG. 1B, or FIG. 1C is applied to the 5G network shown in FIG. 2A, FIG. 2B, or FIG. 2C, the first session management network element is an SMF network element, and the second network device is an M-UPF network element is used. FIG. 13A and FIG. 13B show a communication method according to an embodiment of this application. The communication method includes the following steps.

S1301 to S1308 are the same as steps S1001 to S1008 in the embodiment shown in FIG. 10A and FIG. 10B. For related descriptions, refer to the embodiment shown in FIG. 10A and FIG. 10B. Details are not described herein again.

Optionally, in an implementation scenario of this embodiment of this application, the target access network device or the AMF network element may send first indication information and first identification information to the SMF network element. For detailed descriptions, refer to related descriptions of steps before step S1209. Details are not described herein again.

Optionally, after receiving the first indication information and the first identification information, the SMF network element may determine that the first terminal device is handed over and the first terminal device joins the first multicast service, and therefore perform the following step.

S1309: The SMF network element determines that the target access network device has not established a multicast session corresponding to the first multicast service.

The SMF network element determines, based on the first identification information and information about the target access network device, that the target access network device has not established the multicast session corresponding to the first multicast service.

Optionally, when the first identification information is the first identifier, the SMF network element determines, based on the first identifier and the information about the target access network device, that the target access network device has not established the multicast session corresponding to the first multicast service; when the first identification information is an identifier of the first PDU session, the SMF network element obtains the first identifier from a context corresponding to the first PDU session, and then determines, based on the first identifier and the information about the target access network device, that the target access network device has not established the multicast session corresponding to the first multicast service.

Optionally, the SMF network element may determine, based on the first identifier and the information about the target access network device through interaction with a fourth network device, that the target access network device has not established the multicast session corresponding to the first multicast service. The fourth network device may be a network element that stores information about an established multicast session.

The information that is about the established multicast session and that is stored in the fourth network device may include an identifier of the multicast session, information about an access network device corresponding to the multicast session, an identifier of a multicast service corresponding to the multicast session, and an identifier of an SMF network element serving the multicast session.

Optionally, the fourth network device may be, for example, a UDM network element, a PCF network element, or a UDR network element in the 5G network. In this embodiment of this application, an example in which the fourth network device is the UDM network element is used for description.

Figure 14A:
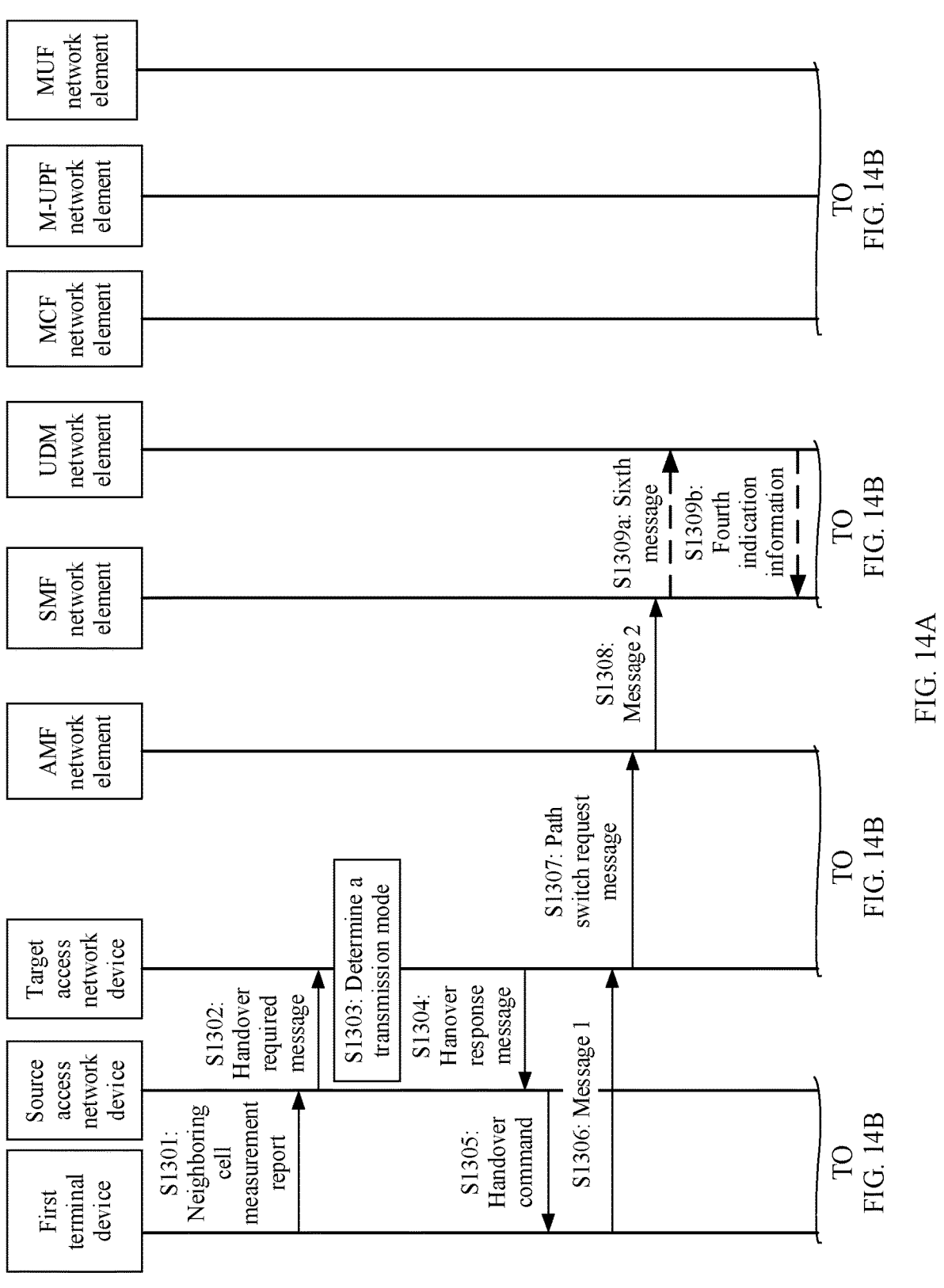
FIG. 14A and FIG. 14B are a fifth schematic interaction flowchart of a communication method according to an embodiment of this application.
Figure 14B:
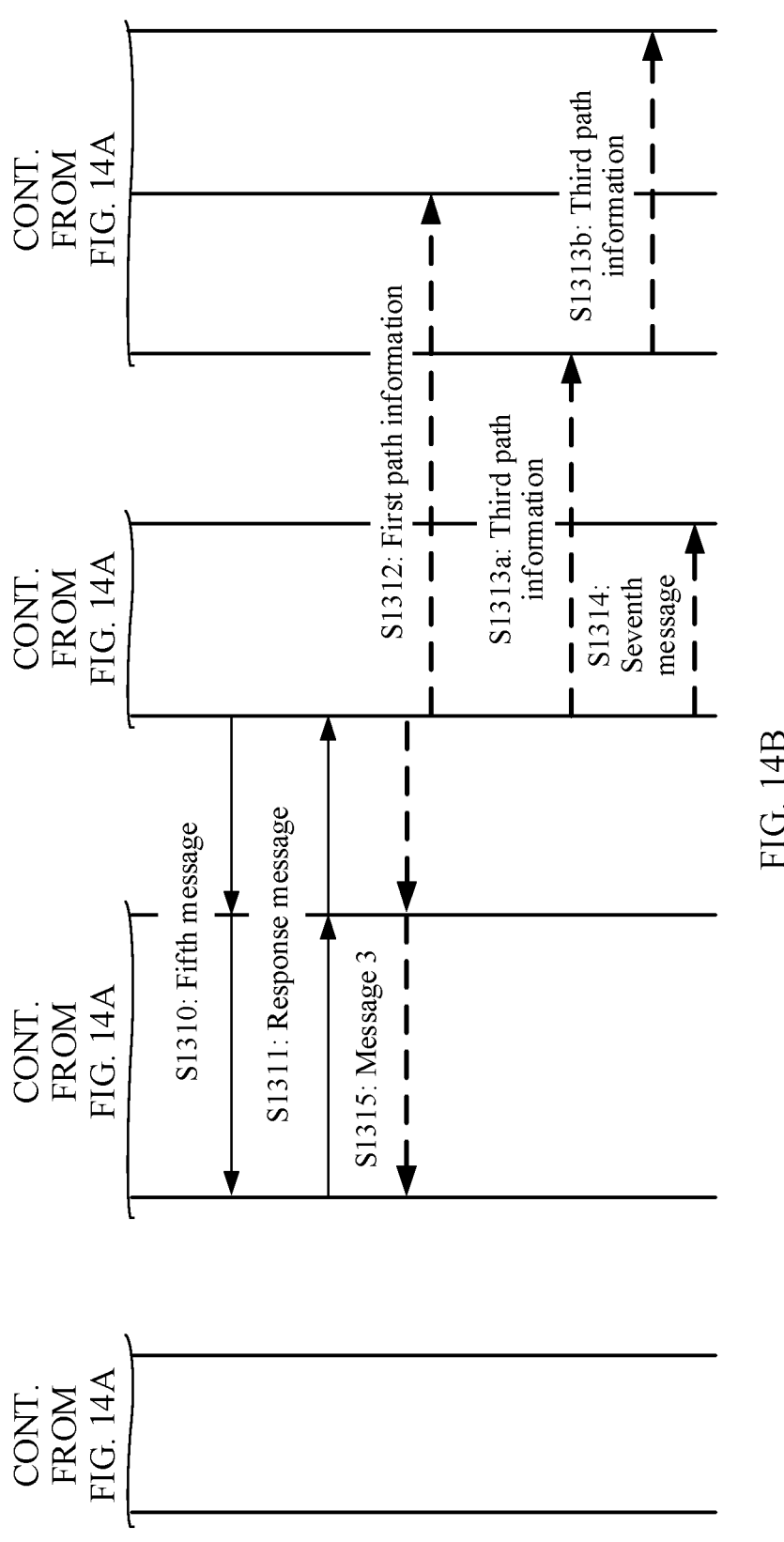

Optionally, as shown in FIG. 14A and FIG. 14B, that the SMF network element determines, based on the first identifier and the information about the target access network device through interaction with the UDM network element, that the target access network device has not established the multicast session corresponding to the first multicast service may include the following steps S1309a and S1309b.

S1309a: The SMF network element sends a sixth message to the UDM network element. Correspondingly, the UDM network element receives the sixth message from the SMF network element.

The sixth message is for querying for a multicast session that corresponds to the first multicast service and that is established by the target access network device, and the sixth message includes the first identifier and the information about the target access network device.

Optionally, after receiving the sixth message, the UDM network element queries information that is about an established multicast session and that is stored in the UDM network element. If a multicast session that corresponds to both identification information of the target access network device and the first identifier exists, that is, if information about an access network device corresponding to the multicast session includes the information about the target access network device, and an identifier of a multicast service corresponding to the multicast session includes the first identifier, the UDM network element returns information about the multicast session to the SMF network element, or the UDM network element sends a response message to the SMF network element to indicate that the multicast session that corresponds to the first multicast service and that is established by the target access network device exists. Otherwise, the UDM network element performs step S1309b.

S1309b: The UDM network element sends fourth indication information to the SMF network element. Correspondingly, the SMF network element receives the fourth indication information from the UDM network element.

The fourth indication information is for indicating that the target access network device has not established the multicast session corresponding to the first multicast service. After receiving the fourth indication information, the SMF network element may determine that the target access network device has not established the multicast session corresponding to the first multicast service.

Optionally, after determining that the target access network device has not established the multicast session corresponding to the first multicast service, the SMF network element performs the following step S1310 to initiate a multicast session establishment procedure.

S1310: The SMF network element sends a fifth message to the target access network device through the AMF network element. Correspondingly, the target access network device receives the fifth message from the SMF network element through the AMF network element.

Optionally, the SMF network element may determine whether the target access network device is located in a service range of the first multicast service. When the target access network device is located in the service range of the first multicast service, the SMF network element sends the fifth message to the target access network device through the AMF network element.

Optionally, for an implementation in which the SMF network element determines whether the target access network device is located in the service range of the first multicast service, refer to related descriptions in step S1010. Details are not described herein again.

The fifth message is for requesting the target access network device to establish the first multicast session corresponding to the first multicast service. The fifth message includes the first identifier.

Optionally, the fifth message may further include at least one of second path information or the identifier of the first multicast session corresponding to the first multicast service, and the identifier of the first multicast session is allocated by the SMF network element. For related descriptions, refer to step S1013. Details are not described herein again.

S1311: The target access network device sends a response message to the SMF network element through the AMF network element. Correspondingly, the SMF network element receives the response message from the target access network device through the AMF network element.

The response message is a response of the target access network device to the fifth message.

Optionally, when the fifth message does not include the at least one of the second path information or the identifier of the first multicast session, the response message may include at least one of first path information or the identifier of the first multicast session, where the identifier of the first multicast session that is included in the response message is allocated by the target access network device. Alternatively, if the target access network device does not support receiving of data in a multicast mode, the response message may also include the first path information.

Optionally, when the response message includes the first path information, the SMF network element performs step S1312, to establish a tunnel for transmitting the data of the first multicast service between the M-UPF network element and the target access network device.

Optionally, if no tunnel is established between the M-UPF network element and an MUF network element for transmitting the data of the first multicast service, the communication method provided in this embodiment of this application further includes steps S1313a and S1313b.

Optionally, after receiving the response message, the SMF network element may further perform step S1314, to store, in the UDM network element, the information about the established first multicast session corresponding to the first multicast service, in other words, register the information about the first multicast session with the UDM network element.

S1312: The SMF network element sends the first path information to the M-UPF network element. Correspondingly, the M-UPF network element receives the first path information from the SMF network element.

For related descriptions, refer to step S1011. Details are not described herein again.

S1313a: The SMF network element sends third path information to an MCF network element. Correspondingly, the MCF network element receives the third path information from the SMF network element.

For related descriptions of the third path information, refer to step S1012. Details are not described herein again. Optionally, after receiving the third path information, the MCF network element performs step S1313b.

S1313b: The MCF network element sends the third path information to the MUF network element. Correspondingly, the MUF network element receives the third path information from the MCF network element.

S1314: The SMF network element sends a seventh message to the UDM network element. Correspondingly, the UDM network element receives the seventh message from the SMF network element.

The seventh message is for registering the first multicast session with the UDM network element, and the seventh message includes the information about the target access network device, the first identifier, and the identifier of the first multicast session.

According to the communication method provided in this embodiment of this application, in an aspect, before the first terminal device moves or is handed over, the wireless configuration information used when the multicast service is transmitted may be sent to the first terminal device, so that the first terminal device performs configuration. Therefore, a delay of the multicast service that is caused by the handover of the first terminal device between access network devices is reduced. In another aspect, the first multicast session corresponding to the first multicast service may be established on the target access network device, and further a transmission path of the data of the first multicast service from a provider (for example, an AF network element) of the first multicast service to the target access network device is established. Therefore, continuity of the first multicast service is ensured, and the delay of the multicast service that is caused by the handover of the first terminal device between the access network devices is further reduced.

Optionally, in an implementation scenario of this embodiment of this application, after step S1311, the communication method provided in this embodiment of this application further includes the following step.

S1315: The SMF network element sends a message 3 to the target access network device through a signaling connection related to the first terminal device. Correspondingly, the target access network device receives the message 3 from the SMF network element through the signaling connection.

The message 3 includes the identifier of the first multicast session corresponding to the first multicast service, and the message 3 is for requesting the target access network device to associate the first terminal device with the first multicast session. The identifier of the first multicast session corresponding to the first multicast service may be the first identifier.

Optionally, for processing performed after the target access network device receives the identifier of the first multicast session corresponding to the first multicast service, refer to related descriptions in step S1212b. Details are not described herein again.

The actions of the network elements in the foregoing steps may be performed by the processor 301 in the communication device 300 shown in FIG. 3 by invoking the application program code stored in the memory 303. This is not limited in this embodiment.

Figure 15:
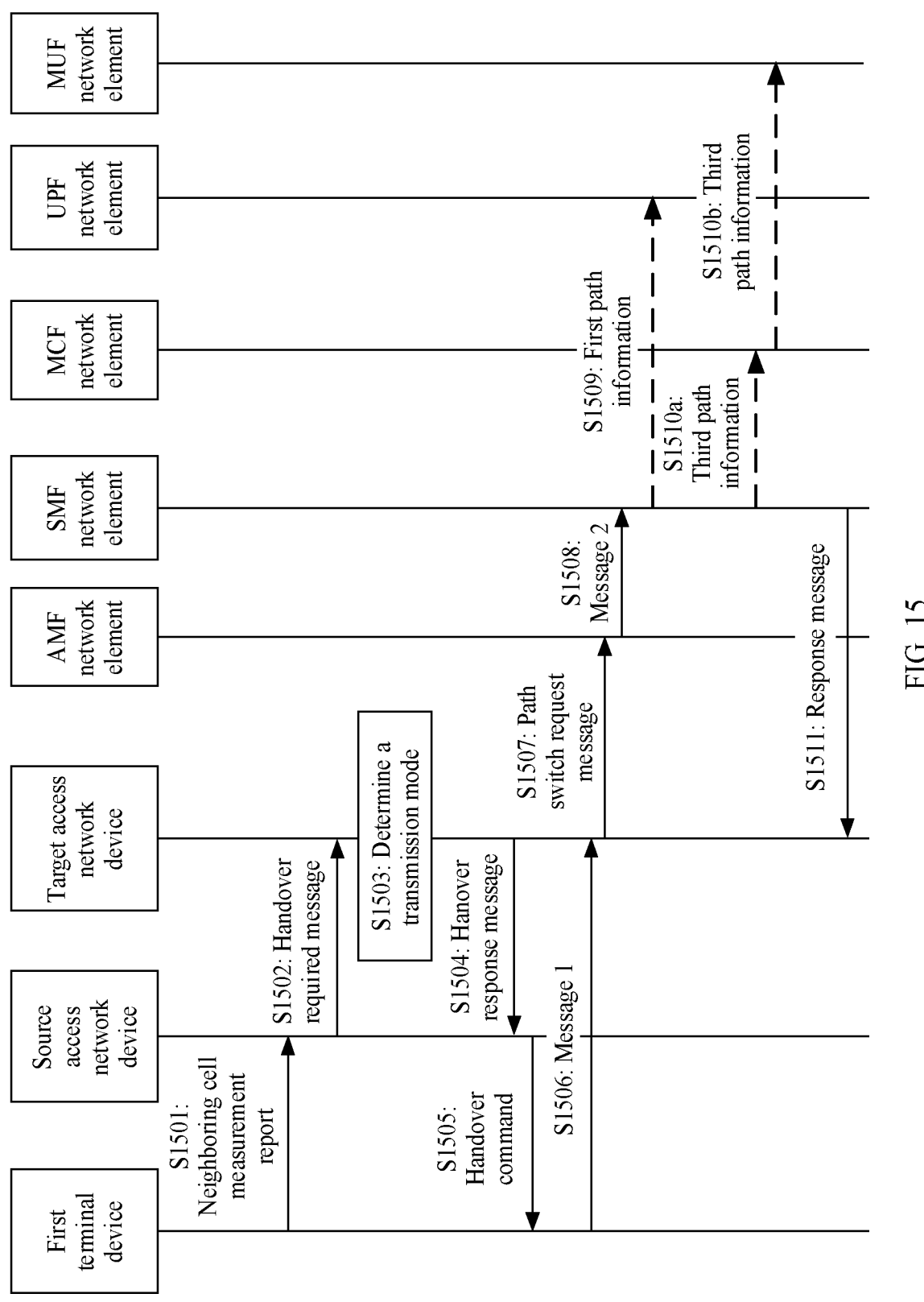
FIG. 15 is a sixth schematic interaction flowchart of a communication method according to an embodiment of this application.

An example in which the communication system shown in FIG. 1A, FIG. 1B, or FIG. 1C is applied to the 5G network shown in FIG. 2A, FIG. 2B, or FIG. 2C is used. FIG. 15 shows a communication method according to an embodiment of this application. The communication method includes the following steps.

S1501 to S1506 are the same as steps S1001 to S1006 in the embodiment shown in FIG. 10A and FIG. 10B. For related descriptions, refer to the embodiment shown in FIG. 10A and FIG. 10B. Details are not described herein again.

S1507: The target access network device sends a path switch request message to an AMF network element. Correspondingly, the AMF network element receives the path switch request message from the target access network device.

The AMF network element is an AMF network element with which the first terminal device registers.

Optionally, the path switch request message may include information 4, and the information 4 includes at least one of the following: the first identifier, an identifier of a first multicast session corresponding to the first multicast service, information about a first QoS flow of the first multicast service, or first path information. The identifier of the first multicast session corresponding to the first multicast service is allocated by the target access network device, the first QoS flow is a part or all of the QoS flow of the first multicast service, and the first path information includes an IP address of the target access network device and a first tunnel identifier. For detailed descriptions, refer to related descriptions in the foregoing embodiments. Details are not described herein again.

Optionally, when the target access network device has not established a multicast session corresponding to the first multicast service, the information 4 further includes indication information for requesting an SMF network element to create the first multicast session corresponding to the first multicast service.

In step S1507, the target access network device further indicates a first PDU session to the AMF network element, so that the AMF network element sends the information 4 to a session management network element corresponding to the first PDU session, where the first PDU session is a PDU session used when the first terminal device joins the first multicast service.

Optionally, the target access network device may include an identifier of the first PDU session in the path switch request message, to indicate the first PDU session to the AMF network element. In addition, the target access network device associates the information 4 with the first PDU session, that is, indicates that the information 4 is specific to the first PDU session.

Optionally, the AMF network element may select, based on the first PDU session indicated by the target access network device, the session management network element corresponding to the first PDU session, and perform the following step S1508.

S1508: The AMF network element sends a message 2 to the SMF network element. Correspondingly, the SMF network element receives the message 2 from the AMF network element.

The SMF network element is the session management network element corresponding to the first PDU session. The message 2 includes the information 4. Optionally, the message 2 may be a PDU session modification request message, or may be another message. This is not specifically limited in this embodiment of this application.

Optionally, when the first terminal device joins the first multicast service, the SMF network element may obtain information about the first multicast service, and store the information about the first multicast service in a context corresponding to the first PDU session. For example, the information about the first multicast service may include the first identifier, the information about the QoS flow of the first multicast service, an identifier of a second multicast session, and information about the source access network device. The first terminal device has joined the first multicast service when being connected to the source access network device, and the second multicast session is a multicast session that corresponds to the first multicast service and that is established by the source access network device.

Optionally, if the information 4 includes the identifier of the first multicast session, the SMF network element replaces the identifier of the second multicast session with the identifier of the first multicast session. If the information about the source access network device is stored, the SMF network element replaces the information about the source access network device with information about the target access network device. If the information 4 includes the information about the first QoS flow, the SMF network element stores the information about the first QoS flow for subsequent charging processing and the like.

Optionally, if the information 4 includes indication information for creating the first multicast session, that the SMF network element creates the first multicast session corresponding to the first multicast service may also be understood as that the SMF network element creates a multicast context corresponding to the first multicast service, and stores the identifier of the first multicast session, the first identifier, the information about the QoS flow of the first multicast service, the information about the target access network device, and the like in the multicast context.

Optionally, after creating the first multicast session corresponding to the first multicast service, the SMF network element may further send a message to a fourth network device, to register the first multicast session with the fourth network device. For descriptions of the fourth network device, refer to related descriptions in step S1309. Details are not described herein again.

Optionally, if the information 4 includes the first path information, the SMF network element performs the following step S1509.

S1509: The SMF network element sends the first path information to a UPF network element. Correspondingly, the UPF network element receives the first path information from the SMF network element.

Optionally, the SMF network element may send the first path information to the UPF network element by using an N4 session update request message or another message. This is not specifically limited in this embodiment of this application.

Optionally, if no tunnel is established between the UPF network element and an MUF network element for transmitting the data of the first multicast service, the communication method provided in this embodiment of this application further includes S1510a and S1510b.

S1510a: The SMF network element sends third path information to an MCF network element. Correspondingly, the MCF network element receives the third path information from the SMF network element.

S1510b: The MCF network element sends the third path information to the MUF network element. Correspondingly, the MUF network element receives the third path information from the MCF network element.

For related descriptions of step S1510a and S1510b, refer to step S1112a and S1112b. Details are not described herein again.

In this case, the data of the first multicast service may be sent from an AF network element to the target access network device through the MUF network element and the UPF network element, and then sent by the target access network device to the first terminal device.

S1511: The SMF network element sends a response message to the target access network device through the AMF network element. Correspondingly, the target access network device receives the response message from the SMF network element through the AMF network element.

Optionally, when the information 4 does not include the identifier of the first multicast session corresponding to the first multicast service, the response message includes the identifier of the first multicast session corresponding to the first multicast service.

Optionally, after receiving the identifier of the first multicast session corresponding to the first multicast service, the target access network device may enable the first terminal device to join the first multicast session, so that the first terminal device may subsequently receive the data of the first multicast service through the target access network device.

According to the communication method provided in this embodiment of this application, in an aspect, before the first terminal device moves or is handed over, the wireless configuration information used when the multicast service is transmitted may be sent to the first terminal device, so that the first terminal device performs configuration. Therefore, a delay of the multicast service that is caused by the handover of the first terminal device between access network devices is reduced. In another aspect, the first multicast session corresponding to the first multicast service may be established on the target access network device, and further a transmission path of the data of the first multicast service from a provider (for example, the AF network element) of the first multicast service to the target access network device is established. Therefore, continuity of the first multicast service is ensured, and the delay of the multicast service that is caused by the handover of the first terminal device between the access network devices is further reduced.

The actions of the network elements in the foregoing steps may be performed by the processor 301 in the communication device 300 shown in FIG. 3 by invoking the application program code stored in the memory 303. This is not limited in this embodiment.

The foregoing mainly describes solutions provided in embodiments of this application from a perspective of interaction between network elements. Correspondingly, an embodiment of this application further provides a communication apparatus. The communication apparatus may be the target access network device in the method embodiments, an apparatus including the target access network device, or a component (for example, a chip or a system-on-a-chip) that can be used in the target access network device. Alternatively, the communication apparatus may be the source access network device in the method embodiments, an apparatus including the source access network device, or a component (for example, a chip or a system-on-a-chip) that can be used in the source access network device. Alternatively, the communication apparatus may be the first network device in the method embodiments, an apparatus including the first network device, or a component (for example, a chip or a system-on-a-chip) that can be used in the first network device. Alternatively, the communication apparatus may be the first session management network element in the method embodiments, an apparatus including the first session management network element, or a component (for example, a chip or a system-on-a-chip) that can be used in the first session management network element.

It may be understood that, to implement the foregoing functions, the communication apparatus includes a corresponding hardware structure and/or software module for executing the functions. A person skilled in the art should be easily aware that, with reference to units and algorithm steps in the examples described in embodiments disclosed in this specification, this application can be implemented in a form of hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 16:
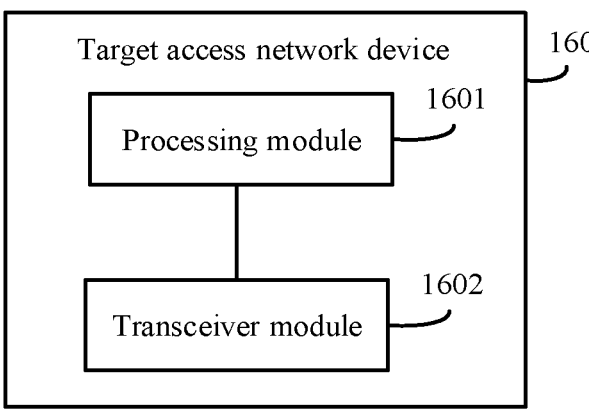
FIG. 16 is a schematic diagram of a structure of a target access network device according to an embodiment of this application.

For example, when function modules are obtained through division in an integrated manner, FIG. 16 is a schematic diagram of a structure of a target access network device 160. The target access network device 160 includes a processing module 1601 and a transceiver module 1602. The transceiver module 1602 may also be referred to as a transceiver unit, and is configured to implement a transceiver function. For example, the transceiver module 1602 may be a transceiver circuit, a transceiver, or a communication interface.

The transceiver module 1602 is configured to receive a first identifier from a source access network device, where the first identifier is for identifying a first multicast service.

The processing module 1601 is configured to determine a transmission mode for transmitting data of the first multicast service between the target access network device and a first terminal device, where the transmission mode includes a unicast mode and a multicast mode. The transceiver module 1602 is further configured to send wireless configuration information corresponding to the transmission mode to the first terminal device through the source access network device.

Optionally, the transceiver module 1602 is further configured to receive signal measurement information of a target cell from the source access network device, where the target cell belongs to the target access network device. That the processing module 1601 is configured to determine a transmission mode for transmitting data of the first multicast service between the target access network device and a first terminal device includes: The processing module 1601 is configured to determine the transmission mode based on the signal measurement information and/or a first quantity, where the first quantity is a quantity of terminal devices that receive the data of the first multicast service through the target access network device.

Optionally, the transceiver module 1602 is further configured to receive information about a quality of service QoS flow of the first multicast service from the source access network device; and the processing module 1601 is further configured to obtain the wireless configuration information corresponding to the transmission mode based on the information about the QoS flow of the first multicast service.

Optionally, the transceiver module 1602 is further configured to send a first message to a first network device, where the first message includes the first identifier, and the first message is for requesting to establish a first multicast session corresponding to the first multicast service.

Optionally, the transceiver module 1602 is further configured to receive second information of the first multicast service, where the second information of the first multicast service includes at least one of second path information or an identifier of the first multicast session, the second path information includes a multicast address and a second tunnel identifier, the multicast address is used by the target access network device to receive the data of the first multicast service in the multicast mode, and the second tunnel identifier is for identifying a multicast tunnel through which the target access network device receives the data of the first multicast service in the multicast mode.

Optionally, the transceiver module 1602 is further configured to send first indication information and third information of the first multicast service, where the first indication information is for indicating the first terminal device to move to the target access network device, the third information of the first multicast service includes at least one of the first identifier, the identifier of the first multicast session corresponding to the first multicast service, or information about a first QoS flow of the first multicast service, and the first QoS flow is a part or all of the QoS flow of the first multicast service.

All related content of the steps in the method embodiments may be cited in function descriptions of corresponding function modules. Details are not described herein again.

In this embodiment, the target access network device 160 is presented in a form of function modules obtained through division in the integrated manner. The "module" herein may be a specific ASIC, a circuit, a processor executing one or more software or firmware programs, a memory, an integrated logic circuit, and/or another component that can provide the foregoing functions. In a simple embodiment, a person skilled in the art may figure out that the target access network device 160 may be in a form shown in FIG. 3.

For example, the processor 301 in FIG. 3 may invoke the computer-executable instructions stored in the memory 303, so that the target access network device 160 is enabled to perform the communication methods in the foregoing method embodiments.

Specifically, functions/implementation processes of the transceiver module 1602 and the processing module 1601 in FIG. 16 may be implemented by the processor 301 in FIG. 3 by invoking the computer-executable instructions stored in the memory 303. Alternatively, a function/an implementation process of the processing module 1601 in FIG. 16 may be implemented by the processor 301 in FIG. 3 by invoking the computer-executable instructions stored in the memory 303, and a function/an implementation process of the transceiver module 1602 in FIG. 16 may be implemented by using the communication interface 304 in FIG. 3.

Because the target access network device 160 provided in this embodiment may perform the foregoing communication methods, for technical effects that can be achieved by the target access network device 160, refer to the foregoing method embodiments. Details are not described herein again.

Figure 17:
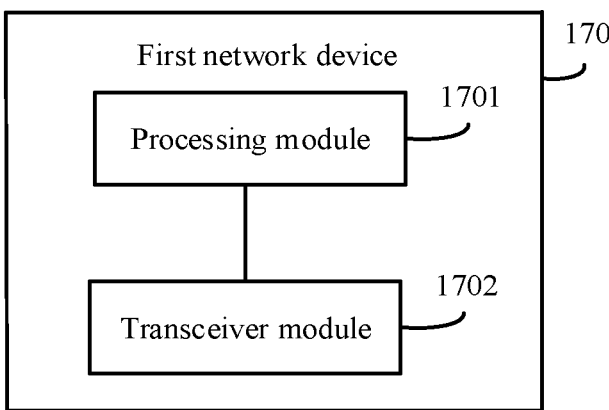
FIG. 17 is a schematic diagram of a structure of a first network device according to an embodiment of this application.

Alternatively, for example, when function modules are obtained through division in an integrated manner, FIG. 17 is a schematic diagram of a structure of a first network device 170. The first network device 170 includes a processing module 1701 and a transceiver module 1702. The transceiver module 1702 may also be referred to as a transceiver unit, and is configured to implement a transceiver function. For example, the transceiver module 1702 may be a transceiver circuit, a transceiver, or a communication interface.

In a Possible Implementation:

The transceiver module 1702 is configured to receive a first message, where the first message includes a first identifier, the first identifier is for identifying a first multicast service, and the first message is used by a target access network device to request to establish a first multicast session corresponding to the first multicast service. The processing module 1701 is configured to establish the first multicast session corresponding to the first multicast service when the target access network device is located in a service range of the first multicast service.

Optionally, the first message further includes information about the target access network device, and the processing module 1701 is further configured to determine, based on the information about the target access network device, that the target access network device is located in the service range of the first multicast service.

Optionally, the first message further includes first path information, and the transceiver module 1702 is further configured to send the first path information to a second network device.

Optionally, the transceiver module 1702 is further configured to send at least one of second path information or an identifier of the first multicast session, where the second path information includes a multicast address and a second tunnel identifier, the multicast address is used by the target access network device to receive data of the first multicast service in a multicast mode, and the second tunnel identifier is for identifying a multicast tunnel through which the target access network device receives the data of the first multicast service in the multicast mode.

Optionally, the processing module 1701 is further configured to obtain policy information of the first multicast service, where the policy information includes the service range of the first multicast service.

Optionally, the transceiver module 1702 is further configured to receive a second message, where the second message is for requesting the first network device to allow a first terminal device to receive the data of the first multicast service through the target access network device; and the transceiver module 1702 is further configured to send second indication information, where the second indication information is for indicating that the first terminal device is allowed to receive the data of the first multicast service through the target access network device.

Optionally, the policy information of the first multicast service includes an identifier of a terminal device that is allowed to receive the data of the first multicast service, and the second message includes an identifier of the first terminal device; and when the identifier of the terminal device that is allowed to receive the data of the first multicast service includes the identifier of the first terminal device, the processing module 1701 is further configured to determine that the first terminal is allowed to receive the data of the first multicast service through the target access network device.

In another possible implementation, the transceiver module 1702 is configured to receive a first identifier and information about a target access network device, where the first identifier is for identifying a first multicast service; the processing module 1701 is configured to determine, based on the first identifier and the information about the target access network device, that the target access network device has not established a multicast session corresponding to the first multicast service; and the transceiver module 1702 is further configured to send a third message, where the third message is for requesting the target access network device to establish a first multicast session corresponding to the first multicast service.

Optionally, the transceiver module 1702 is further configured to receive at least one of first path information or an identifier of the first multicast session corresponding to the first multicast service, where the first path information includes an IP address of the target access network device and a first tunnel identifier, and the first tunnel identifier is for identifying a unicast tunnel through which the target access network device receives data of the first multicast service.

Optionally, that the transceiver module 1702 is further configured to send a third message includes: The transceiver module 1702 is further configured to send the third message when the target access network device is located in a service range of the first multicast service.

Optionally, the processing module 1701 is further configured to determine, based on the information about the target access network device, that the target access network device is located in the service range of the first multicast service.

Optionally, the processing module 1701 is further configured to obtain policy information of the first multicast service, where the policy information of the first multicast service includes the service range of the first multicast service.

Optionally, the transceiver module 1702 is further configured to receive a fourth message, where the fourth message is for requesting the first network device to allow a first terminal device to receive the data of the first multicast service through the target access network device; and the transceiver module 1702 is further configured to send third indication information, where the third indication information is for indicating that the first terminal device is allowed to receive the data of the first multicast service through the target access network device.

Optionally, the policy information of the first multicast service includes an identifier of a terminal device that is allowed to receive the data of the first multicast service, and the fourth message includes an identifier of the first terminal device; and when the identifier of the terminal device that is allowed to receive the data of the first multicast service includes the identifier of the first terminal device, the processing module 1701 is further configured to determine that the first terminal is allowed to receive the data of the first multicast service through the target access network device.

All related content of the steps in the method embodiments may be cited in function descriptions of corresponding function modules. Details are not described herein again.

In this embodiment, the first network device 170 is presented in a form of function modules obtained through division in the integrated manner. The "module" herein may be a specific ASIC, a circuit, a processor executing one or more software or firmware programs, a memory, an integrated logic circuit, and/or another component that can provide the foregoing functions. In a simple embodiment, a person skilled in the art may figure out that the first network device 170 may use the form shown in FIG. 3.

For example, the processor 301 in FIG. 3 may invoke the computer-executable instructions stored in the memory 303, so that the first network device 170 is enabled to perform the communication methods in the foregoing method embodiments.

Specifically, functions/implementation processes of the transceiver module 1702 and the processing module 1701 in FIG. 17 may be implemented by the processor 301 in FIG. 3 by invoking the computer-executable instructions stored in the memory 303. Alternatively, a function/an implementation process of the processing module 1701 in FIG. 17 may be implemented by the processor 301 in FIG. 3 by invoking the computer-executable instructions stored in the memory 303, and a function/an implementation process of the transceiver module 1702 in FIG. 17 may be implemented by using the communication interface 304 in FIG. 3.

Because the first network device 170 provided in this embodiment may perform the foregoing communication methods, for technical effects that can be achieved by the first network device 170, refer to the foregoing method embodiments. Details are not described herein again.

Figure 18:
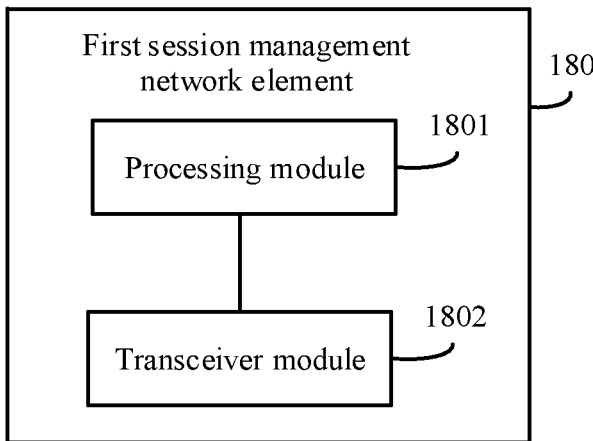
FIG. 18 is a schematic diagram of a structure of a first session management network element according to an embodiment of this application.

Alternatively, for example, when function modules are obtained through division in an integrated manner, FIG. 18 is a schematic diagram of a structure of a first session management network element 180. The first session management network element 180 includes a processing module 1801 and a transceiver module 1802. The transceiver module 1802 may also be referred to as a transceiver unit, and is configured to implement a transceiver function. For example, the transceiver module 1802 may be a transceiver circuit, a transceiver, or a communication interface.

In a Possible Implementation:

The transceiver module 1802 is configured to receive first indication information and first identification information, where the first indication information is for indicating a first terminal device to move to a target access network device, the first identification information is a first identifier or an identifier of a first PDU session, the first identifier is for identifying a first multicast service, and the first PDU session is a PDU session used when the first terminal device joins the first multicast service. The processing module 1801 is configured to send the first identifier and information about the target access network device to a first network device through the transceiver module 1802 based on the first indication information.

Optionally, the processing module 1801 is further configured to obtain the first identifier from a context corresponding to the first PDU session based on the identifier of the first PDU session.

Optionally, the transceiver module 1802 is further configured to receive an identifier of a first multicast session corresponding to the first multicast service from the first network device; and the transceiver module 1802 is further configured to send the identifier of the first multicast session corresponding to the first multicast service to the target access network device.

Optionally, the transceiver module 1802 is further configured to send a fourth message to the first network device, where the fourth message is for requesting the first network device to allow the first terminal device to receive data of the first multicast service through the target access network device; and the transceiver module 1802 is further configured to receive third indication information from the first network device, where the third indication information is for indicating that the first terminal is allowed to receive the data of the first multicast service through the target access network device.

Optionally, the processing module 1801 is further configured to determine that the first terminal device is allowed to receive the data of the first multicast service through the target access network device.

Optionally, that the processing module 1801 is further configured to determine that the first terminal device is allowed to receive the data of the first multicast service through the target access network device includes: The processing module 1801 is further configured to obtain policy information of the first terminal device, where the policy information of the first terminal device includes area information for receiving the data of the first multicast service by the first terminal device; and when the target access network device is located in an area indicated by the area information, the processing module 1801 is further configured to determine that the first terminal device is allowed to receive the data of the first multicast service through the target access network device.

Optionally, the transceiver module 1802 is further configured to receive information about a first QoS flow of the first multicast service from the target access network device, where the first QoS flow is a part or all of a QoS flow of the first multicast service.

In Another Possible Implementation:

The transceiver module 1802 is configured to receive first indication information and first identification information, where the first indication information is for indicating a first terminal device to move to a target access network device, the first identification information is a first identifier or an identifier of a first PDU session, the first identifier is for identifying a first multicast service, and the first PDU session is a PDU session used when the first terminal device joins the first multicast service. The processing module 1801 is configured to determine, based on the first identification information and information about the target access network device, that the target access network device has not established a multicast session corresponding to the first multicast service. The transceiver module 1802 is further configured to send a fifth message to the target access network device, where the fifth message is for requesting the target access network device to establish a first multicast session corresponding to the first multicast service.

Optionally, the transceiver module 1802 is further configured to receive at least one of first path information or an identifier of the first multicast session corresponding to the first multicast service, where the first path information includes an IP address of the target access network device and a first tunnel identifier, and the first tunnel identifier is for identifying a unicast tunnel through which the target access network device receives data of the first multicast service.

Optionally, that the processing module 1801 is configured to determine, based on the first identification information and information about the target access network device, that the target access network device has not established a multicast session corresponding to the first multicast service includes: The processing module 1801 is configured to send a sixth message to a fourth network device through the transceiver module 1802, where the sixth message is for querying for a multicast session that corresponds to the first multicast service and that is established by the target access network device, and the sixth message includes the first identifier and the information about the target access network device; and the processing module 1801 is further configured to receive fourth indication information from the fourth network device through the transceiver module 1802, where the fourth indication information is for indicating that the target access network device has not established the multicast session corresponding to the first multicast service.

Optionally, the transceiver module 1802 is further configured to send a seventh message to the fourth network device, where the seventh message is for registering the first multicast session with the fourth network device, and the seventh message includes the information about the target access network device, the first identifier, and the identifier of the first multicast session.

Optionally, that the transceiver module 1802 is further configured to send a fifth message to the target access network device includes: The transceiver module 1802 is further configured to send the fifth message to the target access network device when the target access network device is located in a service range of the first multicast service.

Optionally, the processing module 1801 is further configured to determine, based on the information about the target access network device, that the target access network device is located in the service range of the first multicast service.

Optionally, the processing module 1801 is further configured to obtain policy information of the first multicast service, where the policy information includes the service range of the first multicast service.

All related content of the steps in the method embodiments may be cited in function descriptions of corresponding function modules. Details are not described herein again.

In this embodiment, the first session management network element 180 is presented in a form of function modules obtained through division in the integrated manner. The "module" herein may be a specific ASIC, a circuit, a processor executing one or more software or firmware programs, a memory, an integrated logic circuit, and/or another component that can provide the foregoing functions. In a simple embodiment, a person skilled in the art may figure out that the first session management network element 180 may be in a form shown in FIG. 3.

For example, the processor 301 in FIG. 3 may invoke the computer-executable instructions stored in the memory 303, so that the first session management network element 180 is enabled to perform the communication methods in the foregoing method embodiments.

Specifically, functions/implementation processes of the transceiver module 1802 and the processing module 1801 in FIG. 18 may be implemented by the processor 301 in FIG. 3 by invoking the computer-executable instructions stored in the memory 303. Alternatively, a function/an implementation process of the processing module 1801 in FIG. 18 may be implemented by the processor 301 in FIG. 3 by invoking the computer-executable instructions stored in the memory 303, and a function/an implementation process of the transceiver module 1802 in FIG. 18 may be implemented by using the communication interface 304 in FIG. 3.

Because the first session management network element 180 provided in this embodiment may perform the foregoing communication methods, for technical effects that can be achieved by the first session management network element 180, refer to the foregoing method embodiments. Details are not described herein again.

Figure 19:
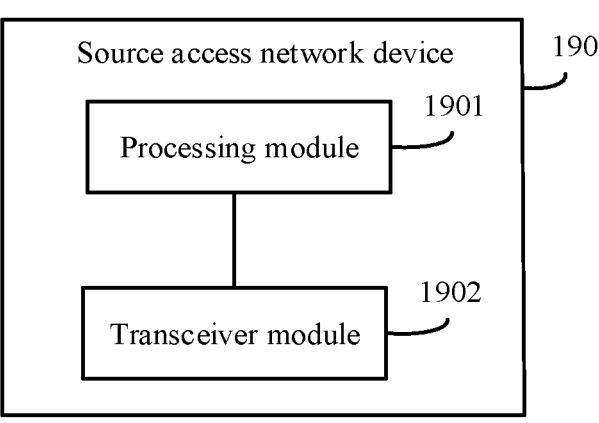
FIG. 19 is a schematic diagram of a structure of a source access network device according to an embodiment of this application.

Alternatively, for example, when function modules are obtained through division in an integrated manner, FIG. 19 is a schematic diagram of a structure of a source access network device 190. The source access network device 190 includes a processing module 1901 and a transceiver module 1902. The transceiver module 1902 may also be referred to as a transceiver unit, and is configured to implement a transceiver function. For example, the transceiver module 1902 may be a transceiver circuit, a transceiver, or a communication interface.

The processing module 1901 is configured to obtain a first identifier. The transceiver module 1902 is configured to send the first identifier to a target access network device, where the first identifier is for identifying a first multicast service. The transceiver module 1902 is further configured to receive wireless configuration information from the target access network device, where the wireless configuration information corresponds to a transmission mode for transmitting data of the first multicast service between the target access network device and a first terminal device, and the transmission mode includes a unicast mode or a multicast mode. The transceiver module 1902 is further configured to send the wireless configuration information to the first terminal device.

Optionally, the transceiver module 1902 is further configured to send signal measurement information of a target cell to the target access network device, where the target cell belongs to the target access network device, and the signal measurement information is used by the target access network device to determine the transmission mode.

Optionally, the transceiver module 1902 is further configured to send information about a quality of service QoS flow of the first multicast service to the target access network device.

Optionally, the processing module 1901 is further configured to obtain a context of a second multicast session based on the first identifier, or the processing module 1901 is further configured to obtain a context of a second multicast session based on an identifier of the second multicast session, where the context of the second multicast session includes the information about the QoS flow of the first multicast service, and the second multicast session is a multicast session that corresponds to the first multicast service and that is established by the source access network device.

Optionally, that the processing module 1901 is configured to obtain a first identifier includes: The processing module 1901 is configured to obtain the first identifier from a context of the first terminal device.

Optionally, the processing module 1901 is further configured to obtain, from the context of the first terminal device, an identifier of the multicast session that corresponds to the first multicast service and that is established by the source access network device.

All related content of the steps in the method embodiments may be cited in function descriptions of corresponding function modules. Details are not described herein again.

In this embodiment, the source access network device 190 is presented in a form of function modules obtained through division in the integrated manner. The "module" herein may be a specific ASIC, a circuit, a processor executing one or more software or firmware programs, a memory, an integrated logic circuit, and/or another component that can provide the foregoing functions. In a simple embodiment, a person skilled in the art may figure out that the source access network device 190 may be in a form shown in FIG. 3.

For example, the processor 301 in FIG. 3 may invoke the computer-executable instructions stored in the memory 303, so that the source access network device 190 is enabled to perform the communication methods in the foregoing method embodiments.

Specifically, functions/implementation processes of the transceiver module 1902 and the processing module 1901 in FIG. 19 may be implemented by the processor 301 in FIG. 3 by invoking the computer-executable instructions stored in the memory 303. Alternatively, a function/an implementation process of the processing module 1901 in FIG. 19 may be implemented by the processor 301 in FIG. 3 by invoking the computer-executable instructions stored in the memory 303, and a function/an implementation process of the transceiver module 1902 in FIG. 19 may be implemented by using the communication interface 304 in FIG. 3.

Because the source access network device 190 provided in this embodiment may perform the foregoing communication methods, for technical effects that can be achieved by the source access network device 190, refer to the foregoing method embodiments. Details are not described herein again.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When the computer program instructions are loaded and executed on a computer, the procedure or functions according to embodiments of this application are completely or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a web site, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Although this application is described with reference to the embodiments, in a procedure of implementing this application that claims protection, a person skilled in the art may understand and implement another variation of the disclosed embodiments by viewing the accompanying drawings, disclosed content, and the appended claims. In the claims, "comprising" does not exclude another component or another step, and "a" or "one" does not exclude a case of "a plurality of". A single processor or another unit may implement several functions listed in the claims. Some measures are recorded in dependent claims that are different from each other, but this does not mean that these measures cannot be combined to produce a better effect.

Although this application is described with reference to specific features and embodiments thereof, clearly, various modifications and combinations may be made to them without departing from the spirit and scope of this application. Correspondingly, this specification and the accompanying drawings are merely example descriptions of this application defined by the appended claims, and are considered as any of or all modifications, variations, combinations or equivalents that cover the scope of this application. Clearly, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A communication method implemented by a target access network device or a chip in the target access network device, the communication method comprising:
   receiving, from a source access network device, a first identifier identifying a first multicast service;
   determining a transmission mode for transmitting data of the first multicast service between the target access network device and a first terminal device based on a quantity of terminal devices that receive the data through the target access network device, wherein the transmission mode comprises a unicast mode or a multicast mode;
   receiving, from the source access network device, quality of service (QoS) information about a QoS flow of the first multicast service;
   determining wireless configuration information corresponding to the transmission mode based on the QoS information;
   sending the wireless configuration information to the first terminal device through the source access network device; and
   sending a first message to a first core network device, wherein the first message comprises the first identifier, and wherein the first message requests to establish a first multicast session corresponding to the first multicast service.

2. The communication method according to claim 1, wherein when the transmission mode is the multicast mode, the wireless configuration information comprises scheduling indication information, wherein the scheduling indication information determines scheduling information of the first multicast service, and wherein the scheduling information indicates a wireless resource for transmitting the first multicast service.

3. The communication method according to claim 1, further comprising:

receiving signal measurement information of a target cell from the source access network device, wherein the target cell belongs to the target access network device; and further determining the transmission mode based on the signal measurement information.

4. The communication method according to claim 1, wherein the first message further comprises first information of the first multicast service, wherein the first information comprises at least one of first path information or a second identifier of the first multicast session, wherein the first path information comprises an Internet Protocol (IP) address of the target access network device and a first tunnel identifier, and wherein the first tunnel identifier identifies a unicast tunnel through which the target access network device receives the data.

5. The communication method according to claim 4, further comprising receiving second information of the first multicast service, wherein the second information comprises at least one of second path information or the second identifier, wherein the second path information comprises a multicast address and a second tunnel identifier, wherein the multicast address is used by the target access network device to receive the data in the multicast mode, and wherein the second tunnel identifier identifies a multicast tunnel through which the target access network device receives the data in the multicast mode.

6. The communication method according to claim 1, wherein the first message further comprises a tracking area identity (TAI) of the target access network device.

7. The communication method according to claim 1, further comprising sending the QoS information to a first session management network element for the first session management network element to perform charging.

8. A communication method implemented by a first core network device or a chip in the first core network device, the communication method comprising:

receiving, from a target access network device, a first message that comprises a first identifier identifying a first multicast service and comprises first information about the target access network device, wherein the first message is for the target access network device to request to establish a first multicast session corresponding to the first multicast service; and sending, to the target access network device, second information of the first multicast service, wherein the second information comprises first path information and a second identifier of the first multicast session, wherein the first path information comprises a multicast address and a first tunnel identifier, wherein the multicast address is for the target access network device to receive data in a multicast mode, and wherein the first tunnel identifier identifies a multicast tunnel through which the target access network device receives the data in the multicast mode.

9. The communication method according to claim 8, wherein the first message further comprises third information of the first multicast service, wherein the third information comprises at least one of second path information, wherein the second path information comprises an Internet Protocol (IP) address of the target access network device and a second tunnel identifier, and wherein the second tunnel identifier identifies a unicast tunnel for the target access network device.

10. A target access network device comprising:

a non-transitory memory configured to store computer-executable instructions; and one or more processors coupled to the non-transitory memory and configured to execute the computer-executable instructions to cause the target access network device to:

receive, from a source access network device, a first identifier identifying a first multicast service;

determine a transmission mode for transmitting data of the first multicast service between the target access network device and a first terminal device based on a quantity of terminal devices that receive the data through the target access network device, wherein the transmission mode comprises a unicast mode or a multicast mode;

receive, from the source access network device, quality of service (QoS) information about a QoS flow of the first multicast service;

determine wireless configuration information corresponding to the transmission mode based on the QoS information;

send the wireless configuration information to the first terminal device through the source access network device; and send a first message to a first core network device, wherein the first message comprises the first identifier, and wherein the first message requests to establish a first multicast session corresponding to the first multicast service.

11. The target access network device according to claim 10, wherein when the transmission mode is the multicast mode, the wireless configuration information comprises scheduling indication information, wherein the scheduling indication information is for determining scheduling information of the first multicast service, and wherein the scheduling information is for indicating a wireless resource for transmitting the first multicast service.

12. The target access network device according to claim 10, wherein the one or more processors are further configured to execute the computer-executable instructions to cause the target access network device to:

receive signal measurement information of a target cell from the source access network device, wherein the target cell belongs to the target access network device; and further determine the transmission mode based on the signal measurement information.

13. A core network device comprising:

a non-transitory memory configured to store computer-executable instructions; and one or more processors coupled to the non-transitory memory and configured to execute the computer-executable instructions to cause the core network device to:

receive, from a target access network device, a first message that comprises a first identifier for identifying a first multicast service and comprises first information about the target access network device, wherein the first message is for the target access network device to request to establish a first multicast session corresponding to the first multicast service; and send, to the target access network device, second information of the first multicast service, wherein the second information comprises first path information and a second identifier of the first multicast session, wherein the first path information comprises a multicast address and a first tunnel identifier, wherein the multicast address is for the target access network device to receive data in a multicast mode, and wherein the first tunnel identifier identifies a multicast tunnel through which the target access network device receives the data in the multicast mode.

14. The core network device according to claim 13, wherein the first message further comprises third information of the first multicast service, wherein the third information comprises at least one of second path information, wherein the second path information comprises an internet protocol (IP) address of the target access network device and a second tunnel identifier, and wherein the second tunnel identifier is for identifying a unicast tunnel for the target access network device.

15. The target access network device according to claim 10, wherein the first message further comprises first information of the first multicast service, wherein the first information comprises at least one of first path information or a second identifier of the first multicast session, wherein the first path information comprises an Internet Protocol (IP) address of the target access network device and a first tunnel identifier, and wherein the first tunnel identifier identifies a unicast tunnel through which the target access network device receives the data.

16. The target access network device according to claim 15, wherein the one or more processors are further configured to execute the computer-executable instructions to cause the target access network device to receive second information of the first multicast service, wherein the second information comprises at least one of second path information or the second identifier, wherein the second path information comprises a multicast address and a second tunnel identifier, wherein the multicast address is used by the target access network device to receive the data in the multicast mode, and wherein the second tunnel identifier identifies a multicast tunnel through which the target access network device receives the data in the multicast mode.

17. The target access network device according to claim 10, wherein the first message further comprises a tracking area identity (TAI) of the target access network device.

18. The target access network device according to claim 10, wherein the one or more processors are further configured to execute the computer-executable instructions to cause the target access network device to send the QoS information to a first session management network element for the first session management network element to perform charging.

19. The communication method according to claim 4, wherein the first identifier and the second identifier are the same.

20. The target access network device according to claim 15, wherein the first identifier and the second identifier are the same.

21. The communication method of claim 8, wherein the first message further comprises a tracking area identity (TAI) of the target access network device.

* * * * *